(12) United States Patent
Adams et al.

(10) Patent No.: US 11,494,385 B2
(45) Date of Patent: *Nov. 8, 2022

(54) MULTIDIMENSIONAL TWO-SIDED INTERVAL JOINS ON HASH-EQUALITY-JOIN INFRASTRUCTURE

(71) Applicant: Snowflake Inc., Bozeman, MT (US)

(72) Inventors: Matthias Carl Adams, Berlin (DE); Spyridon Triantafyllis, Belmont, CA (US); Lars Volker, Los Altos, CA (US); Kevin Wang, Ottawa (CA)

(73) Assignee: Snowflake Inc., Bozeman, MT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/454,894

(22) Filed: Nov. 15, 2021

(65) Prior Publication Data
US 2022/0300500 A1    Sep. 22, 2022

Related U.S. Application Data

(63) Continuation of application No. 17/239,515, filed on Apr. 23, 2021, now Pat. No. 11,216,464.
(Continued)

(51) Int. Cl.
*G06F 16/00*    (2019.01)
*G06F 16/2455*    (2019.01)
(Continued)

(52) U.S. Cl.
CPC ...... *G06F 16/2456* (2019.01); *G06F 16/2282* (2019.01); *G06F 16/248* (2019.01); *G06F 16/24542* (2019.01); *G06F 16/288* (2019.01)

(58) Field of Classification Search
CPC ............ G06F 16/2456; G06F 16/2282; G06F 16/24542; G06F 16/248; G06F 16/288
(Continued)

(56) References Cited

U.S. PATENT DOCUMENTS 6,920,454 B1    7/2005    Chan
7,739,587 B2 *    6/2010    Vion-Dury ........... G06V 30/412
                                                                715/217
(Continued)

OTHER PUBLICATIONS

"U.S. Appl. No. 17/239,515, Corrected Notice of Allowability dated Nov. 16, 2021", 3 pgs.
(Continued)

*Primary Examiner* — Michelle N Owyang
(74) *Attorney, Agent, or Firm* — Schwegman Lundberg & Woessner, P.A.

(57) ABSTRACT

In an embodiment, a data platform implements a two-sided N dimensional interval join using an N dimensional band join followed by a filter that applies a predicate of the interval join. The data platform generates first and second modified relations from first and second input relations. Each modified relation includes a copy of each row from the corresponding input relation for each input-domain cell that overlaps, in each of N dimensions, a bounding polygon of intervals determined from the row of the corresponding input relation. The data platform inserts, in each row in each modified relation, an input-domain-cell identifier of the corresponding overlapping input-domain cell and uses a hash-equality join that receives the first and second modified relations and that is keyed on the input-domain-cell identifiers. The data platform obtains results of a query by executing a query-execution plan that includes the query-plan section.

25 Claims, 12 Drawing Sheets

Related U.S. Application Data

(60) Provisional application No. 63/162,989, filed on Mar. 18, 2021.

(51) Int. Cl.
 *G06F 16/22* (2019.01)
 *G06F 16/248* (2019.01)
 *G06F 16/28* (2019.01)
 *G06F 16/2453* (2019.01)

(58) Field of Classification Search
 USPC .................................................. 707/600–899
 See application file for complete search history.

(56) References Cited

U.S. PATENT DOCUMENTS

| | | | |
|---|---|---|---|
| 9,652,496 B1 * | 5/2017 | Antova | G06F 16/24537 |
| 9,870,397 B2 | 1/2018 | Chawda et al. | |
| 9,881,036 B2 | 1/2018 | Cazemier et al. | |
| 10,025,823 B2 | 7/2018 | Das et al. | |
| 10,031,943 B1 | 7/2018 | Raghavendra et al. | |
| 10,311,088 B1 | 6/2019 | Fowler | |
| 10,572,484 B2 | 2/2020 | Bondalapati et al. | |
| 10,635,671 B2 | 4/2020 | Sheng et al. | |
| 11,194,808 B1 | 12/2021 | Adams et al. | |
| 11,216,464 B1 | 1/2022 | Adams et al. | |
| 11,314,743 B1 | 4/2022 | Baptist | |
| 2008/0183693 A1 | 7/2008 | Arasu et al. | |
| 2008/0294615 A1 * | 11/2008 | Furuya | G06F 16/2456 |
| 2010/0036803 A1 | 2/2010 | Vemuri et al. | |
| 2014/0149388 A1 | 5/2014 | Gruszecki et al. | |
| 2014/0372438 A1 * | 12/2014 | Chandramouli | G06F 16/24568 |
| | | | 707/736 |
| 2015/0286679 A1 | 10/2015 | Dave et al. | |
| 2015/0324399 A1 | 11/2015 | Tyercha et al. | |
| 2017/0060944 A1 | 3/2017 | Khayyat et al. | |
| 2018/0173762 A1 * | 6/2018 | Hu | G06F 16/2455 |
| 2018/0300330 A1 * | 10/2018 | Samwel | G06F 16/24544 |
| 2019/0005094 A1 | 1/2019 | Yi et al. | |
| 2019/0018889 A1 | 1/2019 | Colgrove et al. | |
| 2020/0034468 A1 | 1/2020 | Lei et al. | |
| 2020/0278967 A1 | 9/2020 | Chen | |

OTHER PUBLICATIONS

"U.S. Appl. No. 17/239,515, Examiner Interview Summary dated Oct. 1, 2021", 2 pgs.

"U.S. Appl. No. 17/239,515, Non-Final Office Action dated Jun. 25, 2021", 24 pgs.

"U.S. Appl. No. 17/239,515, Notice of Allowance dated Oct. 20, 2021", 18 pgs.

"U.S. Appl. No. 17/239,515, Response filed Sep. 27, 2021 to Non-Final Office Action dated Jun. 25, 2021", 11 pgs.

"U.S. Appl. No. 17/239,521, Corrected Notice of Allowability dated Nov. 10, 2021", 2 pgs.

"U.S. Appl. No. 17/239,521, Examiner Interview Summary dated Oct. 1, 2021", 3 pgs.

"U.S. Appl. No. 17/239,521, Non-Final Office Action dated Jun. 25, 2021", 24 pgs.

"U.S. Appl. No. 17/239,521, Notice of Allowance dated Oct. 20, 2021", 18 pgs.

"U.S. Appl. No. 17/239,521, Response filed Sep. 27, 2021 to Non-Final Office Action dated Jun. 25, 2021", 14 pgs.

"U.S. Appl. No. 17/239,529, Non-Final Office Action dated Aug. 30, 2021", 30 pgs.

"U.S. Appl. No. 17/239,529, Examiner Interview Summary dated Nov. 23, 2021", 2 pgs.

"U.S. Appl. No. 17/239,529, Notice of Allowance dated Apr. 6, 2022", 7 pgs.

"U.S. Appl. No. 17/239,529, Notice of Allowance dated Dec. 22, 2021", 9 pgs.

"U.S. Appl. No. 17/239,529, Response filed Nov. 30, 2021 to Non Final Office Action dated Aug. 30, 2021", 16 pgs.

"U.S. Appl. No. 17/454,899, Non Final Office Action dated Feb. 4, 2022", 8 pgs.

"U.S. Appl. No. 17/454,899, Notice of Allowance dated May 16, 2022", 8 pgs.

* cited by examiner

MULTIDIMENSIONAL TWO-SIDED INTERVAL JOINS ON HASH-EQUALITY-JOIN INFRASTRUCTURE

CROSS-REFERENCE TO PRIORITY APPLICATIONS

This application is a Continuation of U.S. patent application Ser. No. 17/239,515, filed Apr. 23, 2021, which claims the benefit of priority to U.S. Provisional Patent Application Ser. No. 63/162,989 filed on Mar. 18, 2021, the contents of which are incorporated by reference herein in their entireties.

TECHNICAL FIELD

The present disclosure relates to data platforms, query processing, interval joins, geospatial joins, hash joins, equality joins, band joins, and, more particularly, to systems and methods for implementing multidimensional two-sided interval joins on a distributed hash-based-equality-join infrastructure.

BACKGROUND

Data platforms are widely used for data storage and data access in computing and communication contexts. With respect to architecture, a data platform could be an on-premises data platform, a network-based data platform (e.g., a cloud-based data platform), a combination of the two, and/or include another type of architecture. With respect to type of data processing, a data platform could implement online analytical processing (OLAP), online transactional processing (OLTP), a combination of the two, and/or another type of data processing. Moreover, a data platform could be or include a relational database management system (RDBMS) and/or one or more other types of database management systems.

In a typical implementation, a data platform includes one or more databases that are maintained on behalf of a customer account. Indeed, the data platform may include one or more databases that are respectively maintained in association with any number of customer accounts, as well as one or more databases associated with a system account (e.g., an administrative account) of the data platform, one or more other databases used for administrative purposes, and/or one or more other databases that are maintained in association with one or more other organizations and/or for any other purposes. A data platform may also store metadata in association with the data platform in general and in association with, as examples, particular databases and/or particular customer accounts as well. Users and/or executing processes that are associated with a given customer account may, via one or more types of clients, be able to cause data to be ingested into the database, and may also be able to manipulate the data, add additional data, remove data, run queries against the data, generate views of the data, and so forth.

In an implementation of a data platform, a given database (e.g., a database maintained for a customer account) may reside as an object within, e.g., a customer account, which may include other objects (e.g., users, roles, and/or the like) as well. Furthermore, a given object may itself contain one or more objects such as schemas, tables, materialized views, and/or the like. A given table may be organized as a collection of records (e.g., rows) that each include a plurality of attributes (e.g., columns). In some implementations, database data is physically stored across multiple storage units, which may be referred to as files, blocks, partitions, micro-partitions, and/or by one or more other names. In many cases, a database on a data platform serves as a backend for one or more applications that are executing on one or more application servers.

BRIEF DESCRIPTION OF THE DRAWINGS

A more detailed understanding may be had from the following description, which is presented by way of example in conjunction with the following drawings, in which like reference numerals are used across the drawings in connection with like elements.

DETAILED DESCRIPTION

Figure 1:
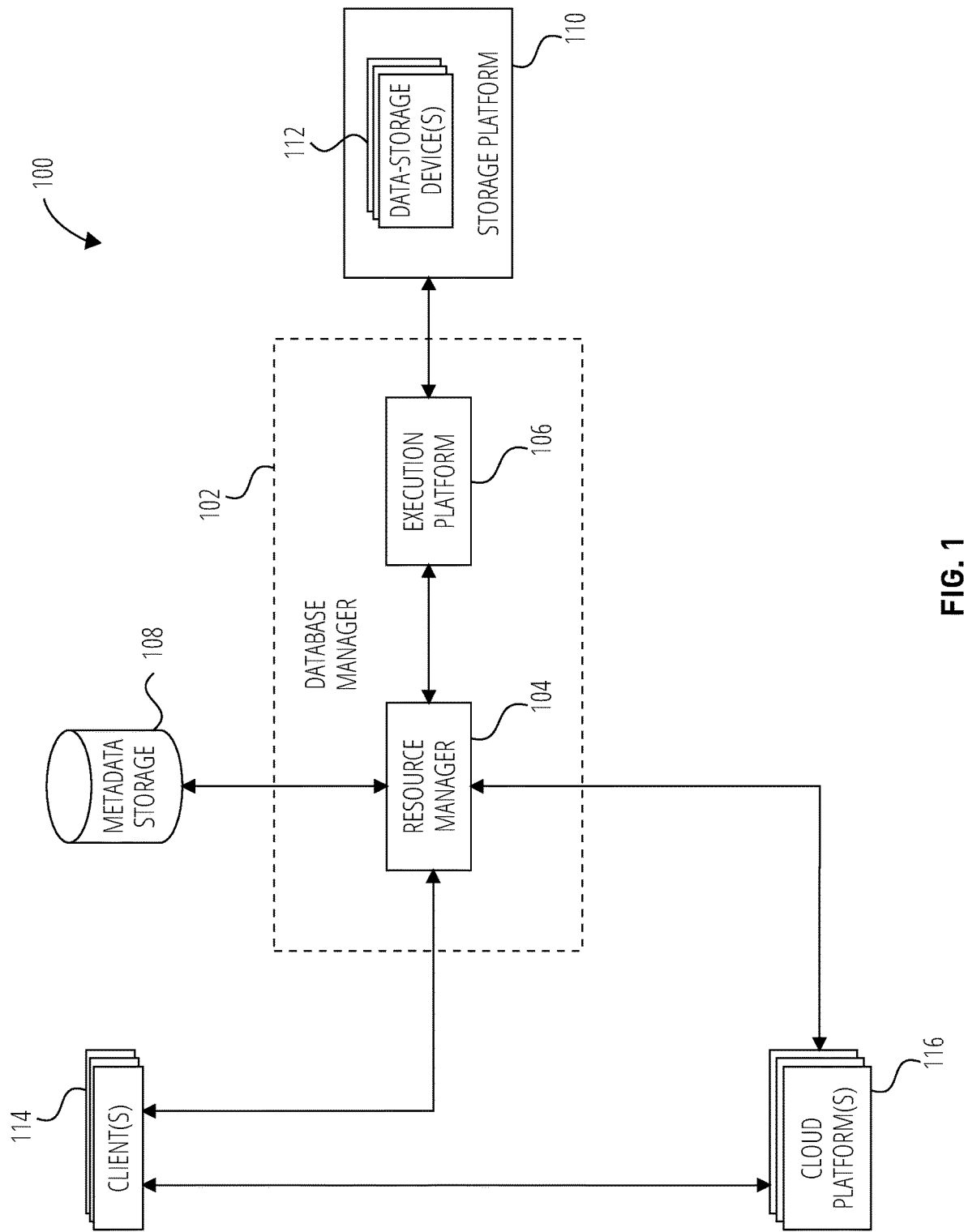
FIG. 1 illustrates an example data platform, in accordance with at least one embodiment.

In the context of data platforms, databases, queries, and the like, it is often the case that one or more of what are known as "relations" are processed by one or more operators as part of a query-execution plan for a given query that is executed by, e.g., a relational database-management system (RDBMS). As used in the art and herein, a relation is a set of tuples, where each such tuple is itself a set of one or more data values. By convention, each such tuple is typically referred to as a "row" of the relation, and each attribute for which each tuple (at least potentially) includes a value is generally referred to as a "column" of the relation. A database table is an example type of relation, as are a data stream or data feed, intermediate results during query execution, and many other examples that could be listed here.

In one example context, a baseball-statistics relation could have a row for each player in a league, and each such row could include columns such as player name, player age, team name, batting average, number of homeruns, and so forth. As can be seen by that example, different columns in a given relation can be "over" different domains or of different data types. Player name and team name could each include one or more character strings, while age and number of homeruns could be integers, and batting average could be a decimal (e.g., floating-point) value or an integer representation of such a value (e.g., the integer 286 to represent a batting average of 0.286—typically pronounced "two eighty six"), and so on.

One operator that is used in many query-execution plans is referred to as a "join" (or "join operator," "join operation," "join function," etc.). A join takes two (or more) relations as inputs, and filters those relations down to a single output relation that the join constructs by applying a conditional-logic statement to the input relations. That conditional-logic statement is known as a "join predicate." For clarity of explanation, most of the joins that are described in the present disclosure take two input relations and produce one output relation. Furthermore, while it is noted that multiple conditions in a given join predicate are sometimes referred to as being multiple join predicates, the single form "join predicate" is primarily used in the present disclosure because, ultimately, the one or more conditions resolve to a single answer of [true] or [false]. Another way of stating this is that a single join predicate can be formed by—or can be treated as, thought of, etc.—multiple join predicates that are combined using one or more conjunctions (e.g., "AND") and/or one or more disjunctions (e.g., "OR"), and/or the like. As another example, a "NOT" operator may be used to generate one predicate by negating another.

In general, instructions for a query may include an instruction such as:

```
SELECT
    expressions
FROM
    left Relation
JOIN
    rightRelation
ON
    joinPredicate
``` where "expressions" may specify one or more particular columns (and optionally include one or more functions (e.g., nested functions)) from the two example relations "leftRelation" and "rightRelation," and where "JoinPredicate" is a conditional-logic expression that resolves to either [true] or [false] for a given pair of rows, one from leftRelation and the other from rightRelation. This example join will test every possible pair of rows, one from leftRelation and the other from rightRelation, against joinPredicate.

For the pairs of rows for which the join predicate of a given join operator is true, the given join operator will produce a row in its output relation that includes the values—from that particular pair of rows—of the one or more columns (and possibly one or more functions) specified by "expressions." (Such "selected" expressions often include at least one column (and/or at least one result of a function operating on at least one column) from each of the input relations, though this is not required.) In many cases, each row of a join output includes both entire rows from the respective input relations, and may include one or more additional columns as well.

Continuing the baseball example, suppose that there is a first (e.g., left) relation that includes the above-mentioned attributes (name, age, team, homeruns, batting average) for players in the American League for a given baseball season, as well as a second (e.g., right) relation that includes the same attributes for players in the National League for the same season. As mentioned above, each row in each relation may correspond to a different player in the corresponding league. Either or both of these relations could take the form of a database table, a data stream, an intermediate result within a query-execution plan, and/or the like.

An example query involving these two relations might seek to identify every pair (or any pairs) of players, one from the American League and the other from the National League, that each (i) hit the exact same number of homeruns as the other in that season and (ii) had the exact same batting average as the other in that season. In an example context, the left (American League) relation is named "AL," the right (National League) relation is named "NL," and the above-referenced columns that are used in the example instructions below are named "<relation>.playerName," "<relation>.teamName," "<relation>.homeruns," and "<relation>.battingAverage."

Noting first that the syntax "FROM [left] JOIN [right]" is used interchangeably in the present disclosure with the syntax "FROM [left], [right]" in instructions for example joins, query instructions for this example query may include an instruction such as:

```
SELECT
    AL.playerName,
    AL.teamName,
    AL.homeruns,
    AL.battingAverage,
    NL.playerName,
    NL.teamName,
    NL.homeruns,
    NL.battingAverage
FROM
    AL,
    NL
WHERE
    AL.homeruns = NL.homeruns AND
    AL.battingAverage = NL.battingAverage
```

Assuming for the purposes of this example that there are multiple AL/NL pairs of players that meet this criteria, this join operation will output a relation that includes, for each such match, the name, team name, number of homeruns, and batting average for each of the two players. This is an example of a fairly simple "equality join" (also referred to as an "equijoin") in that both logic conditions that need to be satisfied—in order for this join predicate to resolve to [true]—are testing whether, for a given pair of a left-relation row and a right-relation row, the value in a certain column in the left relation (e.g. AL.homeruns) is equal to the value in a certain column in the right relation (e.g., NL.homeruns). Similarly for batting average. Among the many kinds of joins, equality joins are among the fastest and computationally least expensive to execute.

The example above involved comparing column values (number of homeruns, batting average) that are single numbers. There are also, however, joins that involve comparison of either (i) a range of values to a single value or (ii) one range of values to another range of values. These joins are known as "interval joins." Generally stated, interval joins are joins that have a join predicate that describes one or more intervals. The range-to-value type of interval join is known as a "one-sided" interval join (regardless of whether the range comes from the left relation and the single value from the right relation or vice versa). The range-to-range type of interval join is known as a "two-sided" interval join.

Interval joins are useful in many contexts, including in systems that handle time-series and other temporally related data, systems that handle genomic data, and others. In an example context, an example one-sided interval join may be utilized to identify any pairs of left-relation rows and right-relation rows for which a time period specified in the left relation (by, e.g., an "intervalStartTime" column and an "intervalStopTime" column) includes a particular time that is specified in the right relation (by, e.g., an "alertTime" column).

For example, a join predicate could test whether it is both true that
(i) left.intervalStartTime precedes or equals right.eventTime and
(ii) right.eventTime precedes or equals left.intervalStopTime, where "precedes or equals" is implemented in this example as "is less than or equal to." In other examples that do not consider a given interval to "include" a given alertTime that is equal to the intervalStartTime or the intervalStopTime, "is less than" could be used instead. And certainly numerous other examples could be provided here.

Similarly, in a context in which the right relation also specifies a time interval (also using, e.g., "intervalStartTime" and "intervalStopTime" columns), an example two-sided interval join may identify any pairs of left-relation rows and right-relation rows that contain overlapping time periods. For example, a join predicate could test whether it is both true that (i) left.intervalStartTime is less than or equal to right.intervalStopTime and (ii) right.intervalStartTime is less than or equal to left.intervalStopTime. Many other examples could be given as well, and others are discussed throughout the present disclosure.

Furthermore, an example described above involved comparing homeruns to homeruns, as well as batting average to batting average. As such, that is an example of a multidimensional join, where in this case the dimensions are those two baseball statistics. Such a join is also referred to herein at times as an "N-dimensional join," where N is an integer and where, in this case, N is equal to 2. A similar join that, for example, did not include the homeruns aspect would be an example of a one-dimensional join. Thus, an N-dimensional join is a one-dimensional join if N is equal to 1, or instead is a multidimensional join if N is greater than 1. This dimensionality of joins extends to interval joins as well. In the context of, for example, geospatial data, which is discussed more extensively below, an example one-dimensional (and in this case one-sided) interval join may identify pairs of left-relation rows and right-relation rows where a range of longitude values in the left-relation row includes a specific longitude value in the right-relation row.

By extension, a multidimensional (in this case two-dimensional yet still one-sided) interval join may identify pairs of left-relation rows and right-relation rows in which (i) a longitude range in the left-relation row includes a specific longitude value in the right-relation row and (ii) a latitude range in the left-relation row includes a specific latitude value in the right-relation row. Such a join would be identifying pairs of left-relation rows and right-relation rows where a left-relation-row geospatial area contains a particular right-relation-row geospatial location (e.g., point).

As a brief aside, to avoid subjecting the reader to innumerable references to complicated modifiers such as "multidimensional (e.g. two-dimensional)," "two-dimensional (or, more generally, multidimensional)," and the like, it should be understood that two-dimensional examples and embodiments (involving, e.g, two-dimensional interval joins) are also applicable to multidimensional extensions to any suitable number of dimensions (i.e., to N-dimensional joins for which N is greater than 2). In various different embodiments, such dimensions may be spatial (e.g., {x, y, z} coordinates, {longitude, latitude, altitude} coordinates, spatial and temporal (i.e., spatiotemporal) (e.g., {longitude, latitude, time}), and/or otherwise. Stated more generally, "dimension" is not used in the present disclosure in a way that is limited to dimensions that are physical, geographical, spatial, or the like, but rather is used more broadly to represent any property, characteristic, aspect, and so forth. For example, each column in a relation can be considered to be a dimension of whatever (or whomever, or wherever, etc.) is represented by a given row in that relation.

Returning to the discussion of example types of interval joins, it can be appreciated by extension that a two-dimensional two-sided interval join is one that identifies pairs of left-relation rows and right-relation rows that satisfy a join predicate that includes comparison of (i) a left-relation range to a right-relation range in a first dimension (e.g., longitude) and (ii) a left-relation range to a right-relation range in a second dimension (e.g., latitude). Such an interval join could be used, for example, to identify pairs of left-relation rows and right-relation rows for which a left-relation geospatial area intersects (e.g., overlaps at least in part) a right-relation geospatial area. For example, as described below in connection with at least one embodiment, the left-relation geospatial area and the right-relation geospatial area could be respective bounding boxes of a left-relation geospatial polygon (representing, e.g., a county) and a right-relation geospatial polygon (representing, e.g., a natural landscape feature such as a lake).

As mentioned, one example context in which interval joins quite often prove useful is in systems that process geospatial data, which may be used by a given data platform to represent one or more geographical features. A geography data type may be defined to represent such geographical features, and a given instance of the geography data type may be referred to as a geography data object. Various examples of geography data objects include a point, a linestring, a polygon, multiple points, multiple linestrings, multiple polygons, one or more other geography data objects, any combination of one or more of those examples, and the like. A point may represent a particular geographic location having a particular longitude and latitude. A line, which is referred to in this disclosure as a linestring, may represent a street or a highway as examples, and may be composed of a contiguous set of one or more line segments, each of which may be defined as a shortest path in the relevant coordinate system between the two points that are at the respective ends of, and therefore define, the line segment.

A polygon, which may be considered to be a special case of a linestring—i.e., a closed linestring, may include a set of points that collectively define a perimeter of a geographical area. In some cases, a polygon may include one or more of what are known as holes, each of which is a polygon within the bounds—but not considered part—of the larger polygon. In one example, a polygon may represent the landmass of a given county, and one or more holes within that polygon may each correspond to a lake situated within that county. Numerous other examples could be given as well. For example, a polygon could represent the city of Rome, and a hole within that polygon could correspond to Vatican City.

As just a few examples, a given geography data object could, as discussed above, represent a single point or may instead include multiple points that define a linestring or a polygon, among other alternatives. As used herein, unless otherwise qualified or specified, the term linestring refers to a non-closed linestring. A geography data object could include a collection of multiple geography data objects such as points, linestrings, polygons, and/or the like. An organization known as the Open Geospatial Consortium (OGC)

publishes standards pertaining to the storage and processing of geospatial data in relational databases. Two such standards are (i) the OpenGIS® Implementation Standard No. OGC 06-103r4, Version 1.2.1, entitled "OpenGIS® Implementation Standard for Geographic information—Simple feature access—Part 1: Common architecture" (28 May 2011) and (ii) the OpenGIS® Implementation Standard No. OGC 06-104r4, Version 1.2.1, entitled "OpenGIS® Implementation Standard for Geographic information—Simple feature access—Part 2: SQL option" (4 Aug. 2010). The OGC also defines an eXtensible Markup Language (XML) format known as the Geography Markup Language (GML) for the expression of geographical features. Other formats for encoding geographical features include well-known text (WKT), well-known binary (WKB), and GeoJSON, which is an open standard format designed for representing simple geographical features. GeoJSON is based on JavaScript Object Notation (JSON).

In a given format that is used for representing geographical features, a point is typically represented as a set of coordinates in a coordinate system. In this disclosure, the examples are discussed and illustrated in the context of two-dimensional (2D) geometry and geography with the understanding that the examples, concepts, principles, etc. that are discussed herein are extendable to three-dimensional (3D) (and higher-dimensional) geometries and geographies as well. In 2D, a point is represented as a pair of coordinates. In Cartesian domains, a point may be given by an {x, y} pair, where x and y each represent a linear distance from the origin along their respective axis in a unit of measure such as meters, kilometers, feet, miles, and/or the like.

In what are known as Earth domains, a point may be given by a {longitude, latitude} pair. By convention, x and y in Cartesian domains correspond respectively with longitude and latitude in Earth domains, and that convention is followed in this disclosure. Longitude and latitude are typically expressed in degrees, with longitude ranging between −180 and 180 degrees and with latitude ranging between −90 and 90 degrees. Furthermore, the line of longitude at 0 degrees longitude is known as the Prime Meridian, and the line of longitude that is at both −180 and 180 degrees longitude is known as the Antimeridian. Positive longitude values are those east of the Prime Meridian up to the Antimeridian, and negative longitude values are those west of the Prime Meridian up to the Antimeridian. The Equator is at 0 degrees latitude, and the North and South Poles are at 90 and −90 degrees latitude, respectively.

In various different implementations, the surface of the Earth may be modeled as a plane, a sphere, or an ellipsoid, the latter of which is also known as a spheroid. The shape of line segments (between, e.g., a given pair of points) is different in these different Earth-domain models. As a general matter, among these three types of Earth-domain models, the actual shape of the Earth is generally most accurately represented by an ellipsoidal model in which (i) the Equator is longer than it is in a spherical model and (ii) the North Pole and South Pole are both closer to the center of the Earth than they are in a spherical model. Conversely, among these three types of Earth-domain models, the actual shape of the Earth is generally least accurately represented by planar models, with the lack of accuracy generally becoming more and more pronounced over greater and greater distances from the Equator. In some of the examples that are discussed herein, a spherical model of Earth is used by way of illustration with the understanding that other models could be used. In Earth domains, coordinates are, as discussed above, typically expressed in terms of degrees whereas distances are typically expressed using units of measure such as meters, kilometers, feet, miles, and/or the like. In Cartesian domains, both distances and coordinates are typically expressed using such units of measure.

The OGC standards define various complex geospatial functions with agreed-upon semantics. Examples of these geospatial functions include ST_Covers, ST_CoveredBy, ST_Contains, ST_Within, ST_Distance, ST_DWithin, ST_Intersects, ST_Equals, ST_Touches, ST_Crosses, and ST_Buffer. The "ST" prefix on each geospatial-function name has evolved in recent years to become a de facto abbreviation for "Spatial Type," though it originally was an abbreviation for "Spatial and Temporal." As used herein by way of example, the semantics of these various geospatial functions are as follows, where "g" represents a given geography data object, where "g1" and "g2" represent two different geography data objects, and where "d" represents a distance.

ST_Covers(g1, g2) returns [true] if every point in g2 is either within or touching the perimeter of g1, and otherwise returns [false];

ST_CoveredBy(g1, g2) is equivalent to ST_Covers(g2, g1);

ST_Contains(g1, g2) returns [true] if every point in g2 is within (but not touching) the perimeter of g1, and otherwise returns [false];

ST_Within(g1, g2) is equivalent to ST_Contains(g2, g1);

ST_Distance(g1, g2) returns the shortest distance between g1 and g2;

ST_Distance(g1, g2)<(or <=) d returns [true] if ST_Distance(g1, g2) is less than (or less than or equal to) d, and otherwise returns [false] (as used herein, "<=" is equivalent to "≤" and to the language "less than or equal to");

ST_DWithin(g1, g2, d) returns [true] if ST_Distance(g1, g2) is less than or equal to d, and otherwise returns [false];

ST_Intersects(g1, g2) returns [true] if g1 and g2 have at least one point in common, and otherwise returns [false];

ST_Equals(g1, g2) returns [true] if every point of g1 is also a point of g2 and vice versa, and otherwise returns [false];

ST_Touches(g1, g2) returns [true] if (a) at least one edge point of g1 is also an edge point of g2 and (b) there are no points in common between the interior of g1 and the interior of g2, and otherwise returns [false];

ST_Crosses(g1, g2) returns [true] if (a) at least one point is an interior point of both g1 and g2 and (b) at least one interior point of at least one of g1 and g2 is not an interior point of the other of g1 and g2, and otherwise returns [false]; and ST_Buffer(g, d) returns a geography data object that contains all points that are less than or equal to (i.e., at most) d from g.

And there are other geospatial functions that could be listed here, as these are just examples. It is noted that some examples (in the disclosure below) of various ones of these functions replace "g," "g1," and/or "g2" with one or more expressions such as "left.g" and "right.g," where "left" and "right" represent relations (also referred to as relational expressions) and where the "g" in this ".g" usage represents a geography data object that may be contained in a column of the associated relation, may be represented by a combination of multiple columns of the associated relation, or may be an output of a function performed on one or more columns of the associated relation, among other possibilities. Further explanation and examples in this regard are provided below. As used herein, as mentioned, a relation could take on one of a number of different forms, some examples of which are a table, an output of another operator in a query-execution plan, an inline view, a subquery, a materialized view, a stream of rows, another object having a plurality of rows, and/or the like.

With respect to query processing, it can occur that a join operator (also referred to as a join) in a query-execution plan includes a join predicate that itself contains a complex geospatial function such as ST_Contains. In the present disclosure, a join that includes such a join predicate is referred to as a geospatial-function join, and the corresponding join predicate is referred to as a geospatial-join predicate. As used herein, a geospatial join predicate is a join predicate on topological relationships between geospatial objects, some examples of such relationships being categorizable as containment geospatial join predicates, intersection geospatial join predicates, and distance (or within-distance) geospatial-join predicates. In some current implementations of data platforms, in order to perform a geospatial-function join, an operation that is known as a cross join is performed, which involves generating what is referred to as the "Cartesian product" of the left-side relation and the right-side relation of the join.

The Cartesian product of a given left-side relation and a given right-side relation includes rows that are every possible combination of one row from the given left-side relation and one row from the given right-side relation. The two relevant geography data objects, one originally from the given left-side relation and the other originally from the given right-side relation—from each and every row of this Cartesian product are then input into a filter that implements the complex geospatial function, and those rows for which the geospatial function returns [true] are included in the output of this filter whereas those rows for which the geospatial function returns [false] are not included in the output of this filter. This approach is computationally expensive in terms of both processing resources and time, and accordingly is inefficient. In the design of query-processing logic for data platforms, the generation of Cartesian products (i.e., cross joins) of multiple relations is generally avoided where possible.

Another approach that has been developed for conducting geospatial joins involves reducing such joins to interval joins having much simpler predicates that are implied by the geospatial join predicate. A wide variety of embodiments of such approaches is described by way of example in the prior applications that are listed below and that are incorporated by reference into the present disclosure. In such approaches, it is quite often the case that application of the implied interval join predicates results (by design) in an overinclusive relation that is output by the interval join. That output relation, typically greatly reduced in size as compared with the input relations and more importantly as compared with the Cartesian product of the input relations, can then be processed using a filter that applies the actual, more computationally expensive geospatial-join predicate to identify true positives of the geospatial-join predicate among all of the positives (i.e., matches of broader criteria) output by the interval join. At least some such embodiments of such prior approaches are agnostic, however, as to how the implied interval joins are actually conducted.

Various different existing systems implement interval joins in various different ways. One common way is known to those of skill in the art as involving "interval trees." Interval-tree implementations have some drawbacks, one being the necessity of a time-consuming, preparatory build phase in which all intervals are inserted into the interval tree. Another drawback of interval-tree-based implementations of interval joins is that such implementations are typically quite difficult to integrate into data platforms that utilize a type of join infrastructure that is referred to as being "hash-based." Hash-based-join infrastructures of data platforms are discussed more fully below and throughout the present disclosure. Another term that is used for the example hash-based-join infrastructures that are described herein is "hash-based-equality-join infrastructures." Moreover, some embodiments involve a further variety that is referred to herein as "distributed hash-equality-join infrastructures." Furthermore, it is noted that those of skill in the art refer to "hash equality joins" at times as "hash match joins."

Generally speaking, hash-based joins, which are also referred to herein at times by the shorter term "hash joins," process their input relations by applying a given hash function (or, in some cases, a sequence of hash functions) to one or more columns (and/or the result of one or more functions on one or more such columns) in both input relations. Based on the hash-function result for a given row, whether that row be a left-relation row or a right-relation row, the given row is "assigned to" (e.g., placed in, sent to, associated with, and/or the like) a particular one of what is referred to in the art as a "bucket." Such a bucket could correspond to a particular table, a particular process, a particular cache, a particular buffer, a particular storage location, a particular server, a particular device or other computer, and/or any other type of operable classification deemed suitable by those of skill in the art for a given implementation.

Because the same hash function is applied with respect to both the left relation and the right relation, left-relation rows and right-relation rows that have matching hash-function inputs will be placed in the same bucket. In some instances, a hash-function result is an integer value that is itself an index into a particular hash table or other memory location. Thus, the output of the hash function can be directly used in some embodiments as part of a specified storage location for the associated row. If a left-relation row and a right-relation row provide matching inputs to the same hash function, those two rows will end up in the same specified storage location (e.g., hash-table row). In that sense, the matches are said to "find each other" in at least some hash-based join implementations.

In embodiments that involve distributed execution to multiple workers (e.g., servers, threads, nodes, processes, devices, virtual machines, cloud instances, other types of remotely executing processes, and/or the like), matching rows can be helped in finding each other in a number of different ways. Some such embodiments represent what are referred to herein as embodiments that operate on a "distributed hash-equality-join-based infrastructure." In some cases, one or more of the buckets are assigned to particular workers. A given worker might be assigned multiple buckets, but multiple workers are, in at least one embodiment, not assigned portions of the same bucket. That is, the buckets are treated in at least one embodiment as indivisible.

In some implementations, a sequence of hash functions is used, where a first hash-function result—of a particular row of a particular relation—selects a server to which the associated row is sent, assigned, and/or the like. At that server, a second hash-function—either a substantively different hash function or a distinct instance of the same hash function—is applied to place the associated row in a given potential matchmaking location, as described above. In some cases, the output of the first hash function can be used as the input to the second hash function. In other cases, as described, a given value from or derived from the associated row is used as a fresh input to each separate hash function. Such are design choices within the purview of those of skill in the relevant arts.

Moreover, some data platforms that have a hash-join infrastructure such as that described above implement interval joins using a technique that is referred to herein as a "band join" on top of that infrastructure. In short, such a data platform may execute a hash-based band join as part of executing a given interval join. To illustrate a band join, described here is an example involving a left relation that includes a range and a right relation that includes a value, where the join predicate (of the interval join) is structured to identify pairs of left-relation rows and right-relation rows in which the left-relation-row range includes the right-relation-row value, similar to the above-described example one-sided one-dimensional interval join in which (i) each left-relation row specified a time interval with intervalStartTime and intervalStopTime columns and (ii) each right-relation row included a specific alertTime.

For the purposes of a band join, an example data platform delineates what is referred to in the art and herein as the "input domain" into a series of adjacent, non-overlapping segments, referred to herein as "bands," that collectively make up the entire input domain. In the present example, the input domain could be the time period between the earliest intervalStartTime in any left-relation row and the latest intervalStopTime in any left-relation row. In the example that is described here, it is known that all of the time intervals occurred during a particular 24-hour day, and so that day is used as the input domain for this example. And though the bands in the current example are time bands, bands in any other input domain could be used instead in other examples, as deemed suitable by those of skill in the art for various different implementations. Some example input domains include a given temperature range (e.g., –20° Fahrenheit (–20° F.) through 120° F.) divided into 10-degree-wide bands, a range of heights of various individuals (e.g., 4 feet, 6 inches through 7 feet, 10 inches) divided into 4-inch-wide (or high) bands, etc.

As is discussed more fully below, the bands (time bands in this case) in a given band join could be of any band size (which may also be called a band width, a band height, a band length, a band duration in the case of time bands, and/or the like). Moreover, although it is the case that the examples that are presented in this disclosure involve band joins that implement bands of uniform size, this is not required. A variety of band sizes can be used in a given dimension, and different band sizes can be used in different dimensions in multidimensional examples. Regardless of whether uniform or non-uniform band sizes are used in one or more dimensions, and regardless of whether the same or different band sizes are used for different dimensions, the same one or more band sizes and band boundaries are, however, applied to both the left and right relations on a per-dimension basis. As described more fully below, some band joins involve a step of sampling (e.g., completely reviewing) the interval-containing relation(s), which in the present example is just the left relation. Various different approaches could be taken to selecting a band size based on a sampling (e.g., complete review) of such data.

For purposes of this example, the input domain (i.e., the particular day) is divided into 24 one-hour-long, non-overlapping bands, each starting on the hour and ending just before the next hour. Thus, and using military time to reduce ambiguity, "band 00" spans from what is referred to herein as a "bandStartTime" of 0000 (12:00 a.m.) to what is referred to herein as a "bandEndTime" of 0059 (12:59 a.m.), "band 01" spans from its bandStartTime of 0100 to its bandEndtime of 0159, and so forth up to "band 23," which has a bandStartTime of 2300 and a bandEndtime of 2359. In this example, each of the band-spanned time periods is inclusive: e.g., band 17 includes the minutes that start at 1700, 1701, 1702, . . . , 1758, and 1759; band 18 includes the minutes that start at 1800, 1801, 1802, . . . , 1858, and 1859. And so on with respect to the other bands.

Further to this example, and consistent with the previous paragraph, all bandStartTimes, bandEndTimes, intervalStartTimes, intervalStopTimes, and alertTimes are rounded to the nearest whole minute. This could correspond to an implementation in which precision beyond that may not be necessary. For example, the left relation may have rows that (i) correspond respectively to trucks in a given fleet (of, e.g., a package-delivery company) and (ii) include "intervalStartTime" and "intervalStopTime" columns that indicate when the corresponding truck was on the road that day. In this example, the right relation has rows that (i) correspond to respective alerts that were broadcast to all trucks in the fleet that day and (ii) include an "alertTime" column indicating the time at which the corresponding alert was broadcast to all trucks in the fleet. In this example, again for simplicity, each truck that was on the road that day just has a single ("starting the day") intervalStartTime and a single ("done for the day") intervalStopTime. In this example, the relevant join operation is aimed at identifying which trucks were on the road at the time of which alerts.

In a band join, the data platform typically assigns a unique ID to each band. In this disclosure, that unique ID is referred to in connection with some examples as a "bandID." In this example, each of the 24 above-defined bands is assigned a respective unique two-digit bandID that corresponds to the hour that is spanned by that band (as delineated into 60 minutes from, e.g, 1400 through 1459 for band 14, and so forth). Next, a band-mapping process is conducted in which (i) each row in the left relation is mapped to the corresponding band or bands that are "intersected" (in the parlance of the present disclosure) by the time interval that is specified by that particular left-relation row (where, in at least one embodiment, "intersected" bands are those that the specified (e.g., time) interval overlaps partially or completely) and (ii) each row in the right relation is mapped to the corresponding single band that contains the alertTime that is specified by that particular right-relation row. An example way in which this "mapping" could be performed is described below.

The data platform may then move to a stage that is referred to herein as an "explosion stage," in which, for each row in the left relation whose specified interval intersects not just one band but also at least one additional band, a respective copy of that row is added to the left relation for each such additional band. For example, if a given row specifies an interval that intersects four bands, three copies of that row are added to the left relation. Moreover, the data platform may add a "bandID" column (or "pseudocolumn") to the left relation, and each of those rows (the original and each copy) has its respective bandID attribute set to a different one of the bandIDs of the intersected bands. In the example in which three copies of a row are added due to that row specifying an interval that intersects four bands, the original row and each of the three copies of that row would each have their bandID set to a respective different one of the four bandIDs of those four intersected bands.

As is more fully described below with respect to the figures, the data platform may use a hash function to process the join key—for an upcoming hash join, in this case the added bandID—in each "exploded" row of each relation, using the same hash function for both relations. It is noted that the bandID is not a join key for the above-mentioned interval join or for the band join that is used to implement part of that interval join; rather, the bandID is the join key specifically for a hash join that is described herein as being used to implement part of that band join. For simplicity, a distributed (e.g., multi-worker) hash-join architecture is not described in this example, although such an implementation could be used.

It can be appreciated that left-relation rows and right-relation rows having matching bandIDs will also have matching hash-function outputs when the same hash function is used to process those matching bandIDs. By operation of the hash-join infrastructure, each unique pair of rows, one from the left relation and the other from the right relation, for which it is the case that the left-relation row specifies a time interval that includes the alertTime that is specified in the right-relation row will find one another in the hash-function-determined location as described above. That pairing would represent a "true positive" because the alertTime is actually included in the specified interval; however, as described herein, there will often also be false positives (and/or duplicates) in the output of the hash join.

In at least one embodiment, some or all of one or both of each such pair of rows is included as a constructed row of an output relation of the band-join portion of the overall implementation of the interval join. That intermediate output relation is referred to herein at times as "a band-join output relation," "a band-join output," and the like. In at least one embodiment in which the hash join is the sequentially last part of the band join, the output relation of the band join could just as well be called the output relation of the hash join.

On the subject of false positives, it can be appreciated that a given interval and a given point value mapping to a common band is necessary but not sufficient to conclude that the given interval includes the given point value. In short, the interval could only partially overlap the given band, and the point value may not be within the overlapped portion of the given band. For example, a truck in the above example may have started its day at 0830 and a particular alert may have been issued at 0805. Both (i) the on-the-road time interval that is specified by the left-relation row that corresponds to that truck and (ii) the particular alert would "intersect" band 08 in the language of the present disclosure. The specified time interval would not, however, include the alertTime for that particular alert.

Because of this, in at least one embodiment, each row in the band-join output relation is run through a filter that applies the original interval join predicate. The bandIDs are therefore used in at least one embodiment as an intermediate join key of sorts, to narrow the combined two input relations to possible matches. In this example, such a filter may apply a join predicate such as:
left.intervalStartTime<=right.alertTime<=left.intervalStopTime
to each row in the band-join output relation. Those band-join-output-relation rows for which that predicate resolves to [true] are then included (at least in part) as a row in a relation that is the output of the interval join overall. That type of overall output relation is referred to herein at times as "an interval-join output relation," "an interval-join output," and the like.

Prior hash-based implementations, however, suffer from a number of drawbacks. One such drawback is that these implementations are limited to one-sided interval joins, such that the only types of comparisons that can be made are between a given interval and a given point value. Furthermore, another drawback of these implementations is that they are limited to one-dimensional interval joins. As such they are not well-suited for the processing of two-sided multidimensional interval joins, such as many interval joins that pertain to xy coordinates, geospatial coordinates, and so forth. For example, these prior implementations are not well-suited to process the above-described interval joins that can be used as part of the overall processing of geospatial joins, where the geospatial-join predicate implies the interval-join predicate, and where the output of the interval join(s) may then be run through a filter that applies the associated geospatial join predicate to a set of data that is significantly smaller in size as compared with a hypothetical Cartesian product of the input relations.

To address these and other shortcomings of prior implementations, disclosed herein are various embodiments of systems and methods for implementing multidimensional two-sided interval joins on a distributed hash-based-equality-join infrastructure. As an example illustration, a two-dimensional two-sided interval join could be an interval join having an interval join predicate that is implied by a complex geospatial function such as ST_Intersects(L.g, R.g), where, in this example, L.g and R.g are both geography data objects (in respective left and right relations named "L" and "R"), and in particular they are polygons.

For an illustrative example, suppose that each L.g defines the perimeter of a given city in a given state, and that each R.g defines the perimeter of a lake. A query may include instructions to execute the complex geospatial function referenced above, ST_Intersects (L.g, R.g). A data platform may identify a bounding box (e.g., a minimum or substantially minimum bounding box) of each L.g and each R.g. Using x and y as shorthand for longitude and latitude, respectively, each such bounding box may be defined by values such as its respective minimum and maximum x values(XMIN(L.g) and XMAX(L.g), and XMIN(R.g) and XMAX(R.g)) and its respective minimum and maximum y values (YMIN(L.g) and YMAX(L.g), and YMIN(R.g) and YMAX(R.g)). It is noted that these values are often also the minimum and maximum x and y values of the polygons themselves, though in some embodiments, the bounding boxes are constructed to be at least slightly outside of the actual perimeters of the corresponding polygons.

The implied interval join predicate may be the following two-dimensional two-sided interval-join predicate:
(XMIN(L.g)<=XMAX(R.g)) AND
(XMIN(R.g)<=XMAX(L.g)) AND
(YMIN(L.g)<=YMAX(R.g)) AND
(YMIN(R.g)<=YMAX(L.g))
In an embodiment, a data platform may derive that interval join predicate, or may receive that interval-join predicate, or receive instructions to execute that implied interval-join predicate as all or as part of a larger query-execution plan, and/or the like.

Regardless of how the example interval join predicate is obtained, the data platform in at least one embodiment may, as part of processing this example two-dimensional two-sided interval join, implement a two-dimensional two-sided band join using a hash-equality-join architecture, in accordance with the present disclosure. The processing by the data platform of this hash-based band join may include at least the following four phases, analogues of which are described (though not explicitly named) above: a sampling phase, an explosion phase, a distribution phase, and a join phase.

In the first ("sampling") phase, the data platform analyzes one or both of the input relations to select, for each of the two dimensions, a band size (referred to herein at times as "BandSize") for bands into which to divide the relevant input domain, which in this case is the surface of the Earth or perhaps a geographically delineated subset of the surface of the Earth. As can be seen in the example that is described in the next paragraph, it need not be the case that the band sizes in the two dimensions (or more generally in each of the multiple dimensions) are equal, though they certainly can be.

In this particular example, as stated above, the input domain is the particular state within which the cities corresponding to the left-relation rows are located (along with at least part of the lakes corresponding to the right-relation rows). As stated above, non-uniform band sizes over a given input domain can be used in one or both dimensions, though uniform band sizes are implemented in both dimensions in many of the examples that are described herein, including this one. Various mathematical techniques, which are options for selecting a band size, are further discussed below.

In this example, a band size (e.g., band width) of 10 miles is chosen for dividing up the example state in the east-west direction (i.e., in the x dimension, using lines of longitude to divide up the latitude spanned by the state). Moreover, a band size (e.g., band height) of 5 miles is chosen for dividing the state in the north-south direction (i.e., in the y dimension, using lines of latitude to divide up the longitude spanned by the state). In this example scenario, the hypothetical example state is a rectangle that is 400 miles "wide" (from west to east) and 200 miles "tall" (from north to south). The selected x-dimension band size and y-dimension band size demarcate the state into a grid of rectangles that are referred to herein as cells, and that, in this example, are each 10 miles wide and 5 miles tall. Because the east-west span of the state and the x-dimension band size are each double their north-south and y-dimension counterpart, the grid into which the state is demarcated is 40 cells wide by 40 cells tall, resulting in a total of 1600 cells in the grid. In at least one embodiment, the data platform assigns a "cell_ID" to each such cell, which is analogous to the assignment of a bandID to each band in the one-dimensional context.

In the second ("explosion") phase, the relevant geospatial polygon in each row of each relation (i.e., a city or a lake in this example) is separately mapped to each of the above-described cells that is intersected (e.g., overlapped at least in part) by a bounding box of that geospatial polygon. The explosion phase is also described herein at times as "the explosion," "the explosion operator," and the like.

During the explosion phase, for a given row in a given one of the two relations, if the corresponding bounding box of the corresponding geospatial polygon overlaps (at least in part) an integer number M cells, the output of the explosion phase will include M instances of that row, the data platform having added M−1 copies of that row to the given relation in at least one embodiment (other than in cases where M=1, in which case the data platform does in a sense make 0 copies of the given row, but more accurately the data platform does not make any copies of the given row). Focusing on an example row that has been exploded into a plural number M instances of that row, each of those M instances will include a different one of the M cell_IDs of the M cells that the corresponding bounding box overlaps. The cell_IDs may be stored in a "cell_ID" column (e.g., pseudocolumn) that the data platform adds to both the left relation and the right relation during the explosion phase.

Furthermore, for reasons that are more fully explained below, in at least one embodiment, during the explosion phase, the data platform also adds a second column (i.e., column or pseudocolumn, as examples) to each row in the left relation and to each row in the right relation. This second column is utilized in at least one embodiment to record, in each row (including in each original row and in each copy thereof), whether (and, in some embodiments, to what extent) that row was duplicated during the explosion phase. This column could be a Boolean value (e.g., [true] or [false], an integer 1 or 0, etc.) that indicates whether the particular row has been duplicated (or is a duplicate of a row that has been duplicated). In at least one embodiment, duplicated rows and duplicate rows are treated in substantially (and in some cases exactly) the same fashion by the data platform).

This added, duplication-indicative column could instead be an integer that indicates the total number of post-explosion instances (including the original and any one or more copies) of that row (that may be identical other than having different cell_IDs) in the corresponding relation. For example, a non-duplicated row could have a value of 1 in such a column whereas a duplicated (or duplicate) row could have an integer that is greater than 1, and so forth. Other implementations of indicating duplication or no duplication on a row-by-row basis could be used as well. In the embodiments that are primarily discussed herein, this column is called "[relation].rowInstances" and is of type integer, being equal to an integer that is greater than 1 if the corresponding row has been duplicated or is a duplicate, and otherwise being equal to 1 (indicating that the corresponding row has not been duplicated and therefore cannot be a duplicate).

In at least one embodiment, in a third ("distribution") phase, the rows of the post-explosion (also referred to herein at times as "exploded") left relation and the rows of the post-explosion (or "exploded") right relation are distributed across a number of workers based on the cell or cells (e.g., the cell_ID or cell_IDs) that have been assigned to each such worker. As above, a worker could be or at least include a server, a node, a thread, a process, a computer, a processor, a core, a virtual machine, a cloud instance, another type of remotely executing process, and/or the like. By operation of the hash-join infrastructure, left-relation rows and right-relation rows that both map to a given cell will both be sent (e.g., assigned) to the same worker.

In some embodiments, if the total number of cells (and therefore unique cell_IDs) is not too great (e.g., is less than a predetermined threshold), the data platform may simply assign one or more actual cell_IDs to each such worker. In other embodiments, perhaps when that is not practicable due to the sheer number of cells, the various cell_IDs may be processed through a hash function that will produce a value from a more limited-in-number set of values, where that lower number of values can be practicably assigned to various different workers. But still, left-relation rows and right-relation rows that have been mapped to the same cell will have the cell_ID of that cell produce the same result from the hash (or other) function, such that the relevant rows will be able to find one another, as described herein. In embodiments in which multiple cell_IDs map to the same worker, the worker could sort the associated rows into cell-specific buckets as received, or check for equality of cell_ID as a condition for a pair that includes a left-relation row and a right-relation row to be kept, among other options.

Furthermore, in a fourth ("cell join") phase according to at least one embodiment, the rows that correspond to each respective cell can be processed by a single worker in non-distributed embodiments, or by a corresponding assigned worker in distributed embodiments, as examples. Regardless of the number of workers or the distributed or non-distributed nature of the employed architecture, the worker that has been assigned a given one of the (in this example, 1600) cell_IDs receives (i) one instance of every row from the left relation that mapped to the given cell_ID and (ii) one instance of every row from the right relation that also (independently) mapped to the same given cell_ID.

Each worker may use one of a number of techniques (e.g., cross join) known in the art to produce what is referred to herein at times as a worker output relation that includes rows that collectively contain every possible pair of a left-relation row and a right-relation row among the rows that are received by that worker by virtue of both mapping to the particular cell_ID to which that worker has been assigned. In a one-worker implementation, that worker output relation can also be referred to as "a hash-join output relation," "a hash-join output," and/or the like. In a multi-worker (distributed) implementation, a union operator may collect the various worker-specific output relations and produce what is referred to herein as "the hash-join output relation," "the hash-join output," and/or like. In at least some embodiments that implement a multi-worker distributed cell_ID-join phase, at least some—and in some cases all—of the workers execute their tasks in parallel. In embodiments in which the hash join is the sequentially last element of the band join, the hash join output may equivalently be referred to as the band-join output.

The band-join output may well contain duplicates of one or more of its rows, the only difference among duplicates in at least one embodiment being the value in the "cell_ID" column in implementations that do not discard the cell_ID column as part of or following the hash join. In implementations that do discard the "cell_ID" column, there may be exact duplicate rows in the band-join output. In any event, some embodiments include a deduplication step, which is also described below in connection with the figures. In various different embodiments, the deduplication step is—prior to a filter that applies, e.g., the interval join predicate, selectively applied to only those rows in the band-join output that include a row from the left relation and a row from the right relation that both have an integer greater than 1 in their respective "rowInstances" or similar column (or [true] in a Boolean column, etc.), or if duplication had somehow otherwise been indicated in both the row from the left relation and the row from the right relation.

As an example of another way in which a data platform may indicate, in a given row itself, the previous duplication (or not) of that row, a data platform in at least one embodiment may have two cell_IDs reserved for each cell, and use one (e.g., an even number) when duplication has occurred for a given row, and another (e.g., an odd number) for rows that have not been duplicated. The ensuing processing could simply treat both cell_IDs for a given cell as equivalent other than for a deduplicate-or-bypass decision point. As another example, in at least one embodiment, a database platform may leave a cell_ID as a positive number if the row in that particular relation is not duplicated, but flip the sign to a negative-but-otherwise-equal number (e.g., cell 14/−14) if the row in that particular relation is duplicated.

Those having both skill in the art and the benefit of the present disclosure may well design similar "hacks," "tricks," "data-compression techniques," and/or the like in order to indicate to a deduplication-or-bypass set of logic whether or not a given row in the band-join output is a "1 of 1" or is a "1 of more than 1." There may be some computation time and effort saved by not adding a "rowInstances" or similar column to each of the left relation and the right relation for this purpose. Whether deduplication occurs or not (or occurs to an extent) in a given embodiment, the band-join output (or reduced or modified band-join output, etc.) may be submitted to a filter that applies the original geospatial-join predicate (e.g., ST_Intersects) to the actual geography data objects in the rows that have made it through a gauntlet in connection with at least one embodiment of the present disclosure.

One example embodiment takes the form of a method that includes receiving query instructions for a query on a database. The query instructions include a two-sided N-dimensional interval join of at least a first input relation and a second input relation, where N is an integer greater than 1. The two-sided N-dimensional interval join has an interval-join predicate that, in each of N dimensions, compares an interval determined from the first input relation with an interval determined from the second input relation. The method also includes generating, based on the query instructions, a query-execution plan that implements the two-sided N-dimensional interval join as a query-plan section of the query-execution plan. The query-plan section includes an N-dimensional band join followed by a filter that applies the interval-join predicate to a band-join output of the N-dimensional band join. The method also includes obtaining results of the query at least in part by executing the query-execution plan.

Another example embodiment takes the form of a method that includes receiving, for a query on a database, query instructions that include a two-sided N-dimensional interval join of at least a first input relation and a second input relation, where N is an integer greater than 1. The two-sided N-dimensional interval join has an interval-join predicate that, in each of N dimensions, compares an interval determined from the first input relation with an interval determined from the second input relation. The method also includes sampling, with respect to each of one or more of the N dimensions, one or both of the first input relation and the second input relation with respect to an interval size of the interval determined from the corresponding input relation. The method also includes demarcating the N-dimensional input domain into a plurality of non-overlapping N-dimensional domain cells based at least in part on the sampling. The method also includes implementing the two-sided N-dimensional interval join as a query-plan section that includes an N-dimensional band join followed by a filter that applies the interval-join predicate to a band-join output of the N-dimensional band join. The N-dimensional band join includes a hash join that generates a hash-join output that includes all combinations of a row from the first input relation and a row from the second input relation where, in each of the N dimensions, the interval determined from the first input relation and the interval determined from the second input relation both at least partially overlap a common N-dimensional domain cell in the plurality of non-overlapping N-dimensional domain cells.

Yet another example embodiment takes the form of a method that includes receiving, for a query on a database, query instructions that include a two-sided N-dimensional interval join of at least a first input relation and a second input relation, where N is an integer greater than 1. The two-sided N-dimensional interval join has an interval-join predicate that, in each of N dimensions, compares an interval determined from the first input relation with an interval determined from the second input relation. The method also includes implementing the two-sided N-dimensional interval join as a query-plan section that includes an N-dimensional band join that includes a hash join that generates a hash-join output that includes all combinations of a row from the first input relation and a row from the second input relation where, in each of the N dimensions, the interval determined from the first input relation and the interval determined from the second input relation both at least partially overlap a common N-dimensional domain cell in a plurality of non-overlapping N-dimensional domain cells of an N-dimensional input domain. The N-dimensional band join has a band-join output that includes the hash-join output. The query-plan section also includes a deduplication operator positioned after the N-dimensional band join. The deduplication operator is configured to remove any one or more duplicate rows from a potential-duplicates subset of the band-join output. The query-plan section also includes a filter positioned after the deduplication operator. The filter is configured to apply the interval join predicate to a deduplicated version of the band-join output, where the deduplicated version of the band-join output includes an output of the deduplication operator.

As shown by way of example and not limitation in the preceding three paragraphs, one or more embodiments of the present disclosure each take the form of a method that includes multiple operations. One or more other embodiments take the form of systems (e.g., data platforms) that include at least one hardware processor and that also include one or more computer-storage media containing instructions that, when executed by the at least one hardware processor, cause the at least one hardware processor to perform multiple operations (that may or may not correspond to operations performed in a herein-disclosed method embodiment). Still one or more other embodiments take the form of one or more computer-storage media containing instructions that, when executed by at least one hardware processor (of, e.g., a data platform), cause the at least one hardware processor (or the data platform more generally) to perform multiple operations (that, again, may or may not correspond to operations performed in a herein-disclosed method embodiment and/or operations performed by a herein-disclosed system embodiment).

Furthermore, a number of variations and permutations of the above-listed embodiments are described herein, and it is expressly noted that any variation or permutation that is described in this disclosure can be implemented with respect to any type of embodiment. For example, a variation or permutation that is primarily described in this disclosure in connection with a method embodiment could just as well be implemented in connection with a system embodiment (e.g., a data-platform embodiment), a computer-storage-medium embodiment, and/or one or more other types of embodiments. Furthermore, this flexibility and cross-applicability of embodiments is present in spite of the use herein of any slightly different language (e.g., processes, methods, methodologies, steps, operations, functions, and/or the like) to describe and/or characterize such embodiments and/or any element or elements thereof.

FIG. 1 illustrates an example data platform 100, in accordance with at least one embodiment. In various embodiments, the data platform 100 may be used for performing one or more of the operations (e.g., one or more of the methods, processes, and/or the like) that are disclosed herein. As a general matter, in at least some embodiments, the data platform 100 can be referred to using terms such as a cloud-based data warehouse, a network-based data warehouse, or simply a data warehouse. A cloud-based data warehouse is one type of network-based data system that can be used for data analysis and reporting, and that includes a central repository of integrated data from one or more disparate sources. A cloud-based data warehouse is commonly an OLAP database that can store current and historical data that can be used for creating analytical reports for an enterprise based on data stored within databases maintained on behalf of the enterprise. To this end, data warehouses often provide business-intelligence tools, tools to perform extract-transform-load (ETL) tasks for ingesting data into the repository, tools to manage and retrieve metadata, and/or the like. There are other types of cloud-based data warehouses, such as OLTP databases, as well as data warehouses and other data systems that operate with characteristics of multiple types of database systems.

Moreover, any one or more of the components, devices, systems, and/or the like that are depicted in FIG. 1 and in any of the other figures could be implemented as one or more computing devices having an architecture that is similar to the example computing device 1200 that is described below in connection with FIG. 12. Furthermore, two or more of the entities that are depicted in any of the figures could be combined into a single component, and any entity that is depicted as a single component in any of the figures could instead be distributed across multiple components (e.g., distributed across multiple systems, platforms, and/or the like at multiple geographic locations).

Additionally, in various different embodiments, any one or more of the communication links that are depicted in FIG. 1 and in any of the other figures could be implemented via one or more data-communication networks, which may utilize any communication protocol and any type of communication medium. In some embodiments, the data-communication networks are a combination of two or more data-communication networks (or sub-networks) that are coupled to one another. In some embodiments, these communication links are implemented using one or more of any types of communication medium and one or more of any types of communication protocol.

As shown in FIG. 1, the data platform 100 includes a database manager 102, which includes a resource manager 104 and an execution platform 106. The database manager 102 need not be a defined physical device, though it could be, but in general is used herein as shorthand to refer to the combination of the resource manager 104 and the execution platform 106. The execution platform 106 may include one or more execution nodes (e.g., servers, workers, threads, and/or the like). A grouping of execution nodes in the execution platform 106 may be referred to as a virtual warehouse, and such virtual warehouses are, in some embodiments, dynamically scalable to meet dynamically changing demands. Also depicted in FIG. 1 are a metadata storage 108, a storage platform 110 that includes one or more data-storage devices 112, one or more clients 114, and one or more cloud platforms 116. In various different implementations, there could be any number of any of the entities that are shown in FIG. 1.

In some embodiments, all of the entities—other than the one or more cloud platforms 116—that are depicted in FIG. 1 are part of what is referred to herein as the data platform 100, though this is not the case in other embodiments. For example, in at least one embodiment, the data platform 100 does not include any of the one or more clients 114. As another example, in some embodiments, the data platform 100 does not include the storage platform 110. In the embodiments that are primarily described herein to illustrate various examples, the data platform 100 includes the database manager 102 (including the resource manager 104 and the execution platform 106), the metadata storage 108, and the storage platform 110, and does not include any of the one or more clients 114 or any of the one or more cloud platforms 116. As described below and as mentioned above, the storage platform 110 could be implemented in whole or in part on a cloud platform and still be considered part of the data platform 100.

The resource manager 104 may be configured to manage a number of different types of tasks including external database tasks (e.g., query requests) that are received from, e.g., a client 114. The resource manager 104 may be coupled to any number of clients 114. A client 114 may facilitate end users making data-storage and/or data-retrieval requests, system administrators managing the data platform 100, and/or the like. In various different embodiments, a client 114 could be a web interface, a JDBC driver, an ODBC driver, a desktop application, a mobile app, and/or another type of client. As shown in FIG. 1, a client 114 may communicate with the data platform 100 (e.g., the resource manager 104 of the database manager 102) and with one or more cloud platforms 116. A client 114 could reside on a client-side computing device on which the client 114 interacts with one or more client-side applications and on which the client 114 makes use of certain client-side-system resources such as network interfaces, user interfaces, memory (e.g., random access memory (RAM)), and/or the like.

As depicted in FIG. 1, the resource manager 104 is communicatively coupled to the metadata storage 108, which in at least one embodiment is associated with data stored throughout the data platform 100. Indeed, in some embodiments, the metadata storage 108 includes one or more summaries of data available in one or more local caches (of, e.g., the resource manager 104 and/or the execution platform 106), data stored in the storage platform 110, and/or the like. In various embodiments, metadata that reflects the contents of a database, a table, a column, a materialized view, and/or one or more other collections of records or parts of records may be referred to herein as expression properties. Additionally, the metadata storage 108 may include information regarding how data is organized in one or more local caches, one or more storage platforms 110, and/or the like.

Among other uses, the metadata storage 108 may allow systems and services of the data platform 100 to determine whether a given quantum of data needs to be processed (in connection with, e.g., a given query) without loading or accessing the actual stored data. In various embodiments, metadata may reflect the contents of one or more databases, one or more tables, one or more columns, one or more materialized views, and/or one or more other collections of records, parts of records, and/or other data quanta. With respect to where the metadata storage 108 is actually stored, a separate (e.g., local) storage location (e.g., a key-value store) is used in some embodiments, while in other embodiments the metadata storage 108 is maintained by the data platform 100 as a subset of the data stored in the storage platform 110. Other architectures are possible as well.

In the depicted arrangement, the resource manager 104 is also communicatively coupled to the execution platform 106, which may provide multiple computing resources that execute various tasks involving data storage, data retrieval, data analysis (e.g., query processing), and/or the like. In at least one embodiment, the resource manager 104 includes a layer of code (e.g., Java code) that is global with respect to the data platform 100, where that code layer includes instructions for performing functions such as compiling queries and brokering requests to one or more execution nodes in the execution platform 106.

In some embodiments, there exists (i) one or more instances of the execution platform 106 that is or are used for executing client tasks such as database queries and (ii) one or more instances of the execution platform 106 that is or are used for executing internal database tasks such as updating metadata, clustering (e.g., reclustering) tables, generating materialized views, and/or the like. In some such embodiments, there also exists one or more instances of the execution platform 106 that is or are used for feature development and/or testing of the data platform 100, and each such instance of the execution platform 106 may be separate from each client-task instance of the execution platform 106, such that, for example, client-task processing is not impacted by feature-development tasks, data-platform-administration tasks, and/or the like. Other arrangements are possible as well.

The execution platform 106 may be coupled to the one or more data-storage devices 112 that are part of the storage platform 110, which may include (and an execution platform 106 may be capable of communicating with) any number of data-storage devices 112. In some embodiments, one or more of the data-storage devices 112 are cloud-based storage devices located in one or more geographic locations. For example, one or more of the data-storage devices 112 may be part of a public cloud infrastructure or a private cloud infrastructure. One or more of the data-storage devices 112 may be or include hard disk drives (HDDs), solid state drives (SSDs), storage clusters, and/or any other data-storage technology. In some examples, the storage platform 110 includes distributed file systems (such as Hadoop Distributed File Systems (HDFSs)), object storage systems, and/or the like.

As shown in FIG. 1, the storage platform 110, including the one or more data-storage devices 112, is decoupled from the computing resources of the resource manager 104, the execution platform 106, and the database manager 102 generally. In an embodiment, each of one or more data-platform deployments includes a respective storage platform 110 having its own respective one or more data-storage devices. That type of architecture supports dynamic changes made by the data platform 100 based on changing data-storage and/or data-retrieval needs, as well as changing needs of users and systems accessing the data platform 100. The support of dynamic changes allows the data platform 100 to scale quickly in response to changing demands on various different systems and components within the data platform 100. The decoupling of the computing resources of the database manager 102 from the data-storage devices 112 of the storage platform 110 supports the storage of large amounts of data without requiring a corresponding large amount of computing resources. Similarly, this decoupling supports a significant increase in the computing resources utilized at a particular time without requiring a corresponding increase in data-storage resources.

Prior to discussing some query-execution plans (or portions thereof) that are generated and executed in accordance with some example embodiments of the present disclosure, it is useful to define certain functions that are referred to herein as auxiliary functions. The following auxiliary functions take one or more geospatial data objects (represented by g, g1, g2, and the like, and in some cases a distance that is represented as d) as input and return a number, a Boolean value, a geography data object, or another type of returned value, per their definitions below. It is noted that geography data objects are referred to interchangeably herein at times as geospatial objects and at times as geospatial data objects.

An auxiliary function XMIN(g) calculates and returns the minimum x coordinate among all of the one or more points in a geospatial object g. XMIN(g) may then round the result to a level of precision specified by the data platform 100. In one embodiment, that level of precision is given by a fixed number having up to three digits before the decimal point and up to seven digits after the decimal point. Such a number could be stored as an integer in which certain place values in the integer are designated as respectively corresponding to certain place values in a "decimal" number. For example, in a ten-digit integer, the digit furthest left (i.e., the most significant digit could correspond to the hundreds place in the modeled decimal number, the fourth digit from the left in the integer could correspond to the tenths place in the modeled decimal value, and so forth).

Numerous other levels of precision could be used instead, and different levels of precision may be used in different cases within a given embodiment. In a fashion similar to XMIN(g), the auxiliary function XMAX(g) returns the maximum x coordinate of g, YMIN(g) returns the minimum y coordinate of g, and YMAX(g) returns the maximum y coordinate of g. Here and elsewhere in this disclosure, "x" values could be longitude values and "y" values could be latitude values. Moreover, in at least one embodiment, these auxiliary functions are respectively realized by the functions ST_XMIN, ST_XMAX, ST_YMIN, and ST_YMAX in the OGC standards.

An auxiliary function X(g) returns the x coordinate of a point object, if that is what g is—i.e., if, given the rounding conventions of a given embodiment, g can be represented by a single number in the x dimension. In particular, in an embodiment, X(g) returns XMIN(g) if XMIN(g) is equal to XMAX(g), and otherwise returns a null value (e.g., a SQL NULL). An auxiliary function Y(g) may be similarly implemented, mutatis mutandis. In various different embodiments, X(g) and Y(g) return non-null values for points, geospatial collections that contain at least one point, and/or any other geospatial objects (e.g., linestrings, polygons, and/or the like) that are reduced to a single point after rounding in accordance with the rounding convention of the particular implementation.

An auxiliary function ISPOINT(g) is defined such that it returns a Boolean [true] if g maps to a single point after rounding (or without rounding being necessary, etc.). In particular, ISPOINT(g) is defined herein as follows:
 ISPOINT(g):=(XMIN(g)=XMAX(g)) AND
  (YMIN(g)=YMAX(g))
Moreover, NOT ISPOINT(g) is used herein at times to logically invert the result of ISPOINT(g). Thus, if ISPOINT(g) returns [true], NOT ISPOINT(g) returns [false], and vice versa.

This portion of the present disclosure describes adjustments, one or more of which are made in various different embodiments, for Earth domains—be they planar, spherical, ellipsoidal or otherwise—as compared with Cartesian domains. This section starts with the following premise: if a point p is contained in a geospatial object g, then the coordinates of p must be contained in the coordinate range of p is contained in g only if:
 XMIN(g)<=X(p)<=XMAX(g) AND
 YMIN(g)<=Y(p)<=YMAX(g)
(As mentioned above, in this disclosure, in Earth domains, x values are used as shorthand for longitude values and y values are used as shorthand for latitude values.) And while the description below is offered in the context of the above predicate, the below-described adjustments can be made in one or more other predicates that include one or more of auxiliary functions such as X(g), Y(g), XMIN(g), XMAX(g), YMIN(g), YMAX(g), and/or the like.

In some embodiments, the above predicate is at least part of what is used to derive implied predicates for some example geospatial functions. And while the above predicate is true without adjustment in Cartesian domains, adjustments to the above predicate are made in some embodiments in Earth domains at least in the context of geospatial objects that cross the Antimeridian.

As an example, a line segment that roughly goes from Fiji (located approximately at (176, −20) in (longitude, latitude)) to American Samoa (located approximately at (−172, −14)) contains the point (−178, −17), but the above predicate would be false using these numbers. That is, the above predicate would indicate that the example line segment does not include the example point when it actually does. In particular, the first half of this predicate would be false, causing the entire predicate to be false, because, leaving aside longitudes for a moment, the integer −178 is not between the integers −172 and 176, inclusive (although −178 degrees longitude is between −172 degrees longitude and 176 degrees longitude on the shortest earthly path between those two). To account for this, in at least some embodiments, the following adjustment is made:
 If a geospatial object g crosses the
  Antimeridian, then set:
   XMIN(g)=−180 degrees longitude
   XMAX(g)=180 degrees longitude
This adjustment clearly results in the first half of the above predicate being true, since every possible longitude is between −180 degrees longitude and 180 degrees longitude, inclusive.

As for how to determine whether a given geospatial object g crosses the Antimeridian, in at least one embodiment, the Antimeridian is represented as a linestring, and a standard geospatial library function such as ST_Intersects is used to determine whether g ST_Intersects (i.e, crosses) the linestring that represents the Antimeridian. As a first example, the Antimeridian could be represented as two line segments: a first line segment extending from the point (180, 90) (i.e., the geographic North Pole) to the point (180, 0) (i.e., the intersection of the Antimeridian and the Equator) and a second line segment extending from the point (180, 0) to the point (180, −90) (i.e., the geographic South Pole). As a second example, the Antimeridian could be represented as three line segments: a first extending from the point (180, 90) to the point (180, 30), a second extending from the point (180, 30) to the point (180, −30), and a third extending from the point (180, −30) to the point (180, −90). Other sets of linestrings could be used as well. In any one or more of those points, −180 degrees longitude could be substituted for 180 degrees longitude, as those are equivalent.

In at least one embodiment, as a preprocessing step prior to executing a given interval join, the database manager 102 tests the geography data objects from the left-side relation and the geography data objects from the right-side relation using a function such as:
 ST_Intersects(g, Antimeridian_linestring)
where:
 g is a given geography data object; and
 Antimeridian_linestring may be defined in one of the
  example ways listed above or another equivalent way.

By convention, in at least some embodiments, no geospatial objects cross the poles. If a data set does not observe this convention, the database manager 102 may make an equivalent adjustment (and preprocessing operation) in they dimension, i.e., for geography data objects that are determined to cross one or both of the poles, the following adjustment is made:

YMIN(g)=−90 degrees

YMAX(g)=90 degrees

Figure 2:
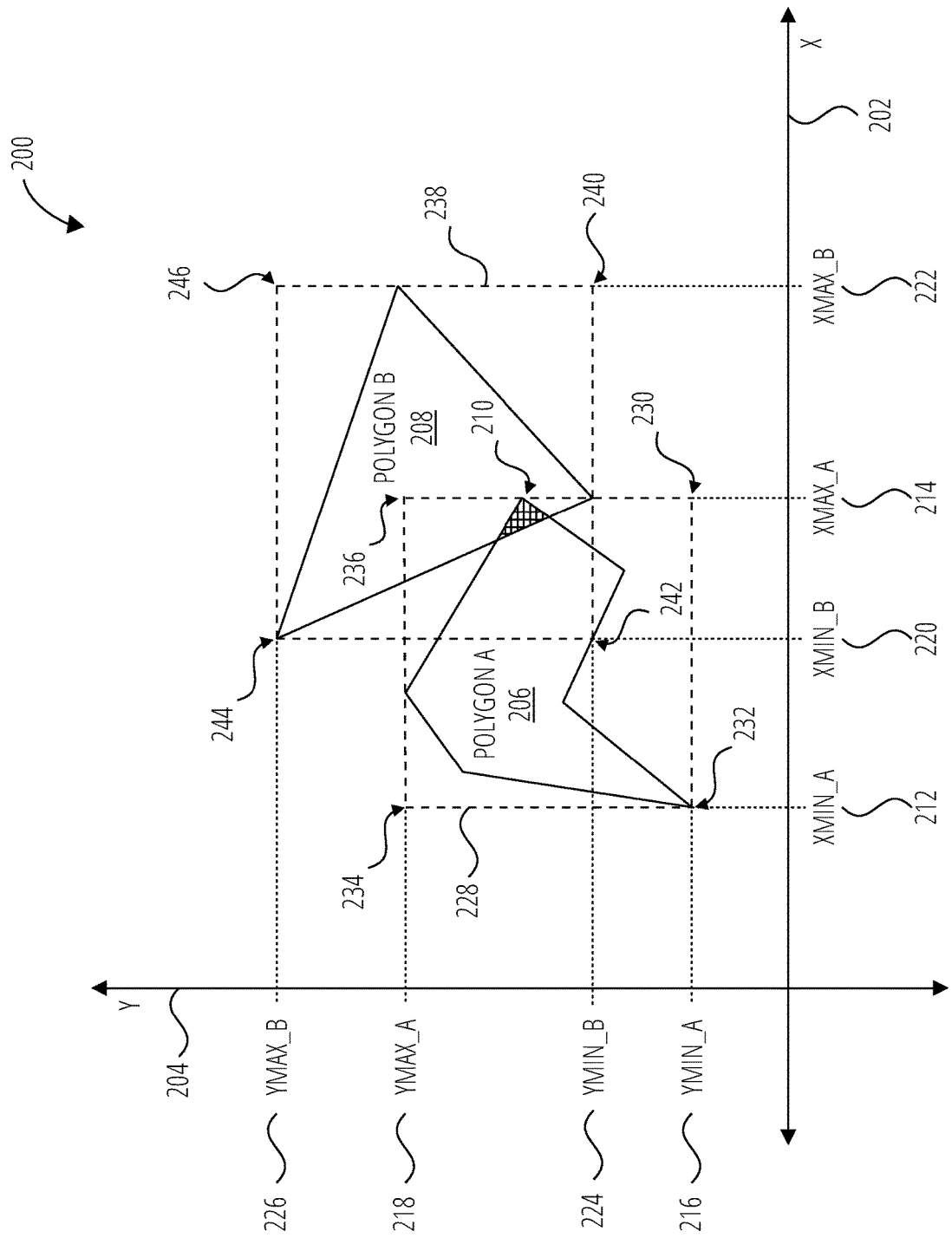
FIG. 2 illustrates a first example polygon map depicting overlap of two example geography data objects, in accordance with at least one embodiment.

As described above, in some embodiments of the present disclosure, metadata (also referred to as expression properties) is maintained by the data platform 100 in the metadata storage 108, where that metadata may include expression properties for respective rows, columns, and/or the like. Moreover, the present systems and methods are applicable to multiple domains other than those discussed herein. Some example such domains include Cartesian coordinates on the Earth's surface from a predefined origin (i.e., "eastings and northings") and also include Cartesian coordinates in a predefined plane, such as on a microchip or in a warehouse, as examples FIG. 2 illustrates an example polygon map 200 depicting overlap of two example geography data objects, in accordance with at least one embodiment. In the embodiments that are primarily described herein, a first pass at determining whether two polygons intersect one another examines whether the bounding boxes of the polygons intersect each other. Other approaches could be used as well for an initial or intermediate pass through the data, including determining whether or not the two polygons both overlap (to at least some extent) a same grid square in a Cartesian coordinate system (or a same curved section defined by, e.g, at least two {longitude, latitude} points serving as, e.g., southwest and northeast corners of the curved section). This description of FIG. 2 describes two geography data objects—both polygons in this example—that actually do intersect (and whose bounding boxes therefore must intersect one another, which they do).

The two example polygons that are depicted in FIG. 2 are a polygon A 206 and a polygon B 208. It can be seen in FIG. 2 that the polygon A 206 has a bounding box 228 that is defined by corners 230, 232, 234, and 236. It can also be seen that the polygon B 208 has a bounding box 238 that is defined by corners 240, 242, 244, and 246. The bounding boxes 228 and 238 have sides that correspond (e.g., exactly, or approximately with a small buffer around the respective polygon, etc.) to the minimum x, maximum x, minimum y, and maximum y values for the polygon A 206 and the polygon B 208, respectively. For the polygon A 206, those values are denoted on FIG. 2 as XMIN_A 212, XMAX_A 214, YMIN_A 216, and YMAX_A 218. For the polygon B 208, those values are denoted on FIG. 2 as XMIN_B 220, XMAX_B 222, YMIN_B 224, and YMAX_B 226.

Thus, the polygon map 200 illustrates, in a Cartesian domain having an x axis 202 and a y axis 204, two example geography data objects that would satisfy both the geospatial-join predicate ST_Intersects(polygon A 206, polygon B 208) and the following predicate that is implied by that geospatial-join predicate:

XMIN(polygon A 206)<=XMAX(polygon B 208) AND

XMIN(polygon B 208)<=XMAX(polygon A 206) AND

YMIN(polygon A 206)<=YMAX(polygon B 208) AND

YMIN(polygon B 208)<=YMAX(polygon A 206)

The four sides of the bounding box 228 of the polygon A 206 are:

a bottom side that runs from XMAX_A 214 to XMIN_A 212 at YMIN_A 216;

a left side that runs from YMIN_A 216 to YMAX_A 218 at XMIN_A 212;

a top side that runs from XMIN_A 212 to XMAX_A 214 at YMAX_A 218; and a right side that runs from YMAX_A 218 to YMIN_A 216 at XMAX_A 214.

Similarly, the four sides of the bounding box 238 of the polygon B 208 are:

a bottom side that runs from XMAX_B 222 to XMIN_B 220 at YMIN_B 224;

a left side that runs from YMIN_B 224 to YMAX_B 226 at XMIN_B 220;

a top side that runs from XMIN_B 220 to XMAX_B 222 at YMAX_B 226; and a right side that runs from YMAX_B 226 to YMIN_B 224 at XMAX_B 222.

In an example, for a given combination of rows, one from a first (e.g., left-side) relation and the other from a second (e.g., right-side) relation, the polygon A 206 could be an example of a left.g object that intersects a right.g object, where that right.g object could be represented by the polygon B 208. As can be visually appreciated in FIG. 2, the polygon A 206 and the polygon B 208 do satisfy the following implied above-listed implied predicate:

XMIN(left.g)<=XMAX(right.g) AND

XMIN(right.g)<=XMAX(left.g) AND

YMIN(left.g)<=YMAX(right.g) AND

YMIN(right.g)<=YMAX(left.g)

in that each of the following is true:

XMIN_A 212<=XMAX_B 222;

XMIN_B 220<=XMAX_A 214;

YMIN_A 216<=YMAX_B 226; and

YMIN_B 224<=YMAX_A 218.

Moreover, it can also be seen that the polygon A 206 and the polygon B 208 also satisfy the geospatial-join predicate:

ST_Intersects(polygon A 206, polygon B 208)

in that the polygon A 206 and the polygon B 208 do actually overlap, in this example in a region that is referred to as a polygon-intersection region 210. As described more fully below, in at least one embodiment, and using the polygon map 200 as an example context, a hash equality join (and its associated preprocessing operators) may be used to identify a number of xy cells (e.g., squares, rectangles, hexagons, etc. on the Cartesian plane) in which the actual polygon A 206 and polygon B 208 might actually overlap. Such analysis may involve identifying a set of one or more xy cells that are each occupied to at least some extent by both (i) the bounding box 228 of the polygon A 206 and (ii) the bounding box 238 of the polygon B 208.

After those candidate xy cells are identified and output from the interval join as part of its output relation (with each such candidate xy cell being in a row that identifies both the polygon A 206 and the polygon B 208), the data platform 100 may remove duplicate rows if and as necessary from that output relation. In the case of these two example polygons, two or more duplicate rows may each identify the polygon A 206 and the polygon B 208 as potentially overlapping, and may differ at least (or only) with respect to the particular candidate xy cell that is identified in each respective one of those duplicate rows.

In some embodiments, the identifiers of particular xy cells are dropped during or after the hash join—as such, in at least some embodiments, the "duplicate" rows for a given pair of polygons are identical to one another. The one row that survives the deduplication process (if needed) is submitted in at least one embodiment to a filter that applies an actual complex geospatial function such as ST_Intersects to the polygon A 206 and the polygon B 208 to determine whether they do, in fact, intersect. The deduplication, specifically the deduplication before the filter, is advantageous for at least the reason that ST_Intersects only needs to evaluate the pair (polygon A 206, polygon B 208) one time for possible intersection. Any additional times would simply wastefully arrive at the same answer.

Figure 3:
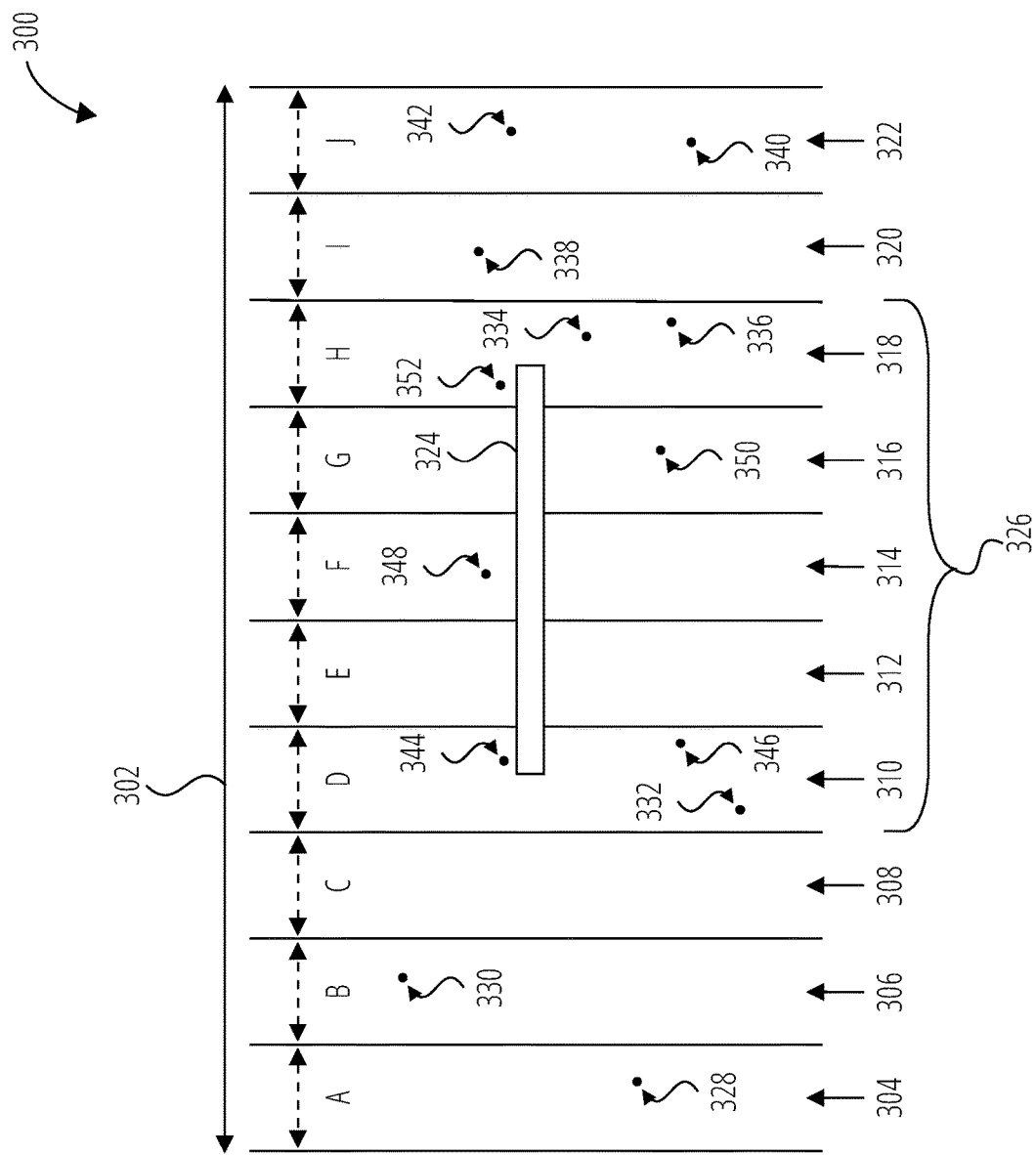
FIG. 3 illustrates an example one-dimensional band map, in accordance with at least one embodiment.

FIG. 3 illustrates an example one-dimensional band map 300, in accordance with at least one embodiment. The band map 300 is presented to illustrate, in one dimension, the interrelationship among (i) a set of bands that collectively spans an example input domain 302, (ii) an example interval 324 in that domain, (iii) a number of intersected bands 326 that are overlapped at least in part by the example interval 324, (iv) a number of data points that fall outside of the intersected bands 326, (v) a number of data points that fall inside the interval 324 (and also naturally inside the intersected bands 326), and, lastly, (vi) a number of data points that fall inside the intersected bands 326 but outside the interval 324.

The input domain 302 is divided into ten example uniform bands designated band A 304, band B 306, band C 308, band D 310, band E 312, band F 314, band G 316, band H 318, band I 320, and band J 322. The interval 324 intersects (i.e., at least partially overlaps) five bands: band D 310, band E 312, band F 314, band G 316, and band H 318. The interval 324 overlaps all of band E 312, band F 314, and band G 316, and only partially overlaps each of band D 310 and band H 318.

The band map 300 includes five points that are outside of the intersected bands 326: the points 328, 330, 338, 340, and 342. Those five points are examples of what are referred to in the present disclosure as "true negatives" in that they are not overlapped by the interval 324, nor are they even considered as potentially being in the interval 324, because they are located in bands that are not even partially overlapped by the interval 324.

Second, the band map 300 shows five points as being within the interval 324: the points 344, 346, 348, 350, and 352. These are examples of what are referred to in the present disclosure as "true positives" in that these points are determined to be potentially overlapping the interval 324 due to their location being inside the intersected bands 326, and they are in fact also within the interval 324.

Lastly, the band map 300 shows three points (332, 334, and 336) that lie within one of the intersected bands 326 but not within the interval 324. These are examples of what are referred to in the present disclosure as "false positives" in that these points are determined to be potentially overlapping the interval 324 but are not actually within the interval 324. As is explained more fully below including in connection with FIG. 8, the present disclosure extends the one-dimensional concepts that are depicted in FIG. 3 into two-dimensions. In at least one embodiment, this extension involves also overlaying a number of bands that divide the input domain vertically as well as horizontally, resulting in a unique cell formed by each unique intersection of a vertical band and a horizontal band.

Figure 4:
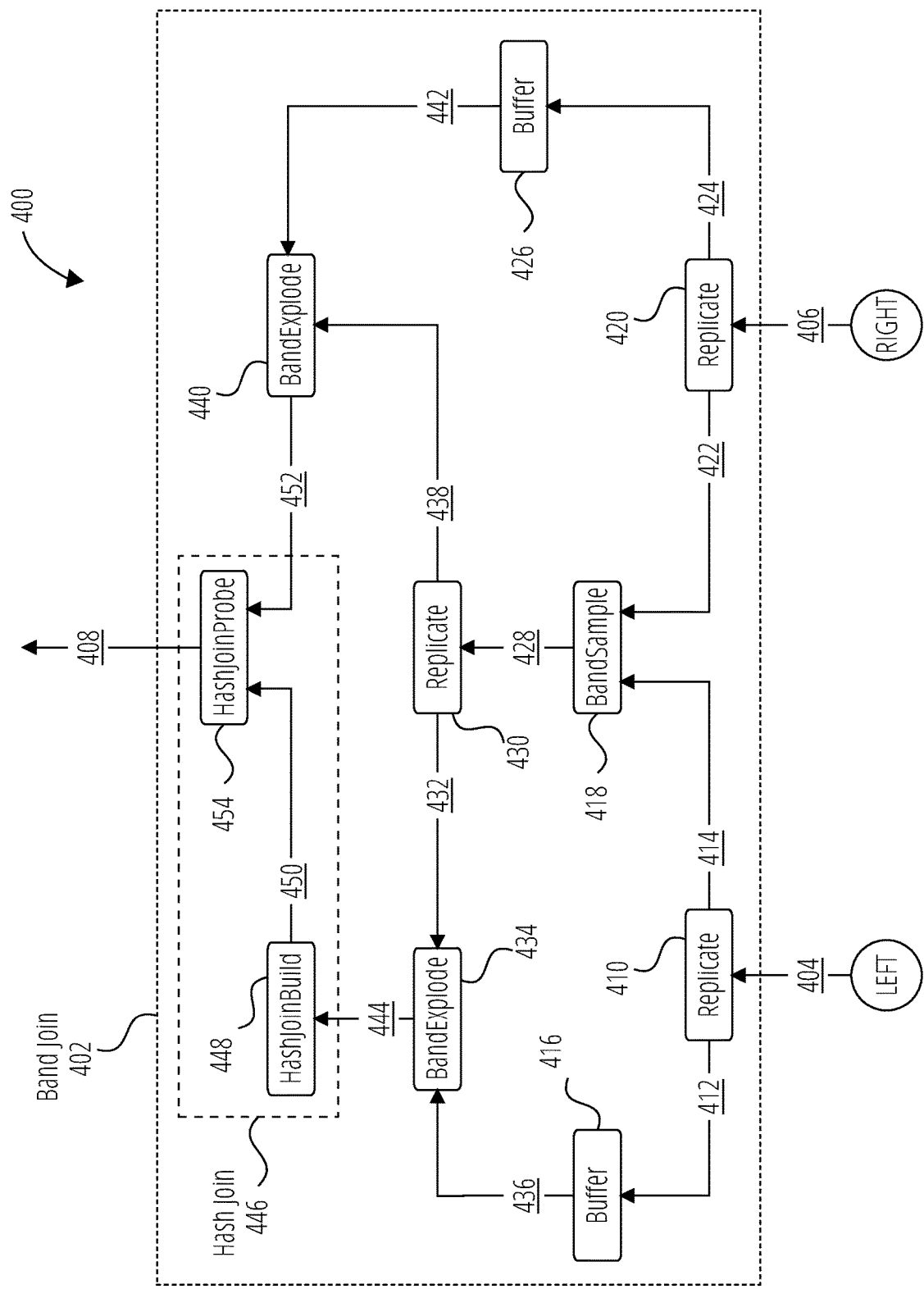
FIG. 4 illustrates a first example query-execution plan, in accordance with at least one embodiment.

FIG. 4 illustrates an example query-execution plan 400, in accordance with at least one embodiment. The query-execution plan 400 includes a left-side relation 404 and a right-side relation 406 that are received by what is referred to herein as the band join 402. The band join 402 produces as its output a relation that is referred to herein as the band-join output 408. The band join 402 includes a hash join 446 and also includes a number of operators that are not within the hash join 446. In some embodiments, those other operators are collectively referred to as preprocessing logic, though that is not labeled as such in FIG. 4. The above-described city-and-lake example of a two-sided two-dimensional interval join is used as an example context for describing the query-execution plan 400. Also, it is noted that, in the present disclosure, a "query-execution plan" is a flexible term that can apply to an entire query-execution plan that is used to process a given query from start to finish, a portion (e.g., section, subsection, etc.) of such a query-execution plan, and/or the like.

As can be seen in FIG. 4, the left-side relation 404 is duplicated by a left-side replication operator 410, which delivers a first left-side-relation instance 412 to a left-side buffer 416, and which also delivers a second left-side-relation instance 414 to a band-sample operator 418. In the present disclosure, "replicate" operators duplicate their input one or more times, outputting multiple instances of that input. The right-side relation 406 is duplicated by a right-side replication operator 420, which delivers a first right-side-relation instance 422 to the band-sample operator 418, and which also delivers a second right-side-relation instance 424 to a right-side buffer 426. In at least one embodiment, the first left-side-relation instance 412 and the second right-side-relation instance 424 remain in their respective buffers 416 and 426 while the band-sample operator 418 is conducting its sampling and band-size-selection functions as described herein. This may be referred to as a synchronization point.

In at least one embodiment, once the band-sample operator 418 has selected a band size in both the x and y directions, together determining a selected cell size in the xy plane, the band-sample operator 418 outputs that information in a band-sample output 428. A post-band-sample replication operator 430 then duplicates the band-sample output 428 and sends a first band-sample-output instance 432 to a left-side band-explode operator 434, and also sends a second band-sample-output instance 438 to a right-side band-explode operator 440. It is noted that, while the x band size (and thus the x dimension of each cell in a uniform-x-band-width embodiment) can be different than they band size (and thus the y dimension of each cell in a uniform-y-band-height embodiment), both band-explode operators 434, 440 use the same band sizes (and boundaries) on a per-dimension basis.

In addition to the first band-sample-output instance 432, the left-side band-explode operator 434 also receives a left-side-buffer output 436 (that is substantively the first left-side-relation instance 412, which is substantively the left-side relation 404). Similarly, in addition to the right-side-buffer output 442, the right-side band-explode operator 440 also receives, from the right-side buffer 426, a right-side-buffer output 442 (that is substantively the second right-side-relation instance 424, which is substantively the right-side relation 406). The respective band-explode operators 434 and 440 conduct the herein-described explosion function. In at least one embodiment, this involves outputting one or more instances of each row of its input relation, where that number of instances is equal to the number of cells that are overlapped by its respective (city or lake) polygon. If a polygon overlaps only one cell, then the band-explode operator 434, 440 just includes that corresponding row in its output. If a polygon overlaps, for example, 8 cells, then the band-explode operator 434, 440 makes 7 copies of the corresponding row and outputs all 8 instances of that row. And so on.

The left-side band-explode operator 434 outputs an exploded left-side relation 444 to a hash-join-build operator 448 of the hash join 446, and the right-side band-explode operator 440 outputs an exploded right-side relation 452 to a hash-join-probe operator 454 of the hash join 446. The hash-join-build operator 448 outputs a hash-join-build output 450 to the hash-join-probe operator 454, which then outputs the band-join output 408, which, in the depicted embodiment, is the output of the hash join 446 in addition to being the overall output of the band join 402.

Figure 5:
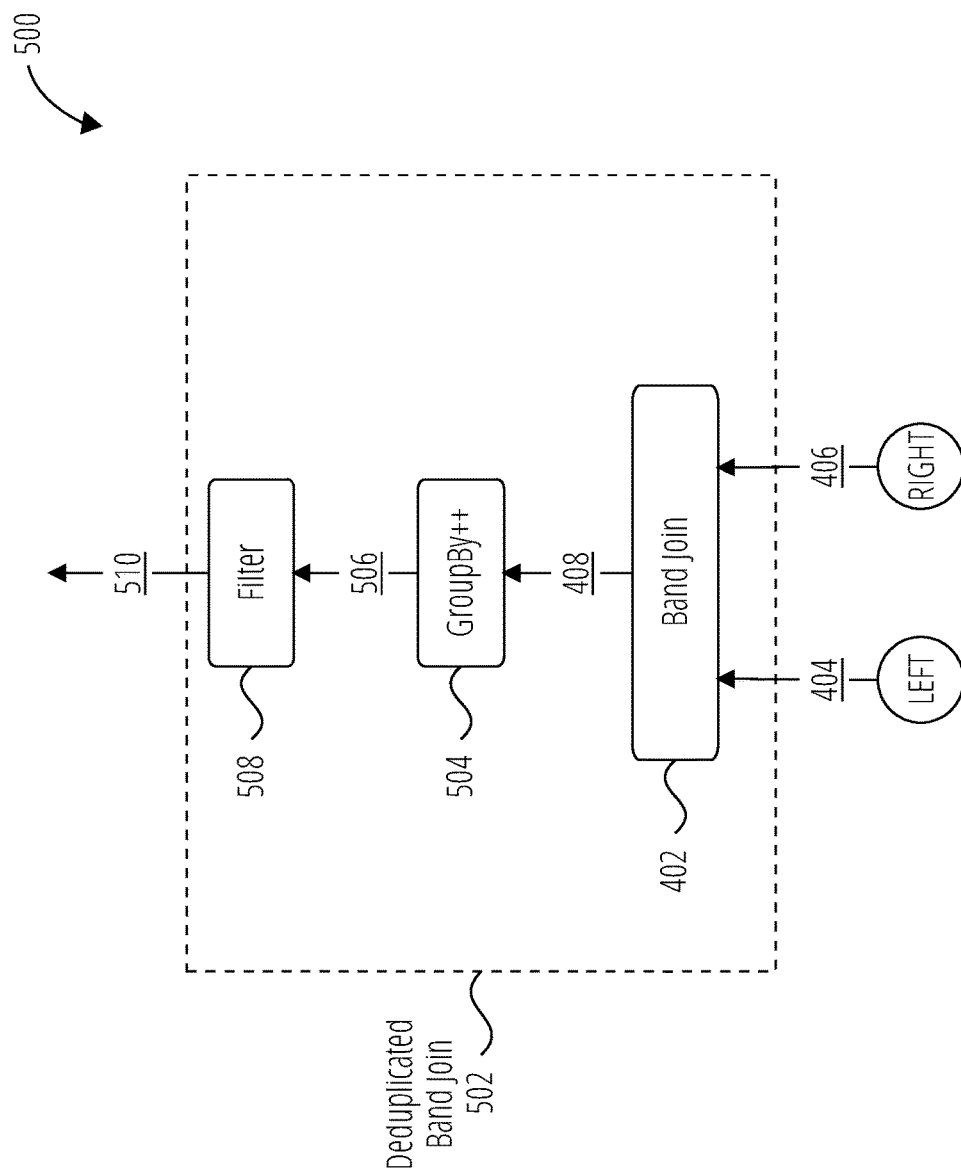
FIG. 5 illustrates a second example query-execution plan, in accordance with at least one embodiment.

FIG. 5 illustrates a second example query-execution plan 500, in accordance with at least one embodiment. FIG. 5 is much simpler than FIG. 4, as the entire band join 402 that is described above is encapsulated in a single visual element in FIG. 5. As can be seen in FIG. 5, just as is the case in FIG. 4, the band join 402 takes the left-side relation 404 and the right-side relation 406 as inputs and produces the band-join output 408 as its output.

The query-execution plan 500 shows what is referred to herein as a deduplicated band join 502. The band-join output 408 of the band join 402 is passed to an enhanced group-by operator 504, which then outputs an enhanced-group-by output 506 to a filter 508. The filter 508 may apply the actual join predicate of the interval join that was the basis to construct the band join 402, for example. The filter 508 may output a deduplicated-band-join output 510. The function of the enhanced-group-by operator 504 is generally to remove, from the band-join output 408, any rows that are duplicates with respect to the combination of a given row from the left-side relation 404 and the right-side relation 406. In some embodiments, the enhanced-group-by operator 504 divides the band-join output 408 into two disjoint relations: one that may include duplicate rows and one that does not, and then performs the deduplicating group-by operation on only the former while the latter bypasses that computationally expensive operation on its way to the filter 508. This manner of disjoint processing in at least one embodiment is further described below in connection with FIG. 6.

Figure 6:
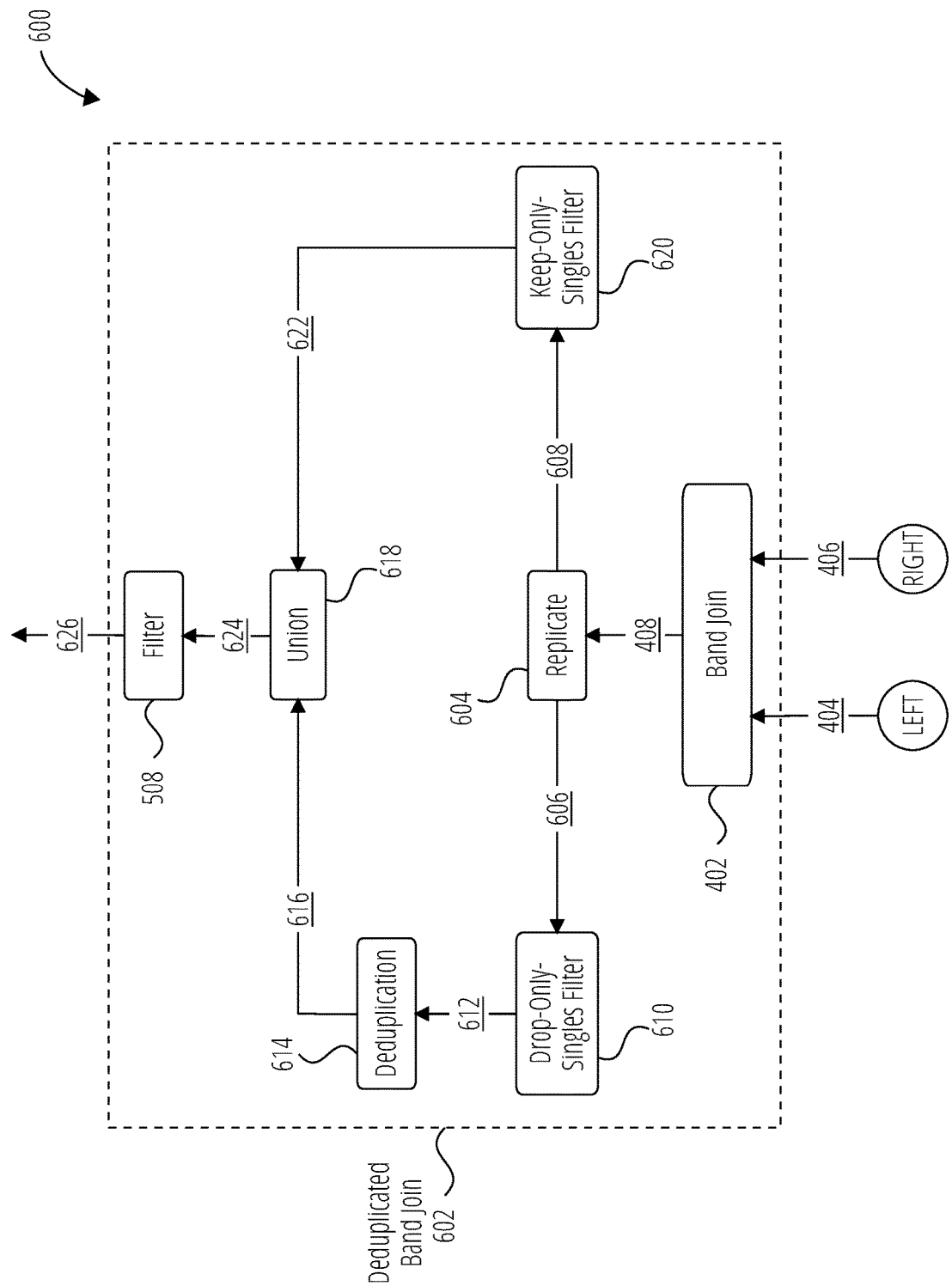
FIG. 6 illustrates a third example query-execution plan, in accordance with at least one embodiment.

FIG. 6 illustrates an example query-execution plan 600, in accordance with at least one embodiment. In the query-execution plan 600, a deduplicated band join 602 is displayed. Similar to the deduplicated band join 502, the deduplicated band join 602 includes the band join 402 receiving the left-side relation 404 and the right-side relation 406, and generating the band-join output 408. In the deduplicated band join 602, the band-join output 408 is duplicated by a replication operator 604, which outputs (i) a first band-join-output instance 606 to a filter that is referred to herein as a drop-only-singles filter 610 and (ii) a second band-join-output instance 608 to a filter that is referred to herein as a keep-only-singles filter 620.

In at least one embodiment, the deduplicated band join 602 sends only those rows from the band-join output 408 that might need deduplication to a deduplication operator 614; in the embodiment that is depicted in FIG. 6, such rows are sent to the deduplication operator 614 as a drop-only-singles-filter output 612 of the drop-only-singles filter 610. Furthermore, in at least one embodiment, all other rows from the band-join output 408, none of which will need deduplication, are output as a keep-only-singles-filter output 622 of the keep-only-singles filter 620.

The reader will recall that, in at least one embodiment, each row of the band-join output 408 includes two of what are referred to herein at times as "exploded rows," where one of the exploded rows comes from the exploded left-side relation 444 and the other exploded row comes from the exploded right-side relation 452. In at least one embodiment, each "exploded row" is a modified (e.g., augmented) version of a "source row," which is a term that is used herein at times to refer to a row in either of the two input relations—i.e., a row from the left-side relation 404 or a row from the right-side relation 406. Thus, the left-side relation 404 supplies the source rows for the exploded left-side relation 444, and the right-side relation 406 supplies the source rows for the exploded right-side relation 452. In an example embodiment, each exploded row may be augmented with two values, examples of which are described below.

The first such value may be a cell_ID of a cell that at least partially overlaps, in each of the 2 dimensions of the current example (and, more generally, in each of the N dimensions of a given implementation), an interval that is determined from the exploded (and/or corresponding source) row. In various different embodiments, a given interval may be "determined" from a given relation (e.g., from a given row in a given relation) in a number of different ways, some examples of which are listed in the next paragraph.

In some cases, the given relation explicitly includes both minimum (e.g., starting) and maximum (e.g., ending) values that specify the given interval. In other implementations, a given relation may include a single column that gives a minimum (or maximum, or middle, etc.) value of a given interval along with an interval size, and either the other end or both ends of the interval could be determined using such values. In other cases, an interval in a given dimension may be determined from a given relation by using one or more functions on one or more columns of the given relation—for example, a longitude interval of a given geography data object "g" could be determined using a pair of functions such as XMIN(g) and XMAX(g). And certainly numerous other examples could be listed here and will occur to those of skill in the art having the benefit of the present disclosure.

The second such value may be what is referred to herein at times as an "explosion indicator," such as the above-described "rowInstances" integer indicator or a Boolean indicator (named, e.g., "rowDuplicated")—as examples. As described herein, each of those two indicator options indicate, at a minimum, whether a given exploded row is (i) the only exploded row corresponding to its source row or (ii) one of multiple exploded rows corresponding to its source row. In the present disclosure, every row in an exploded relation—e.g., every row in the exploded left-side relation 444 and every row in the exploded right-side relation 452—is referred to as an "exploded row" irrespective of whether that row is, in that exploded relation, the only instance or one of multiple instances of its corresponding source row.

Focusing again now on an example embodiment that employs the above-described "rowInstances" explosion indicator, each row from the exploded left-side relation 444 and each row from the exploded right-side relation 452 includes, in its respective "rowInstances" attribute, an integer that is either equal to 1 or greater than 1. In at least one embodiment, these rowInstances integer values are added into the exploded left-side relation 444 and into the exploded right-side relation 452 by the left-side band-explode operator 434 and the right-side band-explode operator 440, respectively. Each such rowInstances integer indicates the number of instances of the corresponding source row of that exploded row that is or are present in that exploded relation. As such, each non-duplicated row has its rowInstances value set equal to 1, and each duplicated row and each duplicate (i.e., copy) thereof has its rowInstances value set to an integer that is greater than 1.

Continuing the above description of an example embodiment with reference back to FIG. 6, the drop-only-singles filter 610 keeps, in its drop-only-singles-filter output 612, only those rows from the first band-join-output instance 606 in which each of the two rowInstances values is greater than 1, and drops (e.g., silently discards) all other rows. Conversely, in at least one embodiment, the keep-only-singles filter 620 keeps, in its keep-only-singles-filter output 622, only those rows from the second band-join-output instance 608 in which at least one of the two rowInstances values is equal to 1, and drops all other rows.

As an alternative, as mentioned above, a Boolean column—named, e.g., "rowDuplicated"—is used in at least one embodiment instead of a row-instance-count column such as "rowInstances." In at least one such embodiment, the drop-only-singles filter 610 keeps only those rows from the first band-join-output instance 606 in which each of the two rowDuplicated values is [true], whereas the keep-only-singles filter 620 keeps only those rows from the second band-join-output instance 608 in which at least one of the two rowDuplicated values is [false]. And certainly other manners of implementing an intelligent split such as or similar to that described here could be used.

Returning to the present example in which the row-instance-count column "rowInstances" is used, it can be seen that there is both a left-side path and a right-side path between the replication operator 604 and a union operator 618. On the left-side path, which is also referred to herein as the "deduplication path," the drop-only-singles filter 610 outputs the drop-only-singles-filter output 612 (i.e., the potential non-singles—also referred to herein as the "potential-duplicates subset" of the band-join output 408) to the deduplication operator 614, which performs its deduplication function, an example of which is described more fully below, and outputs a deduplication-operator output 616 to the union operator 618. The deduplication-operator output 616 is a relation that is light any one or more duplicate rows that were in the drop-only-singles-filter output 612.

On the right-side path, which is also referred to herein as the "bypass path," the keep-only-singles filter 620 outputs the keep-only-singles-filter output 622 to the union operator 618. In at least one embodiment, the union operator 618 forwards all rows it receives from both the deduplication-operator output 616 and the keep-only-singles-filter output 622 as its output, which is referred to here as the union-operator output 624. In the embodiment that is depicted in FIG. 6, the filter 508 takes the union-operator output 624 as its input and generates the deduplicated-band-join output 626 as its output.

With respect to its above-mentioned deduplication function, in at least one embodiment, the deduplication operator 614 uses, as its key for deduplicating, a 2-tuple of a left-relation row identifier ("rowID") and a right-relation rowID among the rows in the drop-only-singles-filter output 612. This 2-tuple can be used as a deduplication key in at least one embodiment because, in the drop-only-singles-filter output 612, each exploded row that is one of multiple instances of its corresponding source row will have matching values in their respective 2-tuple of left-relation rowID and a right-relation rowID. These rowIDs are described here by way of example as being row numbers, though any suitable set of identifiers—each of which is unique at least within its own exploded relation—could be used as rowIDs.

In some embodiments, the two-sided two-dimensional join—of which the band join 402 is generated to implement a part—is a two-sided two-dimensional interval join that has an interval-join predicate that is implied by a complex geospatial function such as ST_Intersects. That complex geospatial function may be included in a geospatial join predicate of a geospatial join. In other embodiments, an intermediate implied interval join is not generated, and it is that geospatial join itself that is the join of which the band join 402 is generated to implement a part.

In either or both of the two types of embodiments that are described in the preceding paragraph, the (possibly deduplicated) output of the band join may be processed by a filter that applies the complex geospatial function itself. In particular, such a filter may apply the complex geospatial function (e.g., ST_Intersects) to the geography data objects that are referenced in the aforementioned geospatial-join predicate. In such an embodiment, and referencing back to an earlier-presented example scenario, it is the output of that filter that would include the list of cities and lakes that geographically overlap in the example state. Such an example is described below in connection with FIG. 7.

During processing in this described example, in which ST_Intersects is applied to a two-dimensional polygon in the left-side relation 404 and a two-dimensional polygon in the right-side relation 406, all (unquestionably) true negatives are removed by the hash join 446. The unquestionably true negatives in this example are any combinations of an exploded row from the exploded left-side relation 444 and an exploded row from the exploded right-side relation 452 in which the two polygons have bounding boxes that do not overlap, even in part, even a single common cell in the input domain. In operation, the hash join 446 discards any such pair of exploded rows.

Furthermore, any remaining false positives are removed by application of the complex geospatial function ST_Intersects by a geospatial-predicate filter 704, the workload of which is preemptively lightened by the pruning of duplicate rows from the band-join output 408 that is conducted by the deduplication operator 614. What remains are the true positives: the combinations of an exploded row from the exploded left-side relation 444 and an exploded row from the exploded right-side relation 452 in which the two polygons actually overlap, or at least that result in ST_Intersects returning [true].

Figure 7:
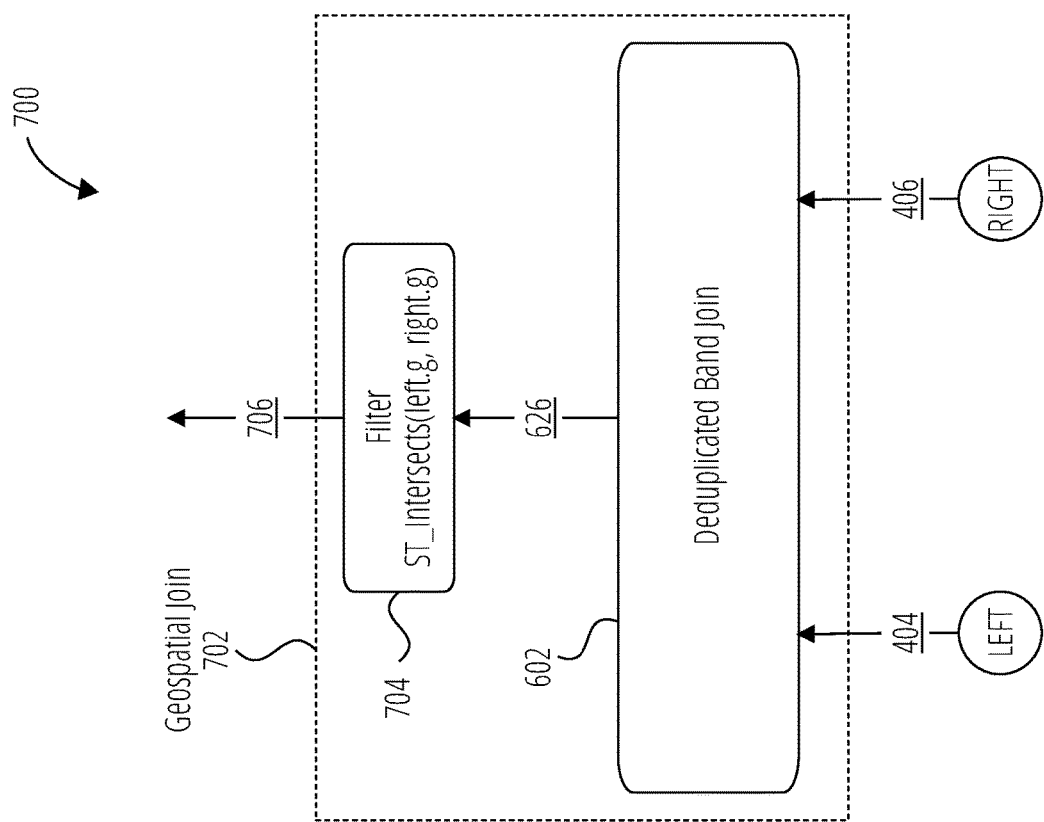
FIG. 7 illustrates a fourth example query-execution plan, in accordance with at least one embodiment.

FIG. 7 depicts an example query-execution plan 700, in accordance with at least one embodiment. The query-execution plan 700 includes what is referred to in FIG. 7 as a geospatial join 702, which could have a geospatial-join predicate that includes the geospatial function ST_Intersects that is described herein in connection with a number of examples, including the city-and-lakes example discussed above in connection with FIG. 6 (and prior to that).

As shown in FIG. 7, the geospatial join 702 takes the left-side relation 404 and the right-side relation 406 as its input relations and outputs a geospatial-join output 706. Furthermore, the geospatial join 702 includes the deduplicated band join 602 and the above-mentioned geospatial-predicate filter 704. In FIG. 7, as is the case in FIG. 6, the deduplicated band join 602 takes the left-side relation 404 and the right-side relation 406 as its input relations. Furthermore, in FIG. 7, as is also the case in FIG. 6, the deduplicated band join 602 generates the deduplicated-band-join output 626, which is then taken as an input relation by the geospatial-predicate filter 704. The geospatial-predicate filter 704 outputs the above-mentioned geospatial join output 706 as its output (i.e., as the output of the 704) and as the output of the geospatial join 702 as well.

Figure 8:
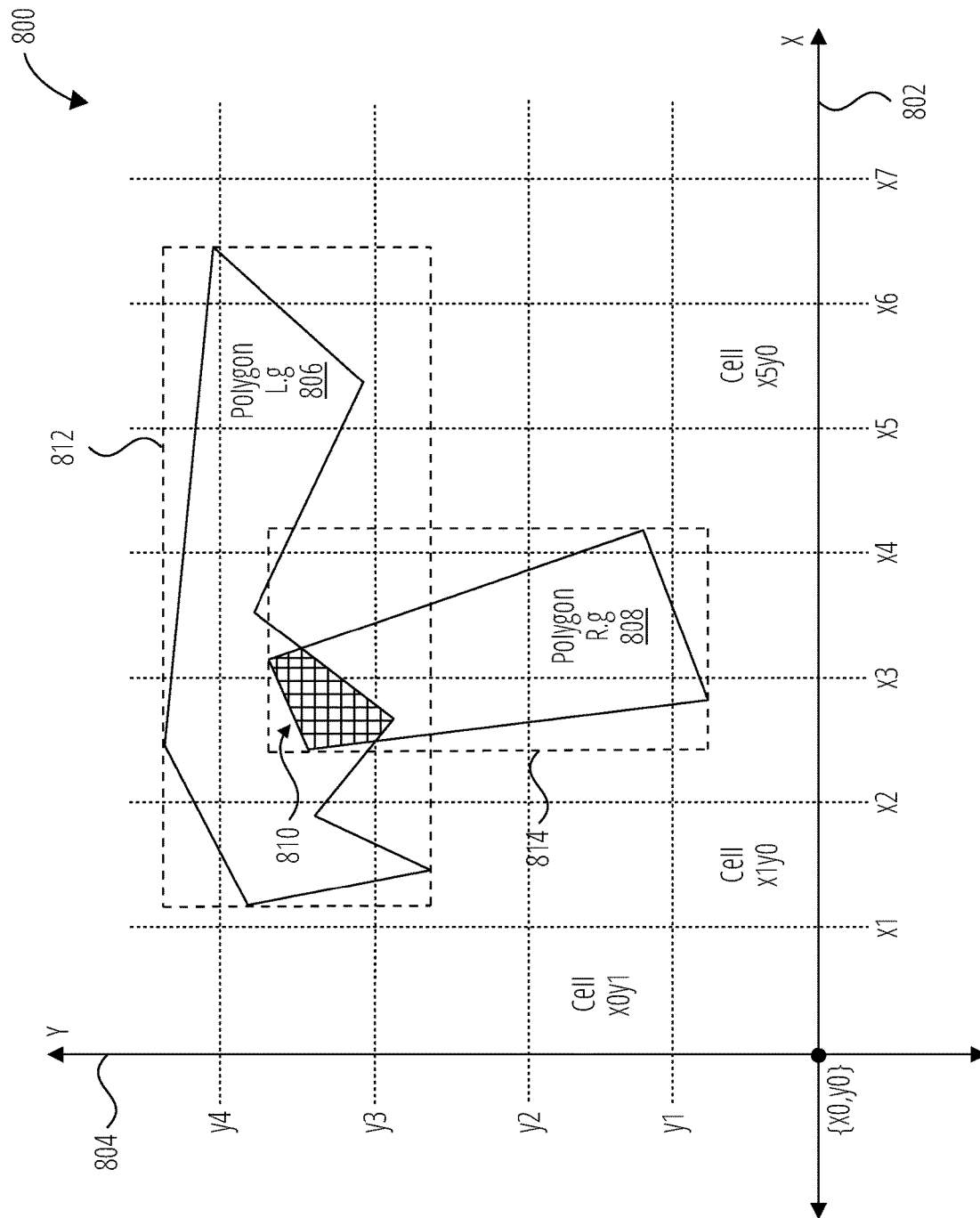
FIG. 8 illustrates a second example polygon map depicting overlap of two example geography data objects, in accordance with at least one embodiment.

FIG. 8 illustrates an example polygon map 800 depicting overlap of two example geography data objects, a polygon L.g 806 and a polygon R.g 808, in accordance with at least one embodiment. Other than what are perhaps odd shapes for a city and a lake, respectively, the polygon map 800 can be viewed as illustrating an example city polygon (the polygon L.g 806) from a given row of the left-side relation 404 and an example lake polygon (the polygon R.g 808) from an example row of the right-side relation 406.

Considering FIG. 8 to be an overhead view and for north to be up, it can be appreciated that FIG. 8 is another example in which x and y values are used as shorthand for longitude and latitude values, respectively. The polygon map 800 includes an x axis 802 and a y axis 804. The polygon map 800 further includes, as described, two example geography data objects that would satisfy a geospatial-join predicate such as:

ST_Intersects(polygon L.g 806, polygon R.g 808)

as well as a test as described herein that evaluated whether or not a bounding box 812 of the polygon L.g 806 and a bounding box 814 of the polygon R.g 808 both occupy at least one common xy cell among the xy cells in the polygon map 800. The polygon L.g 806 and the polygon-intersection region 810 are also shown as having a polygon-intersection region 810 at which the polygon L.g 806 and the polygon R.g 808 actually intersect.

In an example scenario, the polygon L.g 806 is from an example row L.row55 from the left relation, and the polygon R.g 808 is from an example row R.row99 from the right relation. The identifiers "row55" and "row99" are example arbitrary rowIDs that the relations may have in some embodiments. One additional point about FIG. 8 and this description of FIG. 8 is that particular cells in the input domain are referenced using a notation such as the displayed cell x0y1, cell x1y0, and cell x5y0. In this notation, the point coordinate of the lower-left (i.e., southwest) corner of the corresponding cell is used as a basis for the label of the cell.

As can be seen in FIG. 8, a left-side band-explode operator would determine in this example that the bounding box 812 of the polygon L.g 806 intersects with—i.e., overlaps at least in part (or, equivalently, is overlapped at least in part by)—the following 15 cells: x1y2, x1y3, x1y4, x2y2, x2y3, x2y4, x3y3, x3y4, x4y3, x4y4, x5y3, x5y4, x6y2, x6y3, and x6y4. This means that the explosion factor for that row of the right relation would be 15, and that 15 instances of row L.row55 would be included in the output of that left-side band-explode operator and sent to the hash join. Also, it can be seen that the bounding box 814 of the polygon R.g 808 intersects with the following 12 cells: x2y0, x2y1, x2y2, x2y3, x3y0, x3y1, x3y2, x3y3, x4y0, x4y1, x4y2, and x4y3. Thus, the explosion factor for row R.row99 would be 12 in this example, and 12 instances of that row would be included in the output of the right-side band-explode operator that is also sent to the hash join.

Thus, the hash join would output 15*12=180 instances of rows that include both the polygon L.g 806 and the polygon R.g 808. Ultimately, the geospatial-function filter only needs to assess the combination of the polygon L.g 806 and the polygon R.g 808 once, and certainly not 180 times. The polygons either overlap or they don't.

These example numbers illustrate the value of positioning the above-described deduplication operator 614 before the filter (e.g., before the geospatial-predicate filter 738). The deduplication could be done after that filter, and would typically need to be done at some point no matter what, in order to produce a correct output relation (i.e., an output relation that does not have, for example, 179 extra confirmations of the intersection of the polygon L.g 806 and the polygon R.g 808).

These example numbers also demonstrate that cell sizes can be selected in a manner that is too small to be appropriate for a given situation. The choice of smaller band sizes and accordingly smaller cell sizes generally results in increased explosion, whereas the choice of larger band sizes and cell sizes generally results in less explosion. A simple definition that can be used for explosion in at least one embodiment is the ratio of the number of rows after the explosion operation to the number of rows from before the explosion operation. In the parlance of the present disclosure, explosion could be defined as the ratio of the number of exploded rows in an exploded relation to the number of source rows in the associated input relation. Explosion can therefore be measured prior to conducting the hash join, by comparing the number of exploded rows being input into the hash join as an exploded relation to the number of source rows in the corresponding input relation.

The opposite is true, however, of a metric that is referred to herein as join-output dilation, which can be defined as a ratio of (i) the sum of the number of true positives and false positives to (ii) the total number of true positives. As such, smaller band sizes and cell sizes will tend to decrease join-output dilation as there will be fewer false positives. On the other hand, larger band sizes tend to increase join-output dilation due an increase in the occurrence and likelihood of false positives. The measurements for calculating join-output dilation could be taken just before and just after the filter (e.g., the geospatial-predicate filter 704 that in the above examples applies the ST_Intersects function). It is that filter, after all, that is the final arbiter of which "positives" in the eyes of the hash join are true positives and which are false positives.

Ideally, both explosion and join-output dilation are kept low, but it can be seen that these two metrics are at odds with one another when it comes to consequences of band-size selection and cell-size selection. Moreover, if desired, the number of rows in the output of the hash join could be used in another calculation: a deduplication metric. Thus, using FIG. 6 as an example, a comparison could be made of (i) the number of rows in the output of the band join (e.g., the band-join output 408) to (ii) the number of rows that are output as the union-operator output 624 by the union operator 618. A different deduplication metric could compare the number of rows in the relations that are just before and just after the deduplication operator itself (i.e., the drop-only-singles-filter output 612 and the deduplication-operator output 616). And it will be appreciated by those of skill in the art that have the benefit of the present disclosure that numerous other similar metrics could be calculated as appropriate for a given implementation or in a given context.

Moreover, as described above, band-size selection and cell-size selection have performance consequences at least with respect to explosion and join-output dilation. Different effects on such metrics may be seen with different data sets and with different predicates. Because the overarching goal is typically to minimize overall processing time for a given query, those of skill in the art may experiment with different band sizes and cell sizes. Some example equations that could be used for band-size selection, cell-size selection, and to compute other metrics in various different embodiments are shown below.

The reader should bear in mind that many of the equations and much of the discussion below is presented in terms of a single dimension. The equations and discussion, and embodiments of the present disclosure generally, however, apply to each of the one or more dimensions being processed in a given embodiment. Thus, for a (longitude, latitude) (often expressed as (x, y)) implementation, a set of these equations would be applicable to the x dimension and a separate set applicable to the y dimension. Generally stated, a set of these equations would be applicable to each of the N dimensions in an N-dimensional implementation.

Thus, determination of a band size and other calculations can be—and often are—performed independently in each of multiple dimensions. Some embodiments may further refine their selected band size for one or more dimensions by combining (e.g., averaging) calculated values from multiple dimensions. In some embodiments, as an example, a band size in the x dimension and a band size in the y dimension can both be determined based on calculations in only one of those dimensions. More generally stated, a multidimensional implementation may determine a band size for any one or more dimensions using calculations based on any one or more (of the same or different) dimensions. And further permutations of these approaches may occur to those of skill in the art having the benefit of the present disclosure.

Turning now to the equations in a single arbitrary dimension, some equations are shown below in the context of a single interval (in the single arbitrary dimension). In particular, these equations relate to an example context in which an arbitrary interval (in the relevant dimension) is associated with (e.g., expressed as a "min" and "max" value in) an example row "$Row_i$" of an example input relation such as the left-side relation 404. In such a context, the explosion (i.e, the number of instances of $Row_i$ that an explosion operator would output) can be approximated as:

$$\text{Explosion}(Row_i) \cong 1 + \frac{IntervalSize(Row_i)}{BandSize} \qquad \text{(Equation 1)}$$

Given that approximation for the expected explosion of $Row_i$, the number of bands that the interval in $Row_i$ is expected to "intersect" (i.e., to overlap at least in part) can be approximated as:

$$IntersectedBands(Row_i) \cong Explosion(Row_i) * BandSize \qquad \text{(Equation 2)}$$

Another calculation that can be done to approximate the number of bands that an interval in a given row is expected to intersect is:

$$IntersectedBands(Row_i) \cong \text{ceil}\left(\frac{IntervalSize(Row_i)}{BandSize}\right) \qquad \text{(Equation 3)}$$

where, for a given number x, ceil(x) equals x rounded to the next highest integer. Another, similar approximation of the same quantity can be calculated as:

$$IntersectedBands(Row_i) \cong 1 + \text{ceil}\left(\frac{IntervalSize(Row_i)}{BandSize}\right) \qquad \text{(Equation 4)}$$

Furthermore, as described above in connection with FIGS. 4-6 for example, in at least one embodiment, the deduplicated band join 602 is generated in order to implement, on the left-side relation 404 and the right-side relation 406, an interval join having an interval join predicate. As described, the deduplicated band join 602 uses the filter 508 to apply that interval-join predicate to (a modified version of) the band-join output 408 of the band join 402. As described above, the band-join output 408 (as well as the union-operator output 624 that is input into the filter 508) includes rows that are true positives and rows that are false positives with respect to the interval join predicate that is applied by the filter 508.

Returning to the example $Row_i$, the probability that that example row will end up being a true positive can be expressed as:

$$P_{TruePositive}(Row_i) = \left(\frac{IntervalSize(Row_i)}{DomainSize}\right) \qquad \text{(Equation 5)}$$

where DomainSize represents the number of different values that points, intervals, interval endpoints, and the like can have in the particular dimension in the particular implementation. For example, an implementation is described above in which there is a band for each hour of the 24-hour day, with each band including a value for each of the 60 minutes in that hour (e.g., the minutes starting at 1400 through 1459, inclusive, in band 14). In that example implementation, then, the domain size is 1440, which corresponds to the number of minutes in each 24-hour day.

Moreover, the probability that $Row_i$ will emerge from the band join 402 as part of the band-join output 408 (irrespective of whether $Row_i$ ends up being a true positive or a false positive) can be calculated as shown in the next equation, in which the probability of $Row_i$ being part of the band-join output 408 is expressed as "$P_{JoinMatch}(Row_i)$.":

$$P_{JoinMatch}(Row_i) = \qquad \text{(Equation 6)}$$
$$P_{TruePositive}(Row_i) * \left(\frac{IntersectedBands(Row_i)}{IntervalSize(Row_i)}\right)$$

The prior two equations can be combined into:

$$P_{JoinMatch}(Row_i) = \qquad \text{(Equation 7)}$$
$$\left(\frac{IntervalSize(Row_i)}{DomainSize}\right) * \left(\frac{IntersectedBands(Row_i)}{IntervalSize(Row_i)}\right)$$

which can be simplified to:

$$P_{JoinMatch}(Row_i) = \left(\frac{IntersectedBands(Row_i)}{DomainSize}\right) \qquad \text{(Equation 8)}$$

Among other options, $P_{JoinMatch}(Row_i)$ can alternatively be calculated as:

$$P_{JoinMatch}(Row_i) = \qquad \text{(Equation 9)}$$
$$P_{TruePositive}(Row_i) * Explosion(Row_i) * \left(\frac{BandSize}{IntervalSize(Row_i)}\right)$$

which, after substituting in the above expression for $P_{TruePositive}(Row_i)$, gives:

$$P_{JoinMatch}(Row_i) = \left(\frac{IntervalSize(Row_i)}{DomainSize}\right) * \qquad \text{(Equation 10)}$$
$$Explosion(Row_i) * \left(\frac{BandSize}{IntervalSize(Row_i)}\right)$$

which simplifies to:

$$P_{JoinMatch}(Row_i) = Explosion(Row_i) * \left(\frac{BandSize}{DomainSize}\right) \quad \text{(Equation 11)}$$

Moving now to the context of all (or at least a plurality) of the intervals in a given relation, some additional equations are presented below. Many of the equations shown below are similar to corresponding equations shown above. In many cases, the computation of an average or other aggregate or collective value is assumed to have taken place when using a term, especially on the right side of the equals (or "approximately equals") sign, that includes such a function (typically as a prefix) in its name, such as AverageInterval-Size, for example.

First, a collective measure of explosion by, for example, a given band-explode operator, can be expressed as:

$$Explosion = \left(\frac{RowsAfterExplosion}{RowsBeforeExplosion}\right) \quad \text{(Equation 12)}$$

Also, an average level of explosion per row in a given relation can be approximated as follows:

$$AverageExplosionPerRow \cong \left(1 + \frac{AverageIntervalSize}{BandSize}\right) \quad \text{(Equation 13)}$$

Moreover, the join-output dilation can be calculated as:

$$JoinOutputDilation = \quad \text{(Equation 14)}$$
$$AverageExplosionPerRow * \left(\frac{BandSize}{AverageIntervalSize}\right)$$

and can also or instead be calculated as:

$$JoinOutputDilation = Explosion * \left(\frac{BandSize}{AverageIntervalSize}\right) \quad \text{(Equation 15)}$$

As stated elsewhere in this disclosure, join-output dilation can also be calculated as:

$$JoinOutputDilation = \left(\frac{TruePositives + FalsePositives}{TruePositives}\right) \quad \text{(Equation 16)}$$

Using several of the quantities from the above equations, another way in which join output dilation can be determined is:

$$JoinOutputDilation = \quad \text{(Equation 17)}$$
$$average\left(\frac{P_{InJoinOutput}(Row_i)}{P_{TruePositive}(Row_i)}\right) \text{ over all values of } i$$

Suppose that a system-dependent tuning parameter, which is referred to as C in the present disclosure, is generated such that:

$$C = \frac{AverageIntervalSize}{BandSize} \quad \text{(Equation 18)}$$

which, in the context of an example relation R, can be expressed as:

$$C = \frac{AverageIntervalSize(\text{relation}_R)}{BandSize} \quad \text{(Equation 19)}$$

The first of the two equations immediately above (i.e., Equation 18) can be rearranged into:

$$BandSize = C*AverageIntervalSize \quad \text{(Equation 20)}$$

For a given relation R, this may be expressed as:

$$BandSize = C*AverageIntervalSize(\text{relation}_R) \quad \text{(Equation 21)}$$

In some parts of the present disclosure, a band size that is calculated using an average-based technique may be referred to as an AverageBasedBandSize (as opposed to just a BandSize). For example, the second equation above here could be expressed as:

$$AverageBasedBandSize = C*AverageIntervalSize \quad \text{(Equation 22)}$$

Furthermore, it can be derived from Equation 1 and Equation 20 above that:

$$Explosion = 1 + \frac{\left(\frac{BandSize}{C}\right)}{BandSize} \quad \text{(Equation 23)}$$

and therefore that:

$$Explosion \cong 1 + \frac{1}{C} \quad \text{(Equation 24)}$$

Thus, the amount of explosion that will occur can be approximated based on a given band size and the average interval size in a given relation. This discussion is in terms of band sizes, interval sizes, and the like in a single dimension, but these calculations apply to each of the (e.g., two or more) dimensions on which a given implementation is operating.

As described above, some calculations of band size use an average function among the various interval sizes in the sampled intervals. As described here, some embodiments also or instead utilize percentile-based calculations of band size. In at least one embodiment, the data platform 100 determines an interval size of each sampled row (e.g., every row) in the corresponding relation, and selects a band size for that dimension for that relation to be an interval size that is at a configurable percentile P among those determined interval sizes (when ordered, e.g., from greatest to least). Similar to the above-described averaging techniques, the here-described percentile techniques may include a scaling factor (referred to herein as "F"), such that the band size in at least one embodiment is given by:

$$BandSize = F*percentile(IntervalSize, P) \quad \text{(Equation 25)}$$

In some parts of the present disclosure, a band size that is calculated using a percentile-based technique may be referred to as a PercentileBasedBandSize (as opposed to just a BandSize). For example, the previous equation could be expressed as:

$$\text{PercentileBasedBandSize} = F*\text{percentile}(\text{IntervalSize}, P) \quad \text{(Equation 26)}$$

For relatively large values of P (e.g., greater than 0.9), the implementation of this approach may improve robustness of the system against skewed input data. In equations such as that one, it is understood by those of skill in the art that, in at least one embodiment, IntervalSize in the percentile function is referring to an ordered (e.g., greatest-to-least) list of a plurality of row-specific values of IntervalSize.

Moreover, in order to further improve the robustness of the band-size calculation, a combination of the above-described average-based and percentile-based calculation approaches for selecting a band size is calculated and utilized in some embodiments. In at least one example, such a combination involves selecting the maximum of (i) a band size calculated using an average-based method and (ii) a band size calculated using a percentile-based method. In some implementations, a scaling factor (referred to herein as "A") is applied to the maximum value among the respective band-size values determined using the different techniques. In such an embodiment, the band size may be given by:

$$\text{BandSize} = A*\max(\text{AverageBasedBandSize}, \text{PercentileBasedBandSize}) \quad \text{(Equation 27)}$$

Those of skill in the art will appreciate that this equation can be expanded into:

$$\text{BandSize} = A*\max((C*\text{AverageIntervalSize}), (F*\text{percentile}(\text{IntervalSize}, P))) \quad \text{(Equation 28)}$$

This equation includes four tunable system parameters: A, F, C, and P.

Moreover, it is noted that, if (as one example reason) join output dilation is of particular concern in a given implementation, than a min( ) function can be used in place of the above-shown max( ) function. Stated affirmatively, any of the equations above that use max( ) could just as well use min( ) instead, depending, as examples, on the goals, priorities, and/or the like of those of skill in the art in the context of a given implementation.

The above formulae are extendible to the context of two-sided interval joins. An example two-sided interval join is shown below in the context of an example left-side relation L2 and right-side relation R2. In this example, both L2 and R2 each have at least these three example columns: ID, START, and END. With respect to data types, in each row, ID may contain an alphanumeric string, and both START and END may contain an integer. Here is the example two-sided interval join:

```
            SELECT
                    L2.ID,
                    R2.ID
            FROM
                    L2,
                    R2
            WHERE
                    (L2.START <= R2.END) AND
                    (R2.START <= L2.END);
```

Regardless of the particulars of a given two-sided interval join, one example way to extend the above formulae (regarding BandSize and the like) to two-sided interval joins is to separately calculate an interval size for the left relation and for the right relation using, e.g., one or more of the approaches described herein, and then select the greater of those two averages as the band size for use in a band join. An equation reflecting that approach (together with the inclusion of the above-described tuning parameter C) is shown below:

$$\text{BandSize} = C*\max(\text{AverageIntervalSize}(L2), \text{AverageIntervalSize}(R2)) \quad \text{(Equation 29)}$$

Median could be used instead of average, as one example. Moreover, it may be the case that one of the two relations contains points rather than non-point intervals. That is, it may be the case that either:

$$L2.\text{START} = L2.\text{END}$$

for all rows of L2, or that:

$$R2.\text{START} = R2.\text{END}$$

for all rows of R2. Taking an example in which R2.START=R2.END for all rows of R2, the BandSize equation given just above (i.e., Equation 29) reduces to:

$$\text{BandSize} = C*\text{AverageIntervalSize}(L2) \quad \text{(Equation 30)}$$

In another example situation, it may be the case that one of the two relations contains significantly narrower intervals than the other. Thus, it could be the case that either:

$$\text{AverageIntervalSize}(L2) \ll \text{AverageIntervalSize}(R2) \quad \text{(Inequality 1)}$$

or:

$$\text{AverageIntervalSize}(R2) \ll \text{AverageIntervalSize}(L2) \quad \text{(Inequality 2)}$$

Taking an example in which the second of those two is the case, R2 in that scenario could be characterized as being "almost a relation of points," "almost a point relation," "a relation of almost points," and/or the like. Regardless of the chosen terminology, at least some embodiments treat that case as if R2 was a point relation, such that, as given above in Equation 30, BandSize is equal to C multiplied by AverageIntervalSize(L2).

It is noted that the processing could occur in any suitable order. For example, an average interval size of each of L2 and R2 could be calculated and then compared, and the maximum between the two selected; as another approach, a determination could be made that, e.g., R2 is a point or almost-point relation, and jump to using the equation listed just above rather than computing and comparing a respective average interval size for each relation.

It may be the case that, after computing an average interval size for each of L2 and R2 (by, e.g., sampling some or all of the rows in those relations), it turns out that those averages are relatively close to one another. Thus, it might be the case that:

$$\text{AverageIntervalSize}(L2) \approx \text{AverageIntervalSize}(R2) \quad \text{(Equation 31)}$$

In that type of situation, it may be the case that using either (i) Equation 30 to calculate BandSize as being equal to C multiplied by AverageIntervalSize(L2) or (ii) the following equation:

$$\text{BandSize} = C*\text{AverageIntervalSize}(R2) \quad \text{(Equation 32)}$$

will yield similar performance results regarding the band join. Other similar implementations may occur to those of skill in the art having the benefit of the present disclosure.

As but one example of a way in which the above-described mathematical approaches could be varied, a function from the following list could be selected instead of average (i.e., mean): median, a median estimate (e.g., t-digest, median of median of subsets), and so forth. And certainly other measures of central tendency could be used as well or instead, such as the mean-squared, root mean-squared, and/or the like. In some cases, those of skill in the art may determine that a given measure of central tendency is more suitable than others in a given system and/or for a given data set. Moreover, one or more of the aforementioned measures of central tendency could be achieved and/or expressed in a different way. As one example, a median of a greatest-to-least (or least-to-greatest) ordered list of interval sizes could be calculated as percentile(IntervalSize, 0.5). And certainly other similar examples could be given here.

Figure 9:
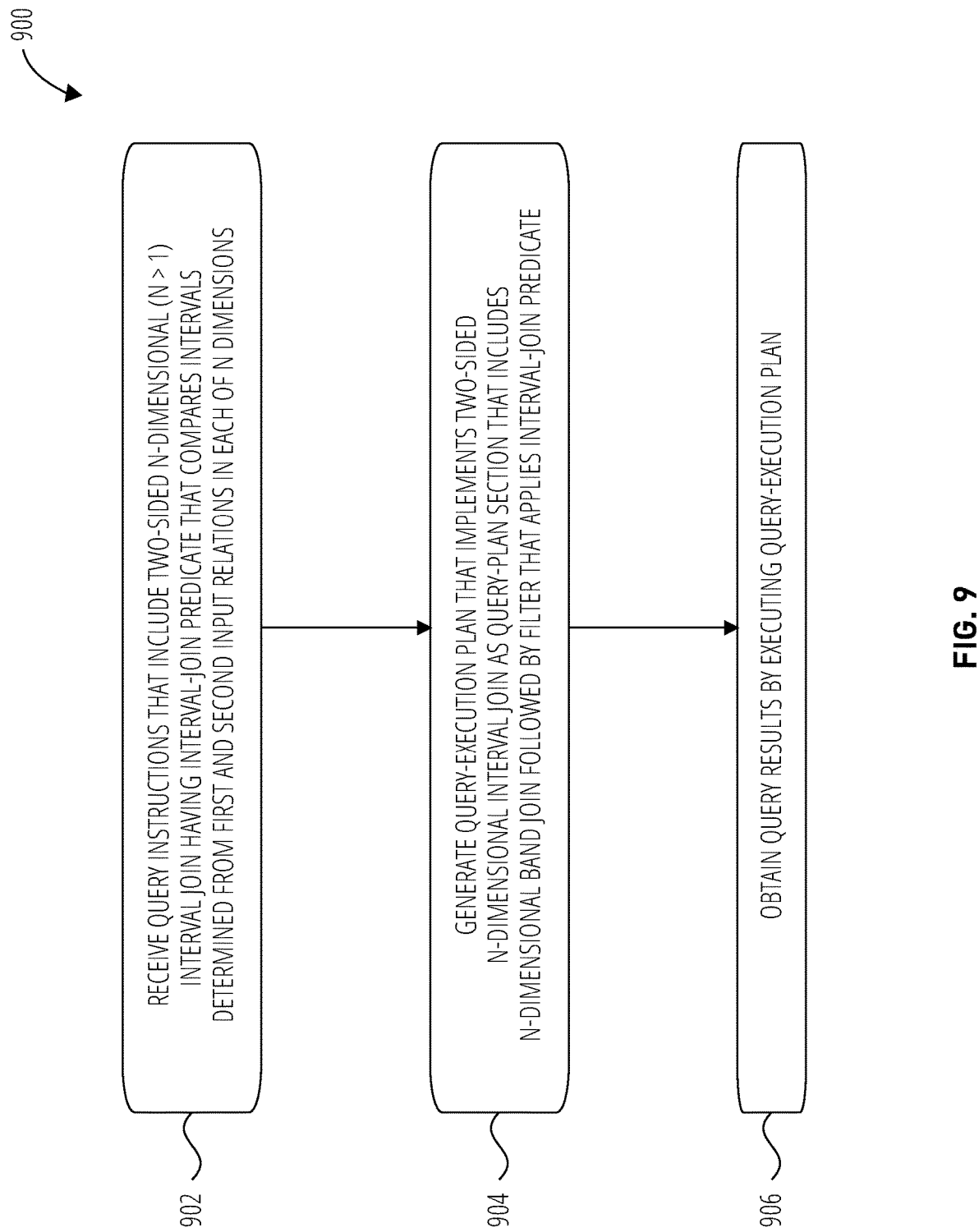
FIG. 9 depicts a first example method, in accordance with at least one embodiment.
Figure 10:
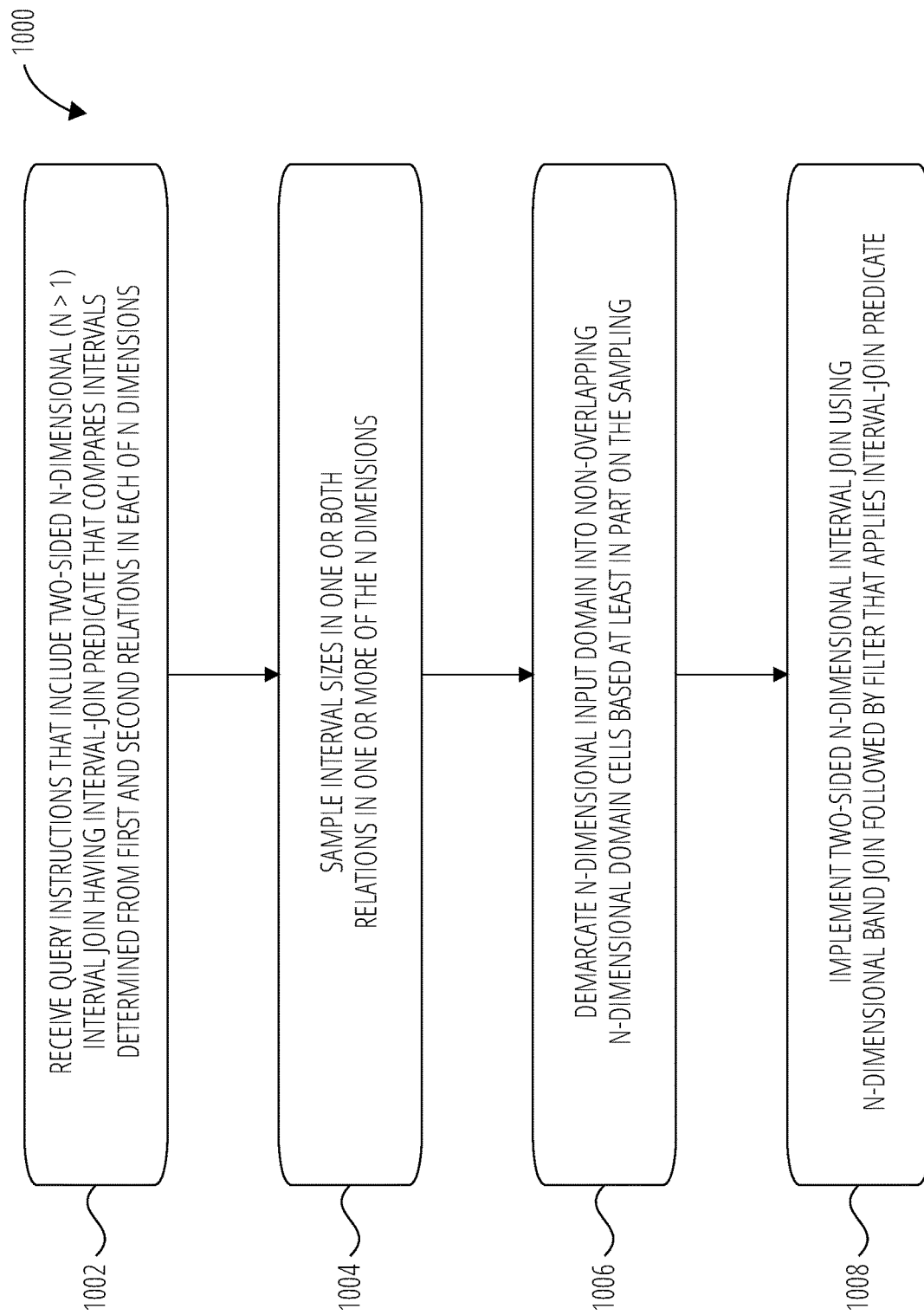
FIG. 10 depicts a second example method, in accordance with at least one embodiment.
Figure 11:
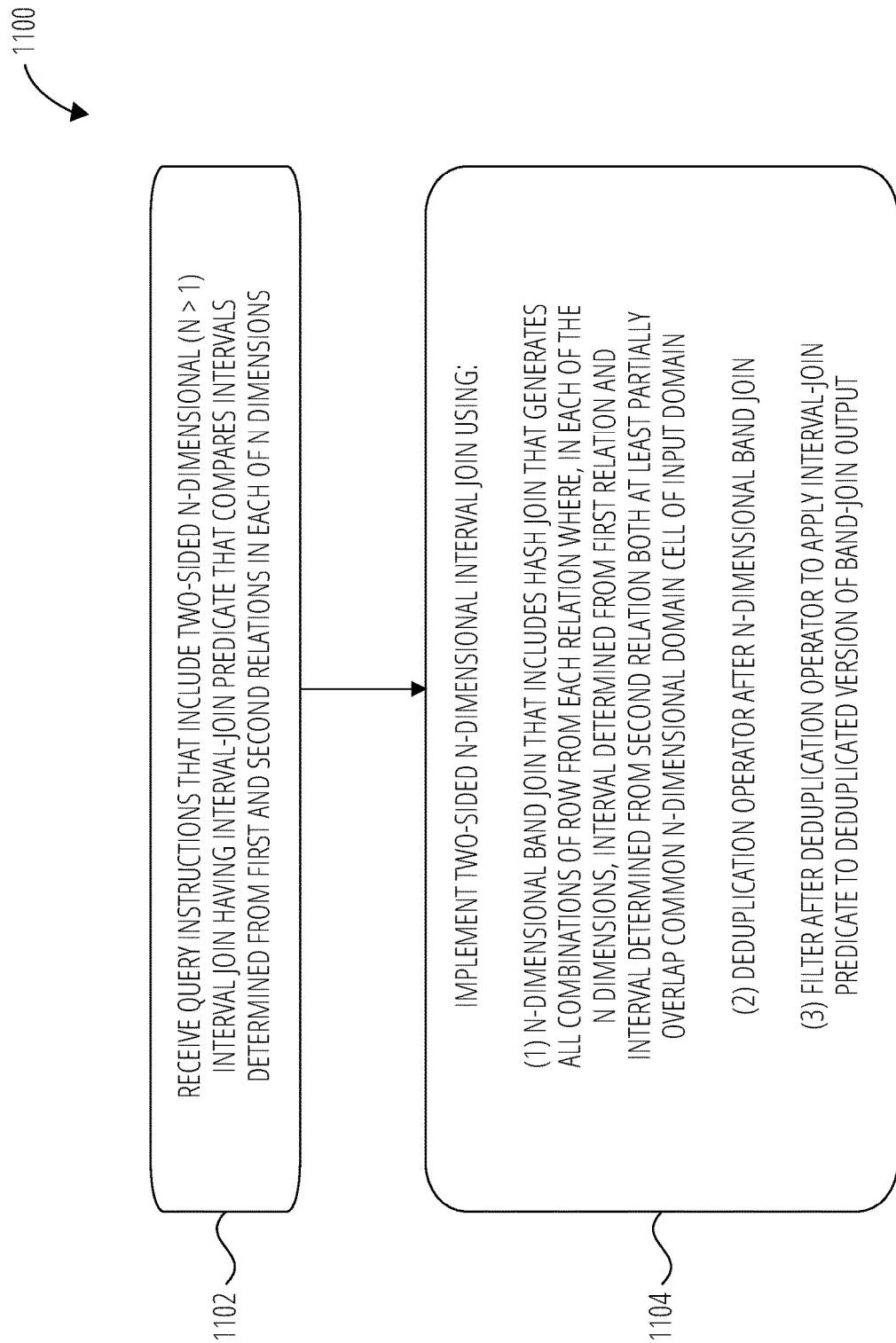
FIG. 11 depicts a third example method, in accordance with at least one embodiment.

The next three figures, FIG. 9, FIG. 10, and FIG. 11, each depict a method that is described by way of example as being performed by the database manager 102 of the data platform 100. In various different embodiments, any one or more of the method 900 of FIG. 9, the method 1000 of FIG. 10, and the method 100 of FIG. 11 could be performed by any computing and communication device or system of such devices that is suitably equipped, programmed, and configured to perform the operations described herein. In various different embodiments, as is described below by way of example, any one or more of these methods is performed by the database manager 102, which may involve one or more aspects of one or more of the methods being performed by the resource manager 104, one or more aspects of one or more of the methods being performed by the execution platform 106, and/or one or more aspects of one or more of the methods being performed by one or more other functional components of the database manager 102.

It is also noted that many of the aspects, terms, concepts, and the like that are mentioned in one or more of the method 900, the method 1000, and the method 1100 are described in detail in other parts of the present disclosure, and those details are accordingly not repeated here. It is the case, however, that any permutations, variants, further operations, and/or the like that are described anywhere else in this disclosure should be understood as being disclosed permutations, variants, further operations, and/or the like of the below-described methods.

FIG. 9 illustrates the example method 900, in accordance with at least one embodiment. As stated above, by way of example and not limitation, the method 900 is described below as being performed by the database manager 102. At operation 902, the database manager 102 receives, for a query on a database, query instructions that include (e.g., specify, call for, and/or the like) a two-sided N-dimensional interval join of at least a first input relation and a second input relation, where N is an integer greater than 1.

In at least one embodiment, the two-sided N-dimensional interval join has an interval-join predicate that, in each of N dimensions, compares an interval determined from the first input relation with an interval determined from the second input relation. In this particular example illustration of the method 900, the interval-join predicate of the two-sided N-dimensional interval join is implied by the following example geospatial-join predicate:

ST_Intersects(L.g, R.g)

where, in this example, L is the left-side relation 404, L.g is a polygon representative of a boundary of a city, R is the right-side relation 406, and R.g is a polygon representative of a boundary of a lake, all of which is consistent with above-described examples.

In this example, the interval join predicate is the following:

(XMIN(L.g)<=XMAX(R.g)) AND
(XMIN(R.g)<=XMAX(L.g)) AND
(YMIN(L.g)<=YMAX(R.g)) AND
(YMIN(R.g)<=YMAX(L.g))

where, consistent with the above disclosure, x (and XMIN, etc.) corresponds to longitude, and y (and YMIN, etc.) corresponds to latitude. In this example, as stated above, L.g is a two-dimensional geography data object that is specified in L (i.e., the left-side relation 404), and R.g is a two-dimensional geography data object that is specified in R (i.e., the right-side relation 406).

While the interval join predicate shown above is an intersection predicate, other predicates such as containment predicates, distance predicates (also referred to as within-distance predicates), and/or the like could be used in connection with other examples. Moreover, although R.g is a polygon in this example, R.g could instead be a point, or R.g could include some combination of polygons and points, among numerous other options.

At operation 904, the database manager 102 generates, based on the query instructions received at operation 902, a query-execution plan that implements the above-mentioned two-sided N-dimensional interval join as a query-plan section of the query-execution plan.

In at least one embodiment, the query-plan section takes the form of or at least includes the deduplicated band join 602 of FIG. 5, which itself includes the (N-dimensional) band join 402 followed (though not necessarily, and not in this example, immediately followed) by a filter (e.g., the filter 508) that applies the above-listed interval join predicate to the band-join output 408 of the band join 402. It is noted that, in the case of FIG. 6, the filter 508 receives a modified version of the band-join output 408 in the form of the above-described union-operator output 624.

Moreover, as described above, in at least one embodiment, the N-dimensional band join (e.g., the band join 402) includes preprocessing logic followed by a hash join (e.g., the hash join 446). In an embodiment, the preprocessing logic includes all of the elements shown in the band join 402 that are not also inside the hash join 446. The exploded relations 444 and 452 may be generated as described above from the left-side relation 404 and the right-side relation 406, respectively. The hash join 446 may then join exploded rows based on cell_ID, as described above. The above-described deduplication-path-and-bypass-path approach may then be implemented, and the filter 508 may apply the above-stated interval join predicate to a modified (e.g., reduced) version of the band-join output 408, where in this example that modified version is the union output 624.

The above-described sampling may be implemented by the preprocessing logic, and may involve sampling some or all of the rows in one or both of the input relations, in order to determine a cell size and cell boundaries as described herein.

At operation 906, the database manager 102 obtains results of the query at least in part by executing the query-execution plan that is generated at operation 904. In various different embodiments, the database manager 102 may take one or more actions with the obtained results, where some examples of such actions include storing the results in data storage, outputting (e.g., transmitting) the results to one or more clients 114 (e.g., a requesting client 114 that submitted the associated query), displaying the results via one or more user interfaces, and/or the like.

FIG. 10 illustrates the example method 1000, in accordance with at least one embodiment. As stated above, by way of example and not limitation, the method 1000 is described below as being performed by the database manager 102. As stated above, although this description of the method 1000 is relatively brief, it should be understood that all permutations, variants, and in general embodiments described herein are contemplated as being permutations, variants, etc. of the method 900, the method 1000, and the method 1100.

At operation 1002, the database manager 102 receives, for a query on a database, query instructions that include a two-sided N-dimensional interval join of at least a first input relation and a second input relation, where N is an integer greater than 1. The two-sided N-dimensional interval join has an interval-join predicate that, in each of N dimensions, compares an interval determined from the first input relation with an interval determined from the second input relation.

At operation 1004, the database manager 102 samples, with respect to each of one or more of the N dimensions, one or both of the first input relation and the second input relation with respect to an interval size of the interval determined from the corresponding input relation.

At operation 1006, the database manager 102 demarcates the N-dimensional input domain into a plurality of non-overlapping N-dimensional domain cells based at least in part on the sampling.

At operation 1008, the database manager 102 implements the two-sided N-dimensional interval join as a query-plan section comprising an N-dimensional band join followed by a filter that applies the interval-join predicate to a band-join output of the N-dimensional band join. The N-dimensional band join includes a hash join that generates a hash-join output that includes all combinations of a row from the first input relation and a row from the second input relation where, in each of the N dimensions, the interval determined from the first input relation and the interval determined from the second input relation both at least partially overlap a common N-dimensional domain cell in the plurality of non-overlapping N-dimensional domain cells.

These descriptions of the method 900, the method 1000, and the method 1100 are all examples of embodiments.

FIG. 11 illustrates a second example method 1000, in accordance with at least one embodiment. As stated above, by way of example and not limitation, the method 1000 is described below as being performed by the database manager 102. As stated above, although this description of the method 1000 is relatively brief, it should be understood that all permutations, variants, and in general embodiments described herein are contemplated as being permutations, variants, etc. of the method 900, the method 1000, and the method 1100.

At operation 1102, the database manager 102 receives, for a query on a database, query instructions that include a two-sided N-dimensional interval join of at least a first input relation and a second input relation, where N is an integer greater than 1. The two-sided N-dimensional interval join has an interval-join predicate that, in each of N dimensions, compares an interval determined from the first input relation with an interval determined from the second input relation.

At operation 1104, the database manager 102 implements the two-sided N-dimensional interval join as a query-plan section that includes at least the elements discussed in the ensuing paragraphs.

First, the query-plan section includes an N-dimensional band join. The N-dimensional band join includes a hash join that generates a hash-join output that includes all combinations of a row from the first input relation and a row from the second input relation where, in each of the N dimensions, the interval determined from the first input relation and the interval determined from the second input relation both at least partially overlap a common N-dimensional domain cell in a plurality of non-overlapping N-dimensional domain cells of an N-dimensional input domain. The N-dimensional band join has a band-join output that includes the hash-join output.

Second, the query-plan section includes a deduplication operator that is positioned after the N-dimensional band join. The deduplication operator is configured to remove any one or more duplicate rows from a potential-duplicates subset of the band-join output.

Third, the query-plan section includes a filter that is positioned after the deduplication operator. The filter is configured to apply the interval join predicate to a deduplicated version of the band-join output, where the deduplicated version of the band-join output includes an output of the deduplication operator.

Figure 12:
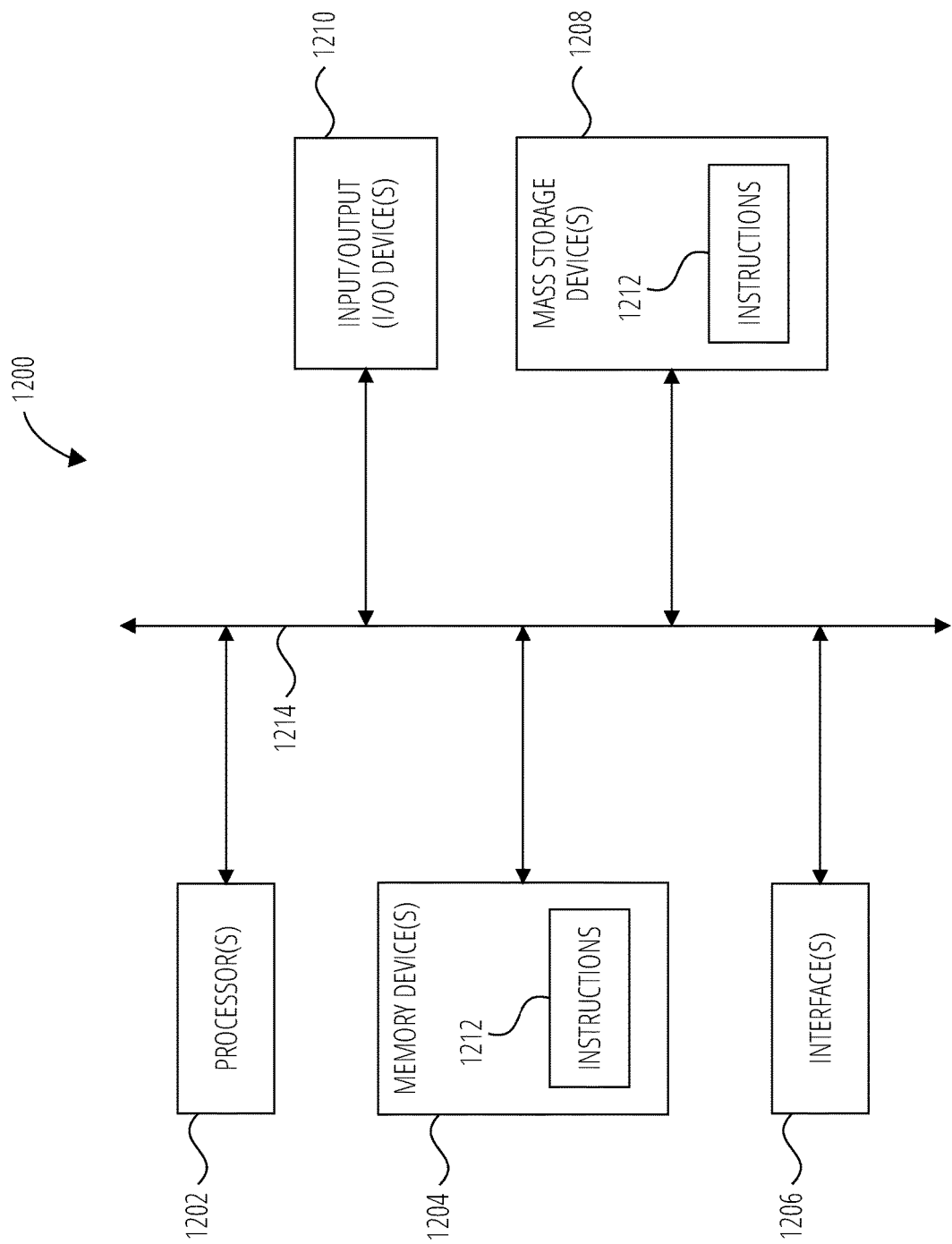
FIG. 12 illustrates an example computing device, in accordance with at least one embodiment.

FIG. 12 illustrates an example computing device 1200, in accordance with at least one embodiment. In some embodiments, the computing device 1200 is used to implement one or more of the systems and components discussed herein. Further, the computing device 1200 may interact with any of the systems and components described herein. Accordingly, the computing device 1200 may be used to perform various procedures and tasks, such as those discussed herein. The computing device 1200 can function as a server, a client, or any other computing entity. The computing device 1200 can be any of a wide variety of computing devices, such as a desktop computer, a notebook computer, a server computer, a handheld computer, a mobile device, a tablet, and/or the like.

In the depicted embodiment, the computing device 1200 includes one or more processor(s) 1202, one or more memory device(s) 1204, one or more interface(s) 1206, one or more mass storage device(s) 1208, and one or more input/output device(s) 1210, all of which are coupled to a bus 1214. The processor(s) 1202 include one or more processors or controllers that execute instructions stored in the memory device(s) 1204 and/or the mass storage device(s) 1208.

The memory device(s) 1204 can include various computer-storage media, such as volatile memory (e.g., random access memory (RAM)) and/or nonvolatile memory (e.g., read-only memory (ROM)). The memory device(s) 1204 may also include rewritable ROM, such as Flash memory. The processor(s) 1202 may also include various types of computer-storage media, such as cache memory.

The interface(s) 1206 may include various interfaces that allow the computing device 1200 to interact with other systems, devices, computing environments, and/or the like. Example interface(s) 1206 include any number of different network interfaces, such as interfaces to local area networks (LANs), wide area networks (WANs), wireless networks, the Internet, and/or the like.

The mass storage device(s) 1208 may include various computer-storage media, such as magnetic tapes, magnetic disks, optical disks, solid-state memory (e.g., Flash memory), and so forth. Various drives may also be included in the mass storage device(s) 1208 to enable reading from and/or writing to the various computer-storage media. The mass storage device(s) 1208 may include removable media and/or non-removable media.

The input/output device(s) 1210 may include various devices that allow data and/or other information to be input to and/or retrieved from the computing device 1200. Example input/output device(s) 1210 include cursor-control devices, keyboards, keypads, microphones, monitors or other display devices, speakers, printers, network interface cards, modems, lenses, CCDs or other image-capture devices, and the like.

The bus 1214 allows the processor(s) 1202, the memory device(s) 1204, the interface(s) 1206, the mass storage device(s) 1208, and the input/output device(s) 1210 to communicate with one another, as well as with other devices or components that may be coupled to the bus 1214. The bus 1214 represents one or more of several types of bus structures, such as a system bus, a PCI bus, an IEEE 1394 bus, a USB bus, and/or the like. In some examples, the bus 1214 includes one or more network connections.

For purposes of illustration, programs and other executable program components are shown herein as discrete blocks, although it is understood that such programs and components may reside at various times in different storage components of the computing device 1200 and are executed by the processor(s) 1202. Alternatively, the systems and procedures described herein can be implemented in hardware, or using a combination of hardware and software and/or firmware. For example, one or more application specific integrated circuits (ASICs) can be programmed to carry out one or more of the systems and procedures described herein.

The various memories may store one or more sets of instructions 1212 and data structures (e.g., software) embodying or utilized by any one or more of the methodologies or functions described herein. These instructions 1212, when executed by the processor(s) 1202, cause various operations to implement the disclosed embodiments.

As used herein, the terms "computer-storage medium (and media)," "machine-storage medium (and media)," and "device-storage medium (and media)" mean the same thing and may be used interchangeably in this disclosure. The terms refer to a single storage device or multiple storage devices and/or media (e.g., a centralized or distributed database, and/or associated caches and servers) that store executable instructions and/or data. The terms shall accordingly be taken to include, but not be limited to, solid-state memories as well as optical and magnetic media, including memory internal or external to processors. Specific examples of computer-storage media, machine-storage media, and/or device-storage media include non-volatile memory, include by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "computer-storage medium (and media)," "machine-storage medium (and media)," and "device-storage medium (and media)" specifically exclude carrier waves, modulated data signals, and other such media, at least some of which are encompassed by the term "transmission medium (and media)" discussed below.

In various example embodiments, any network or portion of a network described herein may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi network, another type of network, or a combination of two or more such networks. For example, any network or portion of a network described herein may include a wireless or cellular network, and a given utilized coupling may be a Code Division Multiple Access (CDMA) connection, a Global System for Mobile communications (GSM) connection, or another type of cellular or wireless coupling. In this example, a coupling may implement any of a variety of types of data-transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, fifth generation (5G) networks, others defined by various standard-setting organizations, other long-range protocols, and/or other data-transfer technology.

The instructions 1212 may be transmitted or received over a network using a transmission medium via a network interface device (e.g., a network interface component) and utilizing any one of a number of well-known transfer protocols (e.g., hypertext transfer protocol (HTTP)). Similarly, the instructions 1212 may be transmitted or received using a transmission medium via a coupling (e.g., a peer-to-peer coupling) to one or more devices. The terms "transmission medium (and media)" and "signal medium (and media)" mean the same thing and may be used interchangeably in this disclosure. The terms "transmission medium (and media)" and "signal medium (and media)" shall be taken to include any intangible medium that is capable of storing, encoding, or carrying the instructions 1212 for execution by the computing device 1200, and include digital or analog communications signals or other intangible media to facilitate communication of such software. Hence, the terms "transmission medium (and media)" and "signal medium (and media)" shall be taken to include any form of modulated data signal, carrier wave, and so forth. The term "modulated data signal" means a signal that has one or more of its characteristics set or changed in such a manner as to encode information in the signal.

The terms "computer-readable medium (and media)," "machine-readable medium (and media)," and "device-readable medium (and media)" mean the same thing and may be used interchangeably in this disclosure. The terms are defined to include both computer-storage media and transmission media. Thus, the terms include both storage devices and storage media as well as carrier waves and modulated data signals.

In view of the disclosure above, various examples are set forth below. It should be noted that one or more features of an example, taken in isolation or combination, should be considered within the disclosure of this application.

Example A1 is a method performed by a data platform executing instructions on at least one hardware processor, the method including: receiving, for a query on a database, query instructions including a two-sided N-dimensional interval join of at least a first input relation and a second input relation, N being an integer greater than 1, the two-sided N-dimensional interval join having an interval-join predicate that, in each of N dimensions, compares an interval determined from the first input relation with an interval determined from the second input relation; generating, based on the query instructions, a query-execution plan that implements the two-sided N-dimensional interval join as a query-plan section of the query-execution plan, the query-plan section including an N-dimensional band join followed by a filter that applies the interval-join predicate to a band-join output of the N-dimensional band join; and obtaining results of the query at least in part by executing the query-execution plan.

Example A2 is the method of Example A1, where: the N-dimensional band join includes preprocessing logic followed by a hash join having a hash-join output; and the band-join output includes the hash-join output.

Example A3 is the method of Example A2, where: the first input relation and the second input relation collectively include a plurality of input-relation rows, the plurality of input-relation rows including a plurality of first-input-relation rows in the first input relation and a plurality of second-input-relation rows in the second input relation; and the method further includes generating, with the preprocessing logic, a first exploded relation from the first input relation and a second exploded relation from the second input relation.

Example A4 is the method of Example A3, where: the method further includes generating the hash-join output with the hash join; the hash-join output includes a plurality of hash-join-output rows that each include a combination of: (i) an instance of a first-input-relation row from the first exploded relation and (ii) an instance of a second-input-relation row from the second exploded relation for which it is the case that, in each of the N dimensions, the interval determined from each of the corresponding input relations at least partially overlaps a common N-dimensional domain cell among a plurality of non-overlapping N-dimensional domain cells of an N-dimensional input domain; the plurality of hash-join output rows collectively includes all such combinations; and the N-dimensional input domain is common to the input relations and the exploded relations.

Example A5 is the method of Example A4, where: the N-dimensional input domain is demarcated into the plurality of non-overlapping N-dimensional domain cells, each of which has a different domain-cell identifier; each instance of each first-input-relation row from the first exploded relation and each instance of each second-input-relation row from the second exploded relation includes a domain-cell identifier of an N-dimensional domain cell that, in each of the N dimensions, is at least partially overlapped by the interval determined from the corresponding input relation; and the hash join uses the domain-cell identifiers in the first and second exploded relations as a join key for generating the hash-join output.

Example A6 is the method of either Example A4 or Example A5, where each exploded relation includes, for each input-relation row in its corresponding input relation, a separate instance of that input-relation row for each N-dimensional domain cell in the plurality of N-dimensional domain cells that at least partially overlaps, in each of the N dimensions, the interval determined from the corresponding input relation.

Example A7 is the method of any of the Examples A4-A6, where: generating the hash-join output with the hash join includes distributing execution of the hash join among a plurality of workers; and all instances of the input-relation rows in the exploded relations that at least partially overlap each given domain cell are assigned to a same worker among the plurality of workers.

Example A8 is the method of any of the Examples A4-A7, where, for a given instance of a given input-relation row from a given exploded relation, each of the N intervals determined from the corresponding input relation across the N dimensions at least partially overlapping a given N-dimensional domain cell among the plurality of non-overlapping N-dimensional domain cells includes an N-dimensional bounding box at least partially overlapping the given N-dimensional domain cell in each of the N dimensions, the N-dimensional bounding box encompassing each of the N intervals determined from the corresponding input relation across the N dimensions.

Example A9 is the method of any of the Examples A4-A8, where each of the N-dimensional domain cells in the plurality of N-dimensional domain cells is of a uniform size and shape.

Example A10 is the method of any of the Examples A4-A8, where the plurality of N-dimensional domain cells includes at least two N-dimensional domain cells having one or both of a different size and a different shape.

Example A11 is a data platform including: at least one hardware processor; and one or more computer-storage media containing instructions that, when executed by the at least one hardware processor, cause the data platform to perform operations including: receiving, for a query on a database, query instructions including a two-sided N-dimensional interval join of at least a first input relation and a second input relation, N being an integer greater than 1, the two-sided N-dimensional interval join having an interval-join predicate that, in each of N dimensions, compares an interval determined from the first input relation with an interval determined from the second input relation; generating, based on the query instructions, a query-execution plan that implements the two-sided N-dimensional interval join as a query-plan section of the query-execution plan, the query-plan section including an N-dimensional band join followed by a filter that applies the interval-join predicate to a band-join output of the N-dimensional band join; and obtaining results of the query at least in part by executing the query-execution plan.

Example A12 is the data platform of Example A11, where: the N-dimensional band join includes preprocessing logic followed by a hash join having a hash-join output; and the band-join output includes the hash-join output.

Example A13 is the data platform of Example A12, where: the first input relation and the second input relation collectively include a plurality of input-relation rows, the plurality of input-relation rows including a plurality of first-input-relation rows in the first input relation and a plurality of second-input-relation rows in the second input relation; and the operations further include generating, with the preprocessing logic, a first exploded relation from the first input relation and a second exploded relation from the second input relation.

Example A14 is the data platform of Example A13, where: the operations further include generating the hash-join output with the hash join; the hash-join output includes a plurality of hash-join-output rows that each include a combination of: (i) an instance of a first-input-relation row from the first exploded relation and (ii) an instance of a second-input-relation row from the second exploded relation for which it is the case that, in each of the N dimensions, the interval determined from each of the corresponding input relations at least partially overlaps a common N-dimensional domain cell among a plurality of non-overlapping N-dimensional domain cells of an N-dimensional input domain; the plurality of hash-join output rows collectively includes all such combinations; and the N-dimensional input domain is common to the input relations and the exploded relations.

Example A15 is the data platform of Example A14, where: the N-dimensional input domain is demarcated into the plurality of non-overlapping N-dimensional domain cells, each of which has a different domain-cell identifier; each instance of each first-input-relation row from the first exploded relation and each instance of each second-input-relation row from the second exploded relation includes a domain-cell identifier of an N-dimensional domain cell that, in each of the N dimensions, is at least partially overlapped by the interval determined from the corresponding input relation; and the hash join uses the domain-cell identifiers in the first and second exploded relations as a join key for generating the hash-join output.

Example A16 is the data platform of either Example A14 or Example A15, where each exploded relation includes, for each input-relation row in its corresponding input relation, a separate instance of that input-relation row for each N-dimensional domain cell in the plurality of N-dimensional domain cells that at least partially overlaps, in each of the N dimensions, the interval determined from the corresponding input relation.

Example A17 is the data platform of any of the Examples A14-A16, where: generating the hash-join output with the hash join includes distributing execution of the hash join among a plurality of workers; and all instances of the input-relation rows in the exploded relations that at least partially overlap each given domain cell are assigned to a same worker among the plurality of workers.

Example A18 is the data platform of any of the Examples A14-A17, where, for a given instance of a given input-relation row from a given exploded relation, each of the N intervals determined from the corresponding input relation across the N dimensions at least partially overlapping a given N-dimensional domain cell among the plurality of non-overlapping N-dimensional domain cells includes an N-dimensional bounding box at least partially overlapping the given N-dimensional domain cell in each of the N dimensions, the N-dimensional bounding box encompassing each of the N intervals determined from the corresponding input relation across the N dimensions.

Example A19 is the data platform of any of the Examples A14-A18, where each of the N-dimensional domain cells in the plurality of N-dimensional domain cells is of a uniform size and shape.

Example A20 is the data platform of any of the Examples A14-A18, where the plurality of N-dimensional domain cells includes at least two N-dimensional domain cells having one or both of a different size and a different shape.

Example A21 is one or more computer-storage media containing instructions that, when executed by at least one hardware processor of a computer system, cause the computer system to perform operations including: receiving, for a query on a database, query instructions including a two-sided N-dimensional interval join of at least a first input relation and a second input relation, N being an integer greater than 1, the two-sided N-dimensional interval join having an interval-join predicate that, in each of N dimensions, compares an interval determined from the first input relation with an interval determined from the second input relation; generating, based on the query instructions, a query-execution plan that implements the two-sided N-dimensional interval join as a query-plan section of the query-execution plan, the query-plan section including an N-dimensional band join followed by a filter that applies the interval-join predicate to a band-join output of the N-dimensional band join; and obtaining results of the query at least in part by executing the query-execution plan.

Example A22 is the one or more computer-storage media of Example A21, where: the N-dimensional band join includes preprocessing logic followed by a hash join having a hash-join output; the band-join output includes the hash-join output; the first input relation and the second input relation collectively include a plurality of input-relation rows, the plurality of input-relation rows including a plurality of first-input-relation rows in the first input relation and a plurality of second-input-relation rows in the second input relation; and the operations further include generating, with the preprocessing logic, a first exploded relation from the first input relation and a second exploded relation from the second input relation.

Example A23 is the one or more computer-storage media of Example A22, where: the operations further include generating the hash-join output with the hash join; the hash-join output includes a plurality of hash-join-output rows that each include a combination of: (i) an instance of a first-input-relation row from the first exploded relation and (ii) an instance of a second-input-relation row from the second exploded relation for which it is the case that, in each of the N dimensions, the interval determined from each of the corresponding input relations at least partially overlaps a common N-dimensional domain cell among a plurality of non-overlapping N-dimensional domain cells of an N-dimensional input domain; the plurality of hash-join output rows collectively includes all such combinations; and the N-dimensional input domain is common to the input relations and the exploded relations.

Example A24 is the one or more computer-storage media of Example A23, where: the N-dimensional input domain is demarcated into the plurality of non-overlapping N-dimensional domain cells, each of which has a different domain-cell identifier; each instance of each first-input-relation row from the first exploded relation and each instance of each second-input-relation row from the second exploded relation includes a domain-cell identifier of an N-dimensional domain cell that, in each of the N dimensions, is at least partially overlapped by the interval determined from the corresponding input relation; and the hash join uses the domain-cell identifiers in the first and second exploded relations as a join key for generating the hash-join output.

Example A25 is the one or more computer-storage media of Example A23, where: each exploded relation includes, for each input-relation row in its corresponding input relation, a separate instance of that input-relation row for each N-dimensional domain cell in the plurality of N-dimensional domain cells that at least partially overlaps, in each of the N dimensions, the interval determined from the corresponding input relation; and for a given instance of a given input-relation row from a given exploded relation, each of the N intervals determined from the corresponding input relation across the N dimensions at least partially overlapping a given N-dimensional domain cell among the plurality of non-overlapping N-dimensional domain cells includes an N-dimensional bounding box at least partially overlapping the given N-dimensional domain cell in each of the N dimensions, the N-dimensional bounding box encompassing each of the N intervals determined from the corresponding input relation across the N dimensions.

Example B1 is a method performed by a data platform executing instructions on at least one hardware processor, the method including: receiving, for a query on a database, query instructions including a two-sided N-dimensional interval join of at least a first input relation and a second input relation, N being an integer greater than 1, the two-sided N-dimensional interval join having an interval-join predicate that, in each of N dimensions, compares an interval determined from the first input relation with an interval determined from the second input relation; sampling, with respect to each of one or more of the N dimensions, one or both of the first input relation and the second input relation with respect to an interval size of the interval determined from the corresponding input relation; demarcating the N-dimensional input domain into a plurality of non-overlapping N-dimensional domain cells based at least in part on the sampling; and implementing the two-sided N-dimensional interval join as a query-plan section including an N-dimensional band join followed by a filter that applies the interval-join predicate to a band-join output of the N-dimensional band join, the N-dimensional band join including a hash join that generates a hash-join output including all combinations of a row from the first input relation and a row from the second input relation where, in each of the N dimensions, the interval determined from the first input relation and the interval determined from the second input relation both at least partially overlap a common N-dimensional domain cell in the plurality of non-overlapping N-dimensional domain cells.

Example B2 is the method of Example B1, where: the N-dimensional band join includes preprocessing logic followed by the hash join; and the band-join output includes a hash-join output of the hash join.

Example B3 is the method of Example B2, where: the method further includes generating, with the preprocessing logic, a first exploded relation from the first input relation and a second exploded relation from the second input relation; and the N-dimensional input domain is common to the input relations and the exploded relations.

Example B4 is the method of Example B3, where each exploded relation includes, for each input-relation row in its corresponding input relation, a separate instance of that input-relation row for each N-dimensional domain cell in the plurality of N-dimensional domain cells that at least partially overlaps, in each of the N dimensions, an N-dimensional bounding box that encompasses each of the N intervals determined from the corresponding input relation across the N dimensions.

Example B5 is the method of any of the Examples B1-B4, where sampling, with respect to each of the one or more of the N dimensions, one or both of the first input relation and the second input relation with respect to the interval size of the interval determined from the corresponding input relation includes sampling, with respect to each of the N dimensions, both the first input relation and the second input relation with respect to the interval size of the interval determined from the corresponding input relation.

Example B6 is the method of any of the Examples B1-B5, where: demarcating the N-dimensional input domain into the plurality of non-overlapping N-dimensional domain cells based at least in part on the sampling includes demarcating the N-dimensional input domain into one or more bands in each of the N dimensions; and each domain cell corresponds to a unique intersection of N bands, one from each of the N dimensions.

Example B7 is the method of any of the Examples B1-B6, where: each band in each of the N dimensions has a same dimension-specific band size as each of the other bands in the same dimension; and demarcating the N-dimensional input domain into the plurality of non-overlapping N-dimensional domain cells based at least in part on the sampling includes calculating one or more of the dimension-specific band sizes based at least in part on the sampling.

Example B8 is the method of Example B7, where calculating a given dimension-specific band size for a given dimension based at least in part on the sampling includes calculating the given dimension-specific band size based at least in part on an average of the sampled interval sizes in the given dimension.

Example B9 is the method of Example B7 or Example B8, where calculating a given dimension-specific band size for a given dimension based at least in part on the sampling includes calculating the given dimension-specific band size based at least in part on an interval size that corresponds to a specified percentile among the sampled interval sizes in the given dimension.

Example B10 is the method of any of the Examples B1-B9, further including: generating, based on the query instructions, a query-execution plan including the query-plan section; and obtaining results of the query at least in part by executing the query-execution plan.

Example B11 is a data platform including: at least one hardware processor; and one or more computer-storage media containing instructions that, when executed by the at least one hardware processor, cause the data platform to perform operations including: receiving, for a query on a database, query instructions including a two-sided N-dimensional interval join of at least a first input relation and a second input relation, N being an integer greater than 1, the two-sided N-dimensional interval join having an interval-join predicate that, in each of N dimensions, compares an interval determined from the first input relation with an interval determined from the second input relation; sampling, with respect to each of one or more of the N dimensions, one or both of the first input relation and the second input relation with respect to an interval size of the interval determined from the corresponding input relation; demarcating the N-dimensional input domain into a plurality of non-overlapping N-dimensional domain cells based at least in part on the sampling; and implementing the two-sided N-dimensional interval join as a query-plan section including an N-dimensional band join followed by a filter that applies the interval join predicate to a band-join output of the N-dimensional band join, the N-dimensional band join including a hash join that generates a hash-join output including all combinations of a row from the first input relation and a row from the second input relation where, in each of the N dimensions, the interval determined from the first input relation and the interval determined from the second input relation both at least partially overlap a common N-dimensional domain cell in the plurality of non-overlapping N-dimensional domain cells.

Example B12 is the data platform of Example B11, where: the N-dimensional band join includes preprocessing logic followed by the hash join; and the band-join output includes a hash-join output of the hash join.

Example B13 is the data platform of Example B12, where: the operations further include generating, with the preprocessing logic, a first exploded relation from the first input relation and a second exploded relation from the second input relation; and the N-dimensional input domain is common to the input relations and the exploded relations.

Example B14 is the data platform of Example B13, where each exploded relation includes, for each input-relation row in its corresponding input relation, a separate instance of that input-relation row for each N-dimensional domain cell in the plurality of N-dimensional domain cells that at least partially overlaps, in each of the N dimensions, an N-dimensional bounding box that encompasses each of the N intervals determined from the corresponding input relation across the N dimensions.

Example B15 is the data platform of any of the Examples B11-B14, where sampling, with respect to each of the one or more of the N dimensions, one or both of the first input relation and the second input relation with respect to the interval size of the interval determined from the corresponding input relation includes sampling, with respect to each of the N dimensions, both the first input relation and the second input relation with respect to the interval size of the interval determined from the corresponding input relation.

Example B16 is the data platform of any of the Examples B11-B15, where: demarcating the N-dimensional input domain into the plurality of non-overlapping N-dimensional domain cells based at least in part on the sampling includes demarcating the N-dimensional input domain into one or more bands in each of the N dimensions based at least in part on the sampling; and each domain cell corresponds to a unique intersection of N bands, one from each of the N dimensions.

Example B17 is the data platform of any of the Examples B11-B16, where: each band in each of the N dimensions has a same dimension-specific band size as each of the other bands in the same dimension; and demarcating the N-dimensional input domain into the plurality of non-overlapping N-dimensional domain cells based at least in part on the sampling includes calculating one or more of the dimension-specific band sizes based at least in part on the sampling.

Example B18 is the data platform of Example B17, where calculating a given dimension-specific band size for a given dimension based at least in part on the sampling includes calculating the given dimension-specific band size based at least in part on an average of the sampled interval sizes in the given dimension.

Example B19 is the data platform of Example B17 or Example B18, where calculating a given dimension-specific band size for a given dimension based at least in part on the sampling includes calculating the given dimension-specific band size based at least in part on an interval size that corresponds to a specified percentile among the sampled interval sizes in the given dimension.

Example B20 is the data platform of any of the Examples B11-B19, the operations further including: generating, based on the query instructions, a query-execution plan including the query-plan section; and obtaining results of the query at least in part by executing the query-execution plan.

Example B21 is one or more computer-storage media containing instructions that, when executed by at least one hardware processor of a computer system, cause the computer system to perform operations including: receiving, for a query on a database, query instructions including a two-sided N-dimensional interval join of at least a first input relation and a second input relation, N being an integer greater than 1, the two-sided N-dimensional interval join having an interval-join predicate that, in each of N dimensions, compares an interval determined from the first input relation with an interval determined from the second input relation; sampling, with respect to each of one or more of the N dimensions, one or both of the first input relation and the second input relation with respect to an interval size of the interval determined from the corresponding input relation; demarcating the N-dimensional input domain into a plurality of non-overlapping N-dimensional domain cells based at least in part on the sampling; and implementing the two-sided N-dimensional interval join as a query-plan section including an N-dimensional band join followed by a filter that applies the interval-join predicate to a band-join output of the N-dimensional band join, the N-dimensional band join including a hash join that generates a hash-join output including all combinations of a row from the first input relation and a row from the second input relation where, in each of the N dimensions, the interval determined from the first input relation and the interval determined from the second input relation both at least partially overlap a common N-dimensional domain cell in the plurality of non-overlapping N-dimensional domain cells.

Example B22 is the one or more computer-storage media of Example B21, where: the N-dimensional band join includes preprocessing logic followed by the hash join; the band-join output includes a hash-join output of the hash join; the operations further include generating, with the preprocessing logic, a first exploded relation from the first input relation and a second exploded relation from the second input relation; and the N-dimensional input domain is common to the input relations and the exploded relations.

Example B23 is the one or more computer-storage media of Example B22, where each exploded relation includes, for each input-relation row in its corresponding input relation, a separate instance of that input-relation row for each N-dimensional domain cell in the plurality of N-dimensional domain cells that at least partially overlaps, in each of the N dimensions, an N-dimensional bounding box that encompasses each of the N intervals determined from the corresponding input relation across the N dimensions.

Example B24 is the one or more computer-storage media of Example B21, where: demarcating the N-dimensional input domain into the plurality of non-overlapping N-dimensional domain cells based at least in part on the sampling includes demarcating the N-dimensional input domain into one or more bands in each of the N dimensions based at least in part on the sampling; and each domain cell corresponds to a unique intersection of N bands, one from each of the N dimensions.

Example B25 is the one or more computer-storage media of any of the Examples B21-B24, the operations further including: generating, based on the query instructions, a query-execution plan including the query-plan section; and obtaining results of the query at least in part by executing the query-execution plan.

Example C1 is a method performed by a data platform executing instructions on at least one hardware processor, the method including: receiving, for a query on a database, query instructions including a two-sided N-dimensional interval join of at least a first input relation and a second input relation, N being an integer greater than 1, the two-sided N-dimensional interval join having an interval-join predicate that, in each of N dimensions, compares an interval determined from the first input relation with an interval determined from the second input relation; and implementing the two-sided N-dimensional interval join as a query-plan section that includes: an N-dimensional band join including a hash join that generates a hash-join output including all combinations of a row from the first input relation and a row from the second input relation where, in each of the N dimensions, the interval determined from the first input relation and the interval determined from the second input relation both at least partially overlap a common N-dimensional domain cell in a plurality of non-overlapping N-dimensional domain cells of an N-dimensional input domain, the N-dimensional band join having a band-join output that includes the hash-join output; a deduplication operator positioned after the N-dimensional band join, the deduplication operator configured to remove any one or more duplicate rows from a potential-duplicates subset of the band-join output; and a filter positioned after the deduplication operator, the filter configured to apply the interval-join predicate to a deduplicated version of the band-join output, the deduplicated version of the band-join output including an output of the deduplication operator.

Example C2 is the method of Example C1, where: the N-dimensional band join further includes preprocessing logic that is followed by the hash join; the method further includes generating, with the preprocessing logic, a first exploded relation from the first input relation and a second exploded relation from the second input relation; and the N-dimensional input domain is common to the input relations and the exploded relations.

Example C3 is the method of Example C2, where each exploded relation includes, for each input-relation row in its corresponding input relation, a separate instance of that input-relation row for each N-dimensional domain cell in the plurality of N-dimensional domain cells that at least partially overlaps, in each of the N dimensions, each of the N intervals determined from the corresponding input relation across the N dimensions.

Example C4 is the method of any of the Examples C1-C3, where: the potential-duplicates subset of the band-join output includes less than all of the band-join output; and a no-potential-duplicates subset of the band-join output includes the balance of the band-join output.

Example C5 is the method of any of the Examples C1-C4, where the potential-duplicates subset of the band-join output only includes any one or more rows in the band-join output that include both: an instance of a first-input-relation row of which there is more that one instance in the first exploded relation; and an instance of a second-input-relation row of which there is more than one instance in the second exploded relation.

Example C6 is the method of any of the Examples C1-05, where: the query-plan section further includes, after the N-dimensional band join and before the filter, two distinct paths, the two distinct paths including a deduplication path that includes the deduplication operator and a bypass path that does not include the deduplication operator; and the method further includes: routing the potential-duplicates subset of the band-join output via the deduplication path; and routing the no-potential-duplicates subset of the band-join output via the bypass path.

Example C7 is the method of any of the Examples C1-C6, further including the preprocessing logic augmenting each instance of each input-relation row in each exploded relation with an explosion indicator that indicates whether that instance of that input-relation row is the only instance of that input-relation row in that exploded relation or rather is one of multiple instances of that input-relation row in that exploded relation.

Example C8 is the method of either Example C6 or Example C7, where: routing the potential-duplicates subset of the band-join output via the deduplication path includes routing, via the deduplication path, all rows in the band-join output in which both of the explosion indicators in that row of the band-join output indicate that the corresponding input-relation-row instance is one of multiple instances of that input-relation row in that exploded relation; and routing the no-potential-duplicates subset of the band-join output via the bypass path includes routing, via the bypass path, all rows in the band-join output in which one or both of the explosion indicators in that row of the band-join output indicate that the corresponding input-relation-row instance is the only instance of that input-relation row in that exploded relation.

Example C9 is the method of any of the Examples C1-C8, where: in each row of the band-join output: the instance of a first-input-relation row from the first exploded relation includes a first-input-relation-row identifier that is unique at least within the first input relation; and the instance of a second-input-relation row from the second exploded relation includes a second-input-relation-row identifier that is unique at least within the second input relation; and the deduplication operator uses a combination of the first-input-relation-row identifier and the second-input-relation-row identifier as a deduplication key to remove any one or more duplicate rows from the potential-duplicates subset of the band-join output.

Example C10 is the method of any of the Examples C1-C9, further including: generating, based on the query instructions, a query-execution plan including the query-plan section; and obtaining results of the query at least in part by executing the query-execution plan.

Example C11 is a data platform including: at least one hardware processor; and one or more computer-storage media containing instructions that, when executed by the at least one hardware processor, cause the data platform to perform operations including: receiving, for a query on a database, query instructions including a two-sided N-dimensional interval join of at least a first input relation and a second input relation, N being an integer greater than 1, the two-sided N-dimensional interval join having an interval-join predicate that, in each of N dimensions, compares an interval determined from the first input relation with an interval determined from the second input relation; and implementing the two-sided N-dimensional interval join as a query-plan section that includes: an N-dimensional band join including a hash join that generates a hash-join output including all combinations of a row from the first input relation and a row from the second input relation where, in each of the N dimensions, the interval determined from the first input relation and the interval determined from the second input relation both at least partially overlap a common N-dimensional domain cell in a plurality of non-overlapping N-dimensional domain cells of an N-dimensional input domain, the N-dimensional band join having a band-join output that includes the hash-join output; a deduplication operator positioned after the N-dimensional band join, the deduplication operator configured to remove any one or more duplicate rows from a potential-duplicates subset of the band-join output; and a filter positioned after the deduplication operator, the filter configured to apply the interval-join predicate to a deduplicated version of the band-join output, the deduplicated version of the band-join output including an output of the deduplication operator.

Example C12 is the data platform of Example C11, where: the N-dimensional band join further includes preprocessing logic that is followed by the hash join; the operations further include generating, with the preprocessing logic, a first exploded relation from the first input relation and a second exploded relation from the second input relation; and the N-dimensional input domain is common to the input relations and the exploded relations.

Example C13 is the data platform of Example C12, where each exploded relation includes, for each input-relation row in its corresponding input relation, a separate instance of that input-relation row for each N-dimensional domain cell in the plurality of N-dimensional domain cells that at least partially overlaps, in each of the N dimensions, each of the N intervals determined from the corresponding input relation across the N dimensions.

Example C14 is the data platform of any of the Examples C11-C13, where: the potential-duplicates subset of the band-join output includes less than all of the band-join output; and a no-potential-duplicates subset of the band-join output includes the balance of the band-join output.

Example C15 is the data platform of any of the Examples C11-C14, where the potential-duplicates subset of the band-join output only includes any one or more rows in the band-join output that include both: an instance of a first-input-relation row of which there is more that one instance in the first exploded relation; and an instance of a second-input-relation row of which there is more than one instance in the second exploded relation.

Example C16 is the data platform of any of the Examples C11-C15, where: the query-plan section further includes, after the N-dimensional band join and before the filter, two distinct paths, the two distinct paths including a deduplication path that includes the deduplication operator and a bypass path that does not include the deduplication operator; and the operations further include: routing the potential-duplicates subset of the band-join output via the deduplication path; and routing the no-potential-duplicates subset of the band-join output via the bypass path.

Example C17 is the data platform of any of the Examples C11-C16, the operations further including the preprocessing logic augmenting each instance of each input-relation row in each exploded relation with an explosion indicator that indicates whether that instance of that input-relation row is the only instance of that input-relation row in that exploded relation or rather is one of multiple instances of that input-relation row in that exploded relation.

Example C18 is the data platform of either Example C16 or Example C17, where: routing the potential-duplicates subset of the band-join output via the deduplication path includes routing, via the deduplication path, all rows in the band-join output in which both of the explosion indicators in that row of the band-join output indicate that the corresponding input-relation-row instance is one of multiple instances of that input-relation row in that exploded relation; and routing the no-potential-duplicates subset of the band-join output via the bypass path includes routing, via the bypass path, all rows in the band-join output in which one or both of the explosion indicators in that row of the band-join output indicate that the corresponding input-relation-row instance is the only instance of that input-relation row in that exploded relation.

Example C19 is the data platform of any of the Examples C11-C18, where: in each row of the band-join output: the instance of a first-input-relation row from the first exploded relation includes a first-input-relation-row identifier that is unique at least within the first input relation; and the instance of a second-input-relation row from the second exploded relation includes a second-input-relation-row identifier that is unique at least within the second input relation; and the deduplication operator uses a combination of the first-input-relation-row identifier and the second-input-relation-row identifier as a deduplication key to remove any one or more duplicate rows from the potential-duplicates subset of the band-join output.

Example C20 is the data platform of Example C11, the operations further including: generating, based on the query instructions, a query-execution plan including the query-plan section; and obtaining results of the query at least in part by executing the query-execution plan.

Example C21 is one or more computer-storage media containing instructions that, when executed by at least one hardware processor of a computer system, cause the computer system to perform operations including: receiving, for a query on a database, query instructions including a two-sided N-dimensional interval join of at least a first input relation and a second input relation, N being an integer greater than 1, the two-sided N-dimensional interval join having an interval-join predicate that, in each of N dimensions, compares an interval determined from the first input relation with an interval determined from the second input relation; and implementing the two-sided N-dimensional interval join as a query-plan section that includes: an N-dimensional band join including a hash join that generates a hash-join output including all combinations of a row from the first input relation and a row from the second input relation where, in each of the N dimensions, the interval determined from the first input relation and the interval determined from the second input relation both at least partially overlap a common N-dimensional domain cell in a plurality of non-overlapping N-dimensional domain cells of an N-dimensional input domain, the N-dimensional band join having a band-join output that includes the hash-join output; a deduplication operator positioned after the N-dimensional band join, the deduplication operator configured to remove any one or more duplicate rows from a potential-duplicates subset of the band-join output; and a filter positioned after the deduplication operator, the filter configured to apply the interval-join predicate to a deduplicated version of the band-join output, the deduplicated version of the band-join output including an output of the deduplication operator.

Example C22 is the one or more computer-storage media of Example C21, where: the N-dimensional band join further includes preprocessing logic that is followed by the hash join; the operations further include generating, with the preprocessing logic, a first exploded relation from the first input relation and a second exploded relation from the second input relation; the N-dimensional input domain is common to the input relations and the exploded relations; and each exploded relation includes, for each input-relation row in its corresponding input relation, a separate instance of that input-relation row for each N-dimensional domain cell in the plurality of N-dimensional domain cells that at least partially overlaps, in each of the N dimensions, each of the N intervals determined from the corresponding input relation across the N dimensions.

Example C23 is the one or more computer-storage media of Example C22, where: the potential-duplicates subset of the band-join output includes less than all of the band-join output; a no-potential-duplicates subset of the band-join output includes the balance of the band-join output; and the potential-duplicates subset of the band-join output only includes any one or more rows in the band-join output that include both: an instance of a first-input-relation row of which there is more that one instance in the first exploded relation; and an instance of a second-input-relation row of which there is more than one instance in the second exploded relation.

Example C24 is the one or more computer-storage media of any of the Examples C21-C23, where: the query-plan section further includes, after the N-dimensional band join and before the filter, two distinct paths, the two distinct paths including a deduplication path that includes the deduplication operator and a bypass path that does not include the deduplication operator; the operations further include: the preprocessing logic augmenting each instance of each input-relation row in each exploded relation with an explosion indicator that indicates whether that instance of that input-relation row is the only instance of that input-relation row in that exploded relation or rather is one of multiple instances of that input-relation row in that exploded relation; routing the potential-duplicates subset of the band-join output via the deduplication path; and routing the no-potential-duplicates subset of the band-join output via the bypass path.

Example C25 is the one or more computer-storage media of any of the Examples C22-C24, where: in each row of the band-join output: the instance of a first-input-relation row from the first exploded relation includes a first-input-relation-row identifier that is unique at least within the first input relation; and the instance of a second-input-relation row from the second exploded relation includes a second-input-relation-row identifier that is unique at least within the second input relation; and the deduplication operator uses a combination of the first-input-relation-row identifier and the second-input-relation-row identifier as a deduplication key to remove any one or more duplicate rows from the potential-duplicates subset of the band-join output.

Example D1 is a method performed by a data platform executing instructions on at least one hardware processor, the method including: receiving, for a query on a database, query instructions including a two-sided N-dimensional interval join of at least a first input relation and a second input relation, N being an integer greater than 1, the two-sided N-dimensional interval join having an interval-join predicate that, in each of N dimensions, compares an interval determined from the first input relation with an interval determined from the second input relation; generating, based on the query instructions, a query-execution plan that implements the two-sided N-dimensional interval join as a query-plan section of the query-execution plan, the query-plan section including an N-dimensional band join followed by a filter that applies the interval-join predicate to a band-join output of the N-dimensional band join; and obtaining results of the query at least in part by executing the query-execution plan.

Example D2 is the method of Example D1, where the N-dimensional band join includes preprocessing logic followed by a hash join.

Example D3 is the method of Example D2, where the first input relation and the second input relation collectively include a plurality of input-relation rows, the plurality of input-relation rows including a plurality of first-input-relation rows in the first input relation and a plurality of second-input-relation rows in the second input relation; and the method further includes: generating, with the preprocessing logic, a first exploded relation from the first input relation and a second exploded relation from the second input relation, where: an N-dimensional input domain common to the input relations and the exploded relations is demarcated into a plurality of non-overlapping N-dimensional domain cells having different domain-cell identifiers; each exploded relation includes, for each input-relation row in its corresponding input relation, a separate instance of that input-relation row for each N-dimensional domain cell in the plurality of N-dimensional domain cells that at least partially overlaps, in each of the N dimensions, the interval determined from the corresponding input relation; and each instance of each input-relation row in each exploded relation includes the domain-cell identifier of the corresponding overlapping N-dimensional domain cell; and generating, with the hash join, a hash-join output including a plurality of hash-join-output rows that each include a combination of an instance of a first-input-relation row from the first exploded relation and an instance of a second-input-relation row from the second exploded relation that include matching domain-cell identifiers, the plurality of hash-join output rows collectively including all such combinations, where the band-join output includes the hash-join output.

Example D4 is the method of Example D3, where each one of the N-dimensional domain cells in the plurality of N-dimensional domain cells is of a uniform size and shape.

Example D5 is the method of Example D3, where the plurality of N-dimensional domain cells includes at least two N-dimensional domain cells having one or both of a different size and a different shape.

Example D6 is the method of either Example D3 or Example D4, further including: sampling, with the preprocessing logic and with respect to each of one or more of the N dimensions, one or both of the first input relation and the second input relation with respect to an interval size of the interval determined from the corresponding input relation; and demarcating the N-dimensional input domain into the plurality of non-overlapping N-dimensional domain cells based at least in part on the sampling.

Example D7 is the method of Example D6, where: sampling at least one of the first input relation and the second input relation includes sampling both the first input relation and the second input relation; demarcating the N-dimensional input domain into the plurality of non-overlapping N-dimensional domain cells includes demarcating the N-dimensional input domain into one or more bands in each of the N dimensions; and each domain cell corresponds to a unique intersection of N bands, one from each of the N dimensions.

Example D8 is the method of Example D7, where: each band in each of the N dimensions has a same dimension-specific band size as each of the other bands in the same dimension; and demarcating the N-dimensional input domain into the plurality of non-overlapping N-dimensional domain cells based at least in part on the sampling includes calculating one or more of the dimension-specific band sizes based at least in part on the sampling.

Example D9 is the method of Example D8, where calculating a given dimension-specific band size for a given dimension based at least in part on the sampling includes calculating the given dimension-specific band size based at least in part on an average of the sampled interval sizes in the given dimension.

Example D10 is the method of Example D8, where calculating a given dimension-specific band size for a given dimension based at least in part on the sampling includes calculating the given dimension-specific band size based at least in part on an interval size that corresponds to a specified percentile among the sampled interval sizes in the given dimension.

Example D11 is the method of any of the Examples D3-D10, where a given N-dimensional domain cell at least partially overlapping, in each of the N dimensions, the interval determined from the corresponding input relation includes the given N-dimensional domain cell at least partially overlapping, in each of the N dimensions, a bounding box that encompasses the interval determined from the corresponding input relation.

Example D12 is the method of any of the Examples D3-D11, where the query-plan section further includes a deduplication operator positioned after the N-dimensional band join and before the filter, the method further including using the deduplication operator to remove any one or more duplicate rows from a potential-duplicates subset of the band-join output.

Example D13 is the method of Example D12, where: the potential-duplicates subset of the band-join output includes less than all of the band-join output; and a no-potential-duplicates subset of the band-join output includes the balance of the band-join output.

Example D14 is the method of Example D13, where the potential-duplicates subset of the band-join output only includes any one or more rows in the band-join output that include both: an instance of a first-input-relation row of which there is more that one instance in the first exploded relation; and an instance of a second-input-relation row of which there is more than one instance in the second exploded relation.

Example D15 is the method of Example D14, where: the query-plan section further includes, after the N-dimensional band join and before the filter, two distinct paths, the two distinct paths including a deduplication path that includes the deduplication operator and a bypass path that does not include the deduplication operator; using the deduplication operator to remove any one or more duplicate rows from the potential-duplicates subset of the band-join output includes routing the potential-duplicates subset of the band-join output via the deduplication path; and the method further includes routing the no-potential-duplicates subset of the band-join output via the bypass path.

Example D16 is the method of Example D15, further including the preprocessing logic augmenting each instance of each input-relation row in each exploded relation with an explosion indicator that indicates whether that instance of that input-relation row is the only instance of that input-relation row in that exploded relation or rather is one of multiple instances of that input-relation row in that exploded relation, where: routing the potential-duplicates subset of the band-join output via the deduplication path includes routing, via the deduplication path, all rows in the band-join output in which both of the explosion indicators in that row of the band-join output indicate that the corresponding input-relation-row instance is one of multiple instances of that input-relation row in that exploded relation; and routing the no-potential-duplicates subset of the band-join output via the bypass path includes routing, via the bypass path, all rows in the band-join output in which one or both of the explosion indicators in that row of the band-join output indicate that the corresponding input-relation-row instance is the only instance of that input-relation row in that exploded relation.

Example D17 is the method of any of the Examples D12-D16, where: in each row of the band-join output: the instance of a first-input-relation row from the first exploded relation includes a first-input-relation-row identifier that is unique at least within the first input relation; and the instance of a second-input-relation row from the second exploded relation includes a second-input-relation-row identifier that is unique at least within the second input relation; and the deduplication operator uses a combination of the first-input-relation-row identifier and the second-input-relation-row identifier as a deduplication key to remove any one or more duplicate rows from the potential-duplicates subset of the band-join output.

Example D18 is the method of Example D17, further including adding, prior to the hash join in the query-execution plan, one or both of first-input-relation-row identifiers to the first-input-relation rows and second-input-relation-row identifiers to the second-input-relation rows.

Example D19 is the method of any of the Examples D3-D18, where generating the hash-join output with the hash join includes distributing execution of the hash join among a plurality of workers, the instances of the input-relation rows in the exploded relations for each given domain cell being assigned to a same worker among the plurality of workers.

Example D20 is a data platform that includes at least one hardware processor and that also includes one or more computer-storage media containing instructions that, when executed by the at least one hardware processor, cause the data platform to perform operations including: receiving, for a query on a database, query instructions including a two-sided N-dimensional interval join of at least a first input relation and a second input relation, N being an integer greater than 1, the two-sided N-dimensional interval join having an interval-join predicate that, in each of N dimensions, compares an interval determined from the first input relation with an interval determined from the second input relation; generating, based on the query instructions, a query-execution plan that implements the two-sided N-dimensional interval join as a query-plan section of the query-execution plan, the query-plan section including an N-dimensional band join followed by a filter that applies the interval join predicate to a band-join output of the N-dimensional band join; and obtaining results of the query at least in part by executing the query-execution plan.

Example D21 is the data platform of Example D20, where: the N-dimensional band join includes preprocessing logic followed by a hash join; the first input relation and the second input relation collectively include a plurality of input-relation rows, the plurality of input-relation rows including a plurality of first-input-relation rows in the first input relation and a plurality of second-input-relation rows in the second input relation; and the operations further include: generating, with the preprocessing logic, a first exploded relation from the first input relation and a second exploded relation from the second input relation, where: an N-dimensional input domain common to the input relations and the exploded relations is demarcated into a plurality of non-overlapping N-dimensional domain cells having different domain-cell identifiers; and each exploded relation includes, for each input-relation row in its corresponding input relation, a separate instance of that input-relation row for each N-dimensional domain cell in the plurality of N-dimensional domain cells that at least partially overlaps, in each of the N dimensions, the interval determined from the corresponding input relation; and each instance of each input-relation row in each exploded relation includes the domain-cell identifier of the corresponding overlapping N-dimensional domain cell; and generating, with the hash join, a hash-join output including a plurality of hash-join-output rows that each include a combination of an instance of a first-input-relation row from the first exploded relation and an instance of a second-input-relation row from the second exploded relation that include matching domain-cell identifiers, the plurality of hash-join output rows collectively including all such combinations, where the band-join output includes the hash-join output.

Example D22 is the data platform of Example D21, the operations further including: sampling, with the preprocessing logic and with respect to each of one or more of the N dimensions, one or both of the first input relation and the second input relation with respect to an interval size of the interval determined from the corresponding input relation; and demarcating the N-dimensional input domain into the plurality of non-overlapping N-dimensional domain cells based at least in part on the sampling.

Example D23 is the data platform of Example D22, where: sampling at least one of the first input relation and the second input relation includes sampling both the first input relation and the second input relation; demarcating the N-dimensional input domain into the plurality of non-overlapping N-dimensional domain cells includes demarcating the N-dimensional input domain into one or more bands in each of the N dimensions; and each domain cell corresponds to a unique intersection of N bands, one from each of the N dimensions.

Example D24 is the data platform of Example D21 or Example D22, where: the query-plan section further includes a deduplication operator positioned after the two-N-dimensional band join and before the filter; the operations further include using the deduplication operator to remove any one or more duplicate rows from a potential-duplicates subset of the band-join output; the potential-duplicates subset of the band-join output only includes any one or more rows in the band-join output that include both: an instance of a first-input-relation row of which there is more that one instance in the first exploded relation; and an instance of a second-input-relation row of which there is more than one instance in the second exploded relation; a no-potential-duplicates subset of the band-join output includes the balance of the band-join output; the query-plan section further includes, after the N-dimensional band join and before the filter, two distinct paths, the two distinct paths including a deduplication path that includes the deduplication operator and a bypass path that does not include the deduplication operator; using the deduplication operator to remove any one or more duplicate rows from the potential-duplicates subset of the band-join output includes routing the potential-duplicates subset of the band-join output via the deduplication path; and the operations further include routing the no-potential-duplicates subset of the band-join output via the bypass path.

Example D25 is one or more computer-storage media containing instructions that, when executed by at least one hardware processor of a computer system, cause the computer system to perform operations including: receiving, for a query on a database, query instructions including a two-sided N-dimensional interval join of at least a first input relation and a second input relation, N being an integer greater than 1, the two-sided N-dimensional interval join having an interval-join predicate that, in each of N dimensions, compares an interval determined from the first input relation with an interval determined from the second input relation; generating, based on the query instructions, a query-execution plan that implements the two-sided N-dimensional interval join as a query-plan section of the query-execution plan, the query-plan section including an N-dimensional band join followed by a filter that applies the interval-join predicate to a band-join output of the N-dimensional band join; and obtaining results of the query at least in part by executing the query-execution plan.

Further examples include data-platform and computer-storage-media versions of Examples D2-D19.

To promote an understanding of the principles of the present disclosure, various embodiments are illustrated in the drawings. The embodiments disclosed herein are not intended to be exhaustive or to limit the present disclosure to the precise forms that are disclosed in the above detailed description. Rather, the described embodiments have been selected so that others skilled in the art may utilize their teachings. Accordingly, no limitation of the scope of the present disclosure is thereby intended.

Each of the following four patent applications is hereby incorporated herein by reference its respective entirety:

U.S. Provisional Patent Application No. 63/030,872, filed May 27, 2020 and entitled "Systems and Methods for Performing Geospatial-Function Joins Using Interval Joins";

U.S. patent application Ser. No. 16/920,143, filed Jul. 2, 2020 and entitled "Performing Geospatial-Function Joins Using Interval Joins";

U.S. patent application Ser. No. 16/941,236, filed Jul. 28, 2020 and entitled "Performing Geospatial-Function Joins Using Point-Based Relation Splitting"; and U.S. patent application Ser. No. 16/944,049, filed Jul. 30, 2020 and entitled "Performing Geospatial-Function Join Using Interval Join."

In any instances in this disclosure, including in the claims, in which numeric modifiers such as first, second, and third are used in reference to components, data (e.g., values, identifiers, parameters, and/or the like), and/or any other elements, such use of such modifiers is not intended to denote or dictate any specific or required order of the elements that are referenced in this manner. Rather, any such use of such modifiers is intended to assist the reader in distinguishing elements from one another, and should not be interpreted as insisting upon any particular order or carrying any other significance, unless such an order or other significance is clearly and affirmatively explained herein.

Moreover, consistent with the fact that the entities and arrangements that are described herein, including the entities and arrangements that are depicted in and described in connection with the drawings, are presented as examples and not by way of limitation, any and all statements or other indications as to what a particular drawing "depicts," what a particular element or entity in a particular drawing or otherwise mentioned in this disclosure "is" or "has," and any and all similar statements that are not explicitly self-qualifying by way of a clause such as "In at least one embodiment," and that could therefore be read in isolation and out of context as absolute and thus as a limitation on all embodiments, can only properly be read as being constructively qualified by such a clause. It is for reasons akin to brevity and clarity of presentation that this implied qualifying clause is not repeated ad nauseum in this disclosure.

In the present disclosure, various terminology is used in accordance with provided definitions. Furthermore, it is noted in connection with the definitions set out herein that the defined terms and phrases as used herein include the provided definitions along with any general and conventional understandings of the meaning of the respective terms and phrases.

It is further noted that, as used in this specification and in the appended claims, the singular forms "a," "an," and "the" include plural referents unless the context clearly dictates otherwise.

As used herein, the terms "comprising," "including," "containing," "characterized by," and grammatical equivalents thereof are inclusive, open-ended terms that do not exclude additional, unrecited elements, method steps, or the like.

Many of the functional units described in this specification may be implemented as one or more components, which is a term used to more particularly emphasize their implementation independence. For example, a component may be implemented as a hardware circuit including custom very large-scale integration (VLSI) circuits or gate arrays, off-the-shelf semiconductors such as logic chips, transistors, and/or other discrete components. A component may also be implemented in programmable hardware devices such as field programmable gate arrays (FPGAs), programmable array logic, programmable logic devices, and/or the like.

Components may also be implemented in software for execution on various types of hardware (e.g., by various types of processors). An identified component of executable code may, for instance, include one or more physical or logical blocks of computer instructions, which may, for instance, be organized as an object, a procedure, or a function. Nevertheless, the executable instructions of an identified component need not be physically located together but may include disparate instructions stored in different locations that, when joined logically together, make up the component and achieve the stated purpose for the component.

Indeed, a component of executable code may be a single instruction, or many instructions, and may be distributed over several different code segments, among different programs, and across several memory devices. Similarly, operational data may be identified and illustrated herein within components and may be embodied in any suitable form and organized within any suitable type of data structure. The operational data may be collected as a single data set or may be distributed over different locations including over different storage devices, and may exist, at least partially, merely as electronic signals on a system or network. The components may be passive or active, including agents operable to perform desired functions.

Reference throughout this specification to "an example" means that a feature, structure, or characteristic described in connection with the example is included in at least one embodiment of the present disclosure. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such a list should be construed as a de facto equivalent of any other member of the same list solely based on its presentation in a common group without indications to the contrary. In addition, various embodiments and examples of the present disclosure may be referred to herein along with alternatives for the various components thereof. It is understood that such embodiments, examples, and alternatives are not to be construed as de facto equivalents of one another but are to be considered as separate and autonomous representations of the present disclosure.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive.

Those having skill in the art will appreciate that many changes may be made to the details of the above-described embodiments without departing from the underlying principles of the disclosure. The scope of the present disclosure should, therefore, be determined only by the claims.

What is claimed is:

1. A method comprising:
    implementing a two-sided N-dimensional interval join of first and second input relations in a query-plan section of a query-execution plan, the interval join having an interval-join predicate that, in each of N dimensions, compares an interval determined from the first input relation with an interval determined from the second input relation, the query-plan section comprising an N-dimensional band join followed by a filter that applies the interval-join predicate to a band-join output of the band join, the implementing comprising:
    generating a first modified relation from the first input relation and a second modified relation from the second input relation, each modified relation comprising a copy of each row from the corresponding input relation for each of a plurality of input-domain cells that overlaps, in each of the N dimensions, a bounding polygon of the intervals determined from the row of the corresponding input relation;
    including, in each row in each modified relation, an input-domain-cell identifier of the corresponding overlapping input-domain cell; and
    generating a hash-join output of a hash-equality join that receives the first and second modified relations and that is keyed on the input-domain-cell identifiers, the band-join output comprising the hash-join output; and
    obtaining results of a query by executing the query-execution plan.

2. The method of claim 1, further comprising:
    receiving the query from a requesting entity; and
    returning the results of the query to the requesting entity.

3. The method of claim 1, wherein a common N-dimensional input domain of the first and second input relations is demarcated into the plurality of input-domain cells.

4. The method of claim 1, wherein:
    the N-dimensional band join comprises preprocessing operations followed by the hash-equality join; and
    the preprocessing operations comprise (i) the generating of the first and second modified relations and (ii) the including, in each row in each modified relation, of the input-domain-cell identifier of the corresponding overlapping input-domain cell.

5. The method of claim 4, wherein the preprocessing operations further comprise:
    sampling, with respect to each of one or more of the N dimensions, one or both of the first input relation and the second input relation with respect to an interval size of the interval determined from the corresponding input relation; and
    demarcating the input domain into the plurality of input-domain cells based at least in part on the sampling.

6. The method of claim 4, wherein:
    the first input relation and the second input relation collectively comprise a plurality of input-relation rows, the plurality of input-relation rows comprising a plurality of first-input-relation rows in the first input relation and a plurality of second-input-relation rows in the second input relation;
    the hash-join output comprises a plurality of hash-join-output rows that each include a combination of:
        (i) an instance of a first-input-relation row from the first modified relation and
        (ii) an instance of a second-input-relation row from the second modified relation for which it is the case that, in each of the N dimensions, the bounding polygons of the intervals determined from each of the corresponding input-relation rows at least partially overlap a common input-domain cell in the plurality of input-domain cells; and
    the plurality of hash-join-output rows collectively comprises all such combinations.

7. The method of claim 6, wherein the query-plan section further comprises a deduplication operator positioned after the band join and before the filter, the deduplication operator configured to remove at least one duplicate row from the band-join output.

8. The method of claim 7, wherein:
in each row of the band-join output:
the instance of the first-input-relation row from the first modified relation comprises a first-input-relation-row identifier that is unique at least within the first input relation; and
the instance of the second-input-relation row from the second modified relation comprises a second-input-relation-row identifier that is unique at least within the second input relation; and
the deduplication operator uses a combination of the first-input-relation-row identifier and the second-input-relation-row identifier as a deduplication key to remove at least one duplicate row from the band-join output.

9. The method of claim 1, wherein each of the input-domain cells in the plurality of input-domain cells is of a uniform size and shape.

10. The method of claim 1, wherein the plurality of input-domain cells includes at least two input-domain cells having one or both of a different size and a different shape.

11. A data platform comprising:
one or more hardware processors; and
one or more non-transitory computer-readable storage media containing instructions that, when executed by the one or more hardware processors, cause the one or more hardware processors to perform operations comprising:
implementing a two-sided N-dimensional interval join of first and second input relations in a query-plan section of a query-execution plan, the interval join having an interval-join predicate that, in each of N dimensions, compares an interval determined from the first input relation with an interval determined from the second input relation, the query-plan section comprising an N-dimensional band join followed by a filter that applies the interval join predicate to a band-join output of the band join, the implementing comprising:
generating a first modified relation from the first input relation and a second modified relation from the second input relation, each modified relation comprising a copy of each row from the corresponding input relation for each of a plurality of input-domain cells that overlaps, in each of the N dimensions, a bounding polygon of the intervals determined from the row of the corresponding input relation;
including, in each row in each modified relation, an input-domain-cell identifier of the corresponding overlapping input-domain cell; and
generating a hash-join output of a hash-equality join that receives the first and second modified relations and that is keyed on the input-domain-cell identifiers, the band-join output comprising the hash-join output; and
obtaining results of a query by executing the query-execution plan.

12. The data platform of claim 11, the operations further comprising:
receiving the query from a requesting entity; and
returning the results of the query to the requesting entity.

13. The data platform of claim 11, wherein a common N-dimensional input domain of the first and second input relations is demarcated into the plurality of input-domain cells.

14. The data platform of claim 11, wherein:
the N-dimensional band join comprises preprocessing logic followed by the hash-equality join; and
the preprocessing logic is configured, upon execution, to perform (i) the generating of the first and second modified relations and (ii) the including, in each row in each modified relation, of the input-domain-cell identifier of the corresponding overlapping input-domain cell.

15. The data platform of claim 14, wherein the preprocessing logic is further configured, upon execution, to perform preprocessing operations comprising:
sampling, with respect to each of one or more of the N dimensions, one or both of the first input relation and the second input relation with respect to an interval size of the interval determined from the corresponding input relation; and
demarcating the input domain into the plurality of input-domain cells based at least in part on the sampling.

16. The data platform of claim 14, wherein:
the first input relation and the second input relation collectively comprise a plurality of input-relation rows, the plurality of input-relation rows comprising a plurality of first-input-relation rows in the first input relation and a plurality of second-input-relation rows in the second input relation;
the hash-join output comprises a plurality of hash-join-output rows that each include a combination of:
(i) an instance of a first-input-relation row from the first modified relation and
(ii) an instance of a second-input-relation row from the second modified relation for which it is the case that, in each of the N dimensions, the bounding polygons of the intervals determined from each of the corresponding input-relation rows at least partially overlap a common input-domain cell in the plurality of input-domain cells; and
the plurality of hash-join-output rows collectively comprises all such combinations.

17. The data platform of claim 16, wherein the query-plan section further comprises a deduplication operator positioned after the band join and before the filter, the deduplication operator configured to remove at least one duplicate row from the band-join output.

18. The data platform of claim 17, wherein:
in each row of the band-join output:
the instance of the first-input-relation row from the first modified relation comprises a first-input-relation-row identifier that is unique at least within the first input relation; and
the instance of the second-input-relation row from the second modified relation comprises a second-input-relation-row identifier that is unique at least within the second input relation; and
the deduplication operator uses a combination of the first-input-relation-row identifier and the second-input-relation-row identifier as a deduplication key to remove at least one duplicate row from the band-join output.

19. The data platform of claim 11, wherein each of the input-domain cells in the plurality of input-domain cells is of a uniform size and shape.

20. The data platform of claim 11, wherein the plurality of input-domain cells includes at least two input-domain cells having one or both of a different size and a different shape.

21. One or more non-transitory computer-readable storage media storing instructions that, when executed by one or more hardware processors, cause the one or more hardware processors to perform operations comprising:

implementing a two-sided N-dimensional interval join of first and second input relations in a query-plan section of a query-execution plan, the interval join having an interval-join predicate that, in each of N dimensions, compares an interval determined from the first input relation with an interval determined from the second input relation, the query-plan section comprising an N-dimensional band join followed by a filter that applies the interval-join predicate to a band-join output of the band join, the implementing comprising:

generating a first modified relation from the first input relation and a second modified relation from the second input relation, each modified relation comprising a copy of each row from the corresponding input relation for each of a plurality of input-domain cells that overlaps, in each of the N dimensions, a bounding polygon of the intervals determined from the row of the corresponding input relation;

including, in each row in each modified relation, an input-domain-cell identifier of the corresponding overlapping input-domain cell; and generating a hash-join output of a hash-equality join that receives the first and second modified relations and that is keyed on the input-domain-cell identifiers, the band-join output comprising the hash-join output; and obtaining results of a query by executing the query-execution plan.

22. The one or more non-transitory computer-readable storage media of claim 21, the operations further comprising:

receiving the query from a requesting entity; and returning the results of the query to the requesting entity.

23. The one or more non-transitory computer-readable storage media of claim 21, wherein a common N-dimensional input domain of the first and second input relations is demarcated into the plurality of input-domain cells.

24. The one or more non-transitory computer-readable storage media of claim 21, wherein each of the input-domain cells in the plurality of input-domain cells is of a uniform size and shape.

25. The one or more non-transitory computer-readable storage media of claim 21, wherein the plurality of input-domain cells includes at least two input-domain cells having one or both of a different size and a different shape.

* * * * *

UNITED STATES PATENT AND TRADEMARK OFFICE
CERTIFICATE OF CORRECTION

PATENT NO. : 11,494,385 B2  
APPLICATION NO. : 17/454894  
DATED : November 8, 2022  
INVENTOR(S) : Adams et al.

Page 1 of 1

It is certified that error appears in the above-identified patent and that said Letters Patent is hereby corrected as shown below:

In the Claims

In Column 67, Line 37, in Claim 11, delete "interval join" and insert --interval-join-- therefor Signed and Sealed this
Twenty-ninth Day of August, 2023

Katherine Kelly Vidal
*Director of the United States Patent and Trademark Office*